(12) United States Patent
Kunieda et al.

(10) Patent No.: US 8,090,240 B2
(45) Date of Patent: Jan. 3, 2012

(54) MOVING PICTURE DATA EDITION DEVICE AND MOVING PICTURE DATA EDITION METHOD

(75) Inventors: Shunsuke Kunieda, Shinagawa-ku (JP); Munetaka Tsuda, Minato-ku (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1086 days.

(21) Appl. No.: 11/576,053

(22) PCT Filed: Sep. 15, 2005

(86) PCT No.: PCT/JP2005/017038
§ 371 (c)(1),
(2), (4) Date: Nov. 12, 2007

(87) PCT Pub. No.: WO2006/043383
PCT Pub. Date: Apr. 27, 2006

(65) Prior Publication Data
US 2008/0063357 A1    Mar. 13, 2008

(30) Foreign Application Priority Data

Sep. 30, 2004    (JP) .................................. 2004-285824

(51) Int. Cl.
*H04N 5/93* (2006.01)
(52) U.S. Cl. ..................... 386/283; 386/278; 386/281
(58) Field of Classification Search ................ 386/52, 386/283
See application file for complete search history.

(56) References Cited

U.S. PATENT DOCUMENTS
5,237,648 A * 8/1993 Mills et al. .................... 715/723
(Continued)

FOREIGN PATENT DOCUMENTS
GB    2 316 527 A    2/1998
(Continued)

OTHER PUBLICATIONS

Kiyotaka Ochiai, "Video Henshu Sofuto Capty MPEG Edit", MAC Power, vol. 14, No. 8, p. 103, 2003.
"PSX De Kantan Video Henshu", Video Salon, vol. 47, No. 2, pp. 21-31, 2004.

*Primary Examiner* — Kambiz Zand
*Assistant Examiner* — Yonas Bayou
(74) *Attorney, Agent, or Firm* — Oblon, Spivak, McClelland, Maier & Neustadt, L.L.P.

(57) ABSTRACT

There is provided a video data editing apparatus for making video data edition to set a frame as a predetermined edit point in video data including a plurality of picture frame groups each including a plurality of picture frames. The apparatus includes an operation command input unit (40) to accept an operation command, a data storage unit (120) to store video data compressed at every picture frame groups each including a plurality of picture frames and an edit mode controller (102). The edit mode controller makes, based on a predetermined-operation command supplied via the operation command input unit, a selection between a group-unit edit point select mode in which a command for selection of a picture frame group of the video data stored in the storage unit is accepted via the operation command input unit to change the currently-selected picture frame group and a frame-unit edit point select mode in which a command for selection of one frame of a plurality of picture frame groups included in the currently-selected picture frame group is accepted via the operation command input unit to change the currently-selected picture frame, and sets, as an edit point, a picture frame corresponding to the result of selection in the group-unit edit point select mode or a picture frame corresponding to the results of selection in the group- and frame-unit edit point select modes in response to a set command supplied via the operation command input unit.

24 Claims, 37 Drawing Sheets

U.S. PATENT DOCUMENTS

| | | | |
|---|---|---|---|
| 5,442,744 A * | 8/1995 | Piech et al. | 715/251 |
| 6,005,579 A * | 12/1999 | Sugiyama et al. | 715/855 |
| 6,026,389 A * | 2/2000 | Nakajima et al. | 1/1 |
| 6,965,723 B1 * | 11/2005 | Abe et al. | 386/281 |
| 7,212,666 B2 * | 5/2007 | Zhang et al. | 382/162 |
| 2002/0131760 A1 * | 9/2002 | Hirai et al. | 386/52 |
| 2002/0133486 A1 * | 9/2002 | Yanagihara et al. | 707/3 |
| 2003/0122861 A1 * | 7/2003 | Jun et al. | 345/720 |
| 2006/0239357 A1 * | 10/2006 | Bushell | 375/240.23 |
| 2006/0285819 A1 * | 12/2006 | Kelly et al. | 386/52 |
| 2007/0077023 A1 * | 4/2007 | Okuyama | 386/55 |
| 2007/0110389 A1 * | 5/2007 | Hayashi et al. | 386/52 |

FOREIGN PATENT DOCUMENTS

| | | |
|---|---|---|
| JP | 9-128378 | 5/1997 |
| JP | 10-66008 | 3/1998 |
| JP | 11-146336 | 5/1999 |
| JP | 2000-509534 | 7/2000 |
| JP | 2000-315958 | 11/2000 |
| JP | 2002 281432 | 9/2002 |
| JP | 2002-281433 | 9/2002 |
| JP | 2003-121157 | 4/2003 |

* cited by examiner

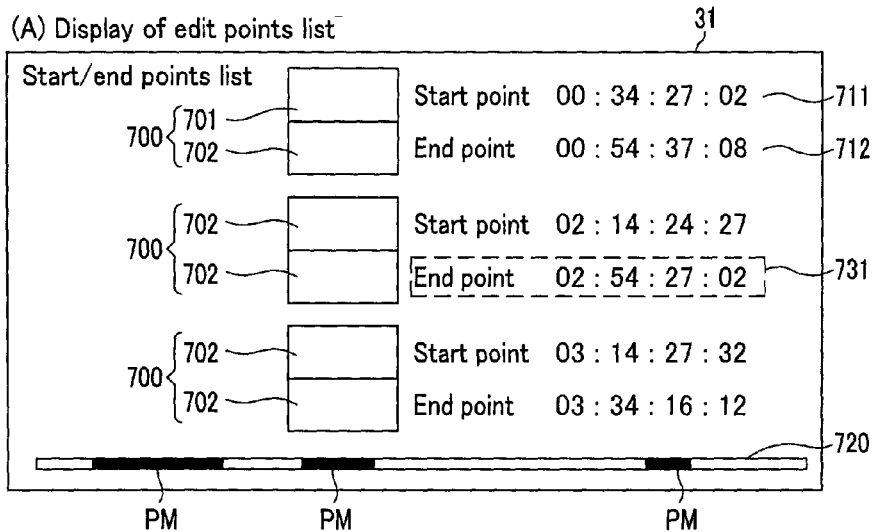
FIG.35A (A) Display of edit points list
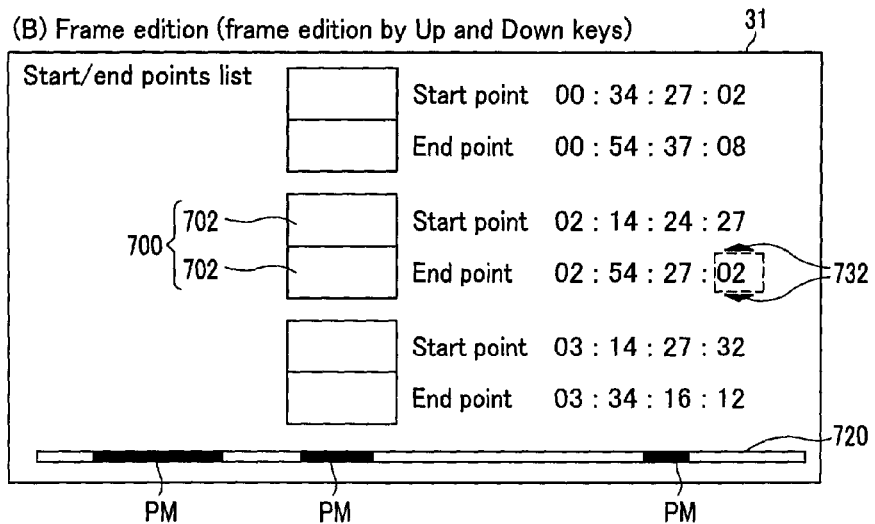
FIG.35B (B) Frame edition (frame edition by Up and Down keys)
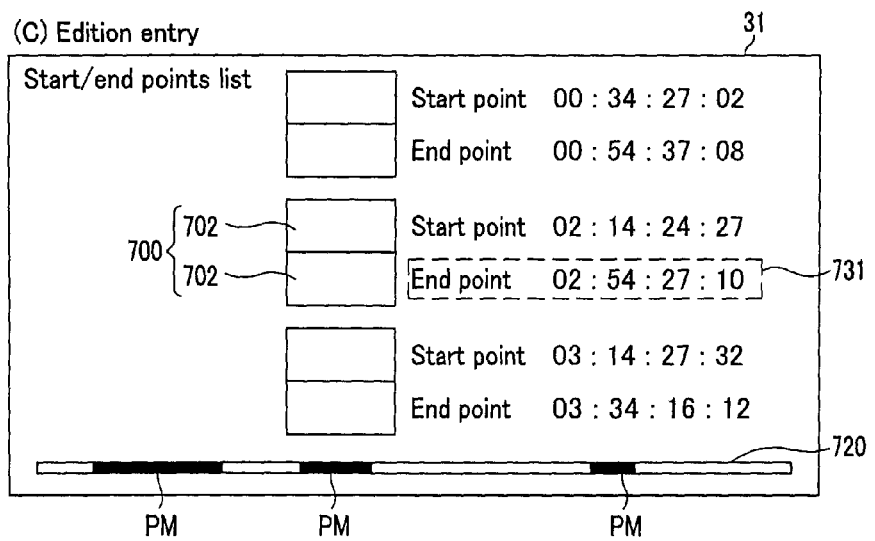
FIG.35C (C) Edition entry

MOVING PICTURE DATA EDITION DEVICE AND MOVING PICTURE DATA EDITION METHOD

TECHNICAL FIELD

The present invention relates to a video data editing apparatus and method, suitable for use to setting, for edition, a start point and end point of a section which is not to be played back, for example, of video data stored in a hard disk, DVD (digital versatile disk) or the like, for example.

This application claims the priority of the Japanese Patent Application No. 2004-285824 filed in the Japanese Patent Office on Sep. 30, 2004, the entirety of which is incorporated by reference herein.

BACKGROUND ART

There has been proposed a technique for playing back video data once stored in a hard disk drive by recording a TV broadcast program with only a special part of the data which it is desired to play back for viewing and listening. It is disclosed in the Japanese Patent Laid Open No. 146336 of 1999.

The conventional techniques of this type is such that a mode of edition is selected, a hard disk drive having video data once stored therein is played for viewing the reproduced picture, an edition start point being the beginning of a picture data section which is to be skipped and edition end point being the end of the picture data section are designated in the reproduced picture, information on the beginning and end of such designated picture data section is added to the video data and the video data thus including the added beginning and end of picture data section is written back to the hard disk drive.

According to the standard of the DVD-Video Recording (DVD-VR) format, the information on the beginning and end of the picture data section to be skipped may be included as additional data into the video data. A plurality of pairs of beginning (IN point) and end (OUT point) of a picture data section can thus be included per content into video data to be recorded.

With the conventional technique, the edit mode is selected and such IN and OUT points are set as edit points by repeating operation of Play button or Search button, pause operation and setting of IN and OUT points while viewing a reproduced picture displayed on a playback screen.

DISCLOSURE OF THE INVENTION

However, it is extremely difficult to confirm and set edit points minutely by operating the Pause button while watching only the playback screen. That is, to set particular edit points with the conventional technique, a video being displayed on the playback screen is frozen by pressing the PAUSE button to freeze when an edit point is nearly reached. Then, if the picture thus stopped is found deviated from a desired edit point, this desired edit point has to be detected by repeatedly operating the Play, Search and Pause buttons. The operations for the edition are thus very difficult.

Actually, edit points set as the result of such troublesome operations as above are not desired ones as the case may be.

It is therefore desirable to overcome the above-mentioned drawbacks of the related art by providing a video editing apparatus and method, capable of precise and easy setting of edit points such as an IN point and OUT point of a picture section of video data to be recorded.

According an embodiment of the present invention, there is provided a video data editing apparatus including an operation command input unit to accept a user's operation command, a storage unit to store video data compressed at every picture frame groups each including a plurality of picture frames and an edit mode controller. The edit mode controller makes, based on a predetermined-operation command supplied via the operation command input unit, a selection between a group-unit edit point select mode in which a command for selection of a picture frame group of the video data stored in the storage unit is accepted via the operation command input unit to change the currently-selected picture frame group and a frame-unit edit point select mode in which a command for selection of one frame of a plurality of picture frame groups included in the currently-selected picture frame group is accepted via the operation command input unit to change the currently-selected picture frame, and sets, as an edit point, a picture frame corresponding to the result of selection in the group-unit edit point select mode or a picture frame corresponding to the results of selection in the group- and frame-unit edit point select modes in response to a set command supplied via the operation command input unit.

In the above video data edition apparatus, it is possible to set an edit point in units of a picture frame group each including a plurality of picture frames serving as the unit of compression and also an edit point in units of one frame of the plurality of frames included in the picture frame group.

Also, according to another embodiment of the present invention, there is provided a video data editing apparatus including an operation command input unit to accept a user's operation command, a storage unit to store video data compressed at every picture frame groups each including a plurality of picture frames and an edit mode controller. The edit mode controller included in the editing apparatus makes, based on a predetermined-operation command supplied via the operation command input unit, a selection between a group-unit edit point select mode in which there is displayed a group-unit thumbnail array in which a plurality of group-unit thumbnails each including a thumbnail of one picture frame in a picture frame group included in video data stored in the storage unit is laid in a sequence of their elapsed time and a command for changing a currently-selected group-unit thumbnail is accepted via the operation command input unit to change the currently-selected group-unit thumbnail and a frame-unit edit point select mode in which there is displayed a frame-unit thumbnail array in which a plurality of frame-unit thumbnails each including a thumbnail of each of the plurality of picture frames included in a picture frame group corresponding to the currently-selected group-unit thumbnail is laid in a sequence of their elapsed time and a command for changing a currently-selected frame-unit thumbnail is accepted via the operation command input unit to change the currently-selected frame-unit thumbnail, and sets, as an edit point, a frame corresponding to the currently-selected group- or frame-unit thumbnail in response to a set command supplied via the operation command input unit.

In the above editing apparatus, when the group-unit edit point select mode is selected, there will be displayed a group-unit thumbnail array in which a plurality of group-unit thumbnails each including a thumbnail of one picture frame in a picture frame group including a plurality of picture frames as a unit of compression is laid in a sequence of their elapsed time on a display screen. The user can select edit points in units of a picture frame group by selecting one group unit thumbnail from the array of group-unit thumbnails.

Then, when the user enters a predetermined-operation command via the operation command input unit after selection of the group-unit thumbnail, the editing apparatus will shift to the frame-unit edit point select mode. In this frame-unit edit point select mode, there is displayed a frame-unit thumbnail array in which a plurality of frame-unit thumbnails each including a thumbnail of each of the plurality of picture frames included in a picture frame group corresponding to the currently-selected group-unit thumbnail is laid in a sequence of their elapsed time.

The user can select edit points in units of a picture frame group by selecting one frame-unit thumbnail from the array of frame-unit thumbnails.

The user can enter a set command via the operation command input unit to set, as an edit point, each of the plurality of picture frames each corresponding to the group-unit thumbnail selected in the group-unit edit point select mode or the frame-unit thumbnail selected in the frame-unit edit point select mode.

That is, by selecting a group-unit thumbnail only in the group-unit edit point select mode and then entering it, the user can take, as an edit point, each of the plurality of picture frames corresponding to a group-unit thumbnail and each being a unit of compression.

To set edit points more minutely, the user can set edit points in units of one frame by shifting the edit point select mode from the group-unit edit point select mode to frame-unit edit point select mode, selecting a frame-unit thumbnail and entering it.

According to the above embodiments of the present invention, it is possible to provide a video data editing apparatus and method, capable of setting edit points minutely and easily.

The foregoing and other features, aspects and advantages of the present invention will be come apparent from the following detailed description of embodiments of the present invention when taken in conjunction with the accompanying drawings.

BRIEF DESCRIPTION OF THE DRAWINGS

FIGS. 35A, 35B and 35C explain the edit-point setting user-interface screen in an eighth embodiment of the video data editing method according to the present invention.

BEST MODE FOR CARRYING OUT THE INVENTION

The present invention will be described in detail below concerning the embodiments of the video data editing apparatus and method according to the present invention with reference to the accompanying drawings.

The embodiments of the present invention that will be explained herebelow are applications of the present invention to edition of video data, to be made in a multimedia recording/playback apparatus adapted to play back a plurality of contents over a plurality of types of media such as broadcast, recording medium such as an optical disk, computer game, etc. and record such contents.

It should be noted here that the "content" in the following explanation refers to information the human being can recognize visually and acoustically such as a piece of music, a picture such as a video or still picture, text data such as an electronic novel, computer game software and the like and which is represented by signals.

Also, the "media" in the following explanation refers to information recording media such as a hard disk, optical disk, memory card, magnetic tape and the like and an information transmission media such as a radio wave, cable and the like. However, a computer game medium being the same recording medium or transmission medium as the above one but different in data format and compression format from the "media" will be differentiated from the "media".

<Configuration of the Multimedia Recording/Playback System>

Figure 1:
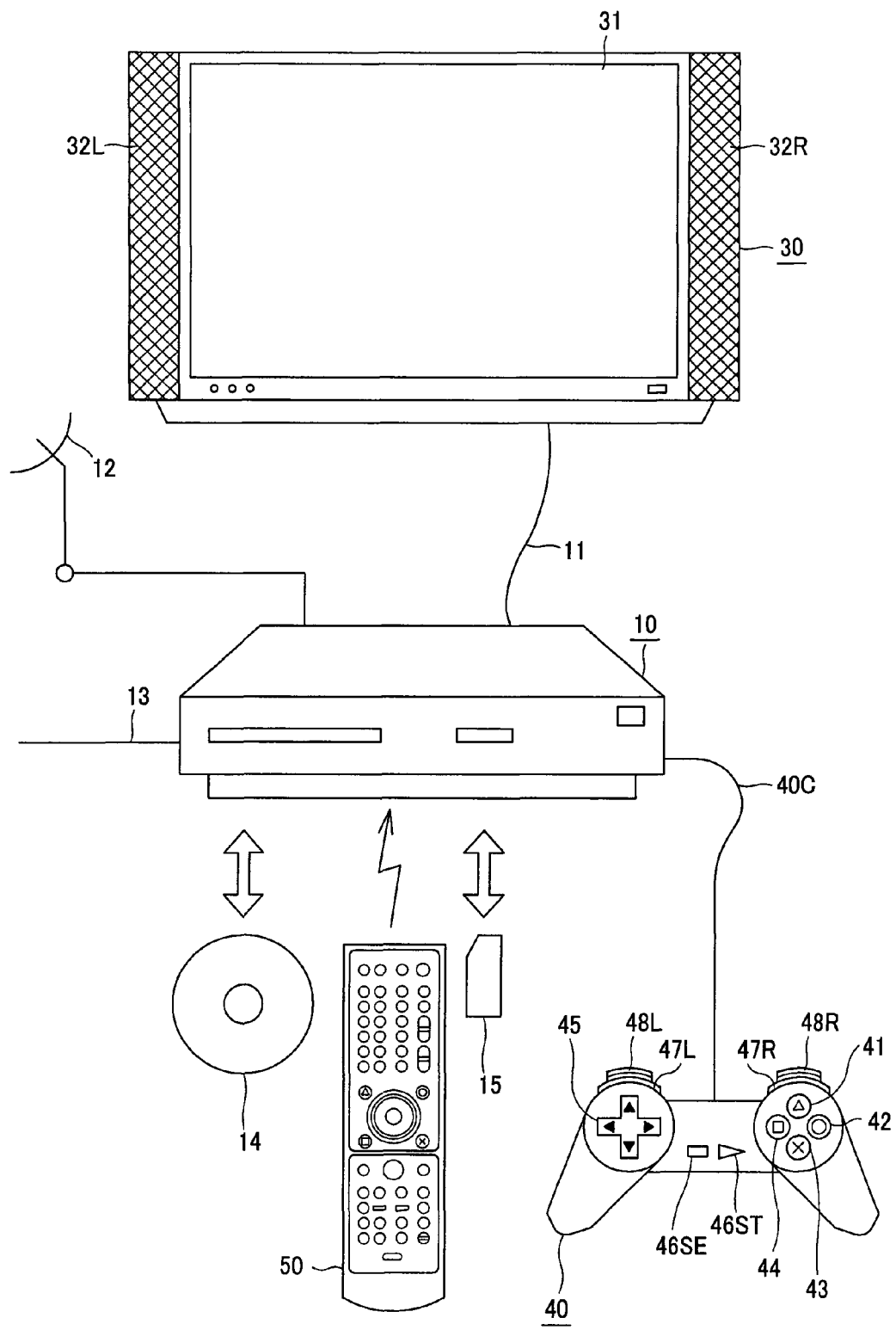
FIG. 1 illustrates an example of a multimedia system including an embodiment of the video data editing apparatus according to the present invention.

FIG. 1 schematically illustrates a multimedia recording/playback system including a multimedia recording/playback apparatus (will be referred to as "multimedia recorder/player" hereunder) 10 as an embodiment of the present invention. As shown in FIG. 1, the multimedia recorder/player 10 is provided with no display for displaying a video and user-interface screen but with a video output terminal (not shown) instead. The video output terminal of the multimedia recording/player 10 is connected to a monitor display 30 including, for example, a CRT (cathode ray tube), LCD (liquid crystal display) or the like via an interconnecting cable 11. A display screen 31 of the monitor display 30 is used for displaying a video and user-interface screen.

It should be noted that in the example shown in FIG. 1, the monitor display 30 is provided with speakers 32L and 32R, respectively, at opposite ends, right and left, thereof. These speakers 32L and 32R are supplied with audio signals from an audio output terminal of the multimedia recorder/player 10 via a cable (not shown) and reproduce the audio signals acoustically.

The multimedia recorder/player 10 is supplied with content information via a plurality of media such as broadcast, Internet, optical disk such as DVD or CD, memory card and the like.

Here will be explained the above "broadcast media". The multimedia recorder/player 10 has connected thereto a TV broadcast receiving antenna 12, for example, and TV broadcast signals received by the antenna 12 are supplied to the multimedia recorder/player 10. In this multimedia recorder/player 10, a broadcast program content selected by the user from the TV broadcast signals is extracted and decoded, and video in the broadcast program is displayed on the screen of the monitor display 30 while audio in the broadcast program is acoustically reproduced by the speakers 32L and 32R of the monitor display 30. The multimedia recorder/player 10 also includes a function to record broadcast program contents.

The above "Internet media" will be explained below. The multimedia recorder/player 10 has connected thereto a communication line 13 for connection to the Internet, and is supplied with web content data acquired through the Internet. The web content data can be stored in the multimedia recorder/player 10 and used with each of functions such as a computer game function provided in the multimedia recorder/player 10.

Also, the above "optical disk media" will be explained. The multimedia recorder/player 10 has a function to read content data stored in an optical disk 14 such as DVD, CD or the like, decode the read data and supply the decoded data to the monitor display 30 for viewing and listening. The multimedia recorder/player 10 also has a function to store video data and audio data in a video content read from DVD and music content data read from CD.

The contents stored in the optical disk include, for example, video, music and audio in a movie, pieces of music such as classic music, popular song and the like, electronic novels, etc. Data in an electronic novel content include text data, audio data for oral reading, image data such as illustrations, etc.

The above "memory card media" will be explained. The multimedia recorder/player 10 has functions to read and write data stored in a memory card 15. Data in content storable in the memory card 15 include captured pictures such as moving and still pictures captured by a digital camera and audio information picked up by the digital camera during shooting. Such data are storable in a data storage unit included in the multimedia recorder/player 10.

The multimedia recorder/player 10 in the aforementioned example of the multimedia recording/playback system also has a computer game machine in addition to the aforementioned multimedia recording/playback functions. The multimedia recording/playback system also includes an operation command input unit 40. The operation command input unit 40 is provided primarily for controlling a computer game machine section of the multimedia recorder/player 10, and it is connected to the multimedia recorder/player 10 via an interconnecting cable 40C. The operation command input unit 40 is also adapted for use to control the multimedia recording/playback functions.

In this example, the operation command input unit 40 is to be used primarily as an operation controller for the computer game machine section. It is constructed similarly to the operation controller for the conventional computer game machine, and is provided with a relatively small number of control buttons. In the example shown in FIG. 1, the operation command input unit 40 includes two arms and a cross bar connecting the arms to each other. One of the arms has four manual operation buttons 41, 42, 43 and 44 provided at a head portion thereof, and the other arm has a cruciform directional button 45 at a head portion thereof. A Start button 46ST and Select button 46SE are provided on the crossbar. The operation command input unit 40 also has L1 button 47L and R1 button 47R provided at the top of the one arm thereof, and L2 button 48L and R2 button 48R provided at the top of the other arm.

The four manual operation buttons 41, 42, 43 and 44 have specific marks on their respective tops. In the above example shown in FIG. 1, the specific marks are a circle, triangle, square and crisscross. These marks are formed by printing on the button tops. The four manual operation buttons 41, 42, 43 and 44, Start button 46ST and Select button 46SE are pre-assigned to specific items of operation in a graphic-user interface displayed on the display screen of the monitor display 30.

The items of operation in the graphic-user interface associated with the four manual operation buttons 41, 42, 43 and 44 are indicated with the same marks as those provided atop the manual operation buttons 41, 42, 43 and 44 in such a manner that the correspondence between the buttons and items of operation are understandable at a glance as will further discussed later.

The operation command input unit 40 is so adapted that when the user operates one of the buttons on the operation command input unit 40 while the graphic-user interface is being displayed on the screen of the monitor display 30, the graphic-user interface will reflect the button operation.

The operation command input unit 40 is also designed to remotely control the multimedia recording/playback functions of the multimedia recorder/player 10. When it is used for remote control of the multimedia recording/playback functions, the L1 button 47L and R1 button 47R will be assigned for use to access a specific program or the like in the forward and backward directions, respectively, and the L2 button 48L and R2 button 48R will be assigned for use to make forward search (fast forward) and backward search (rewind), respectively.

Further, when the cruciform directional button 45 of the operation command input unit 40 is operated at a left- or right-directional mark portion thereof, the forward search (fast forward) or backward search (rewind) function is started up.

Therefore, in the operation command input unit 40, the forward search (fast forward) and backward search (rewind) functions are doubly assigned to the L2 button 48L and R2 button 48R and left- and right-directional mark portions of the cruciform directional button 45.

This embodiment includes a remote commander 50 to control all the functions of the multimedia recorder/player 10 in addition to the operation command input unit 40 for the computer game machine section. The remote command 50 is of a wireless type using infrared rays.

Configuration of the Multimedia Recorder/Player 10

Figure 2:
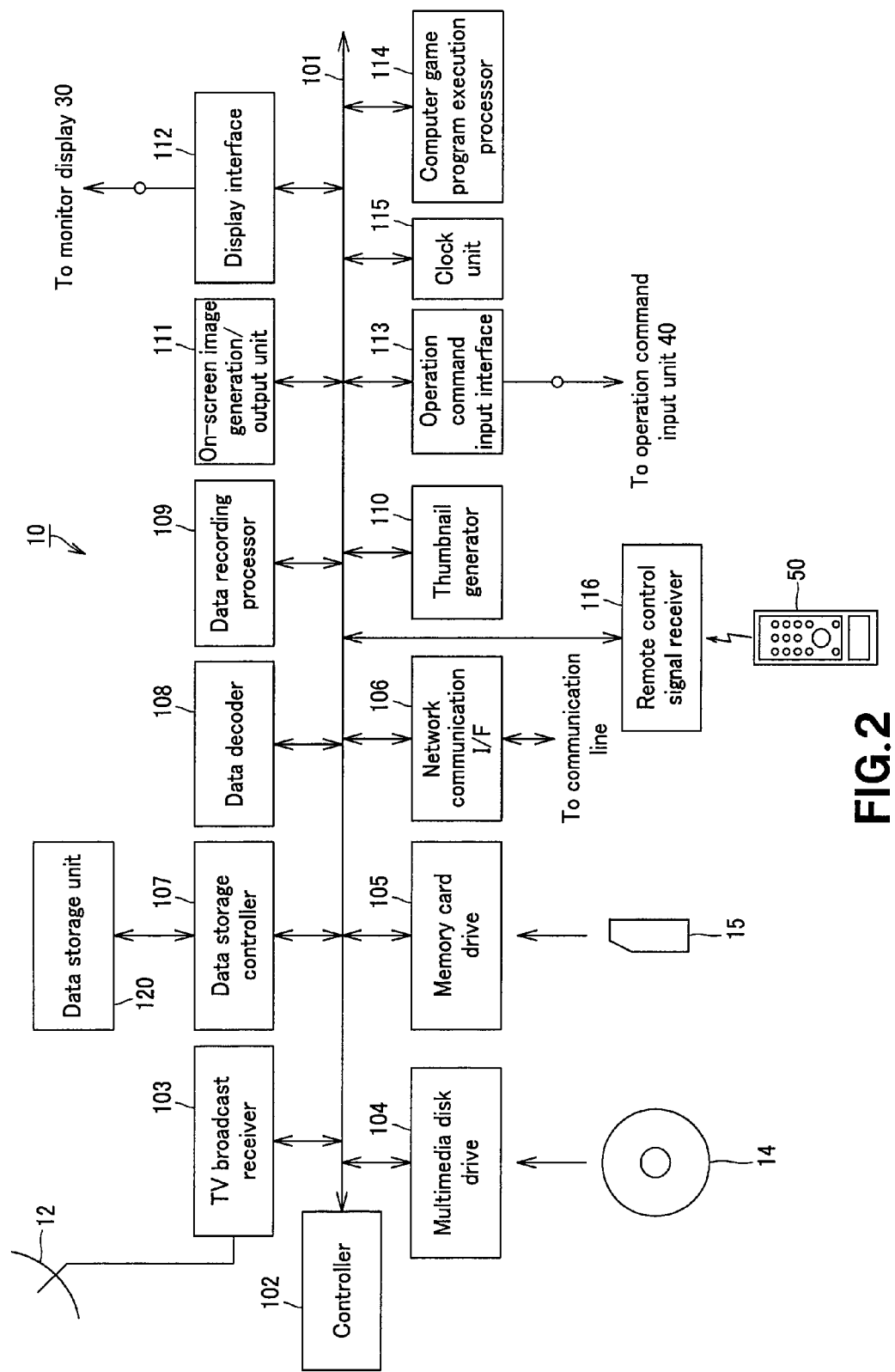
FIG. 2 is a block diagram of a multimedia recording/playback apparatus using the video data editing apparatus as the embodiment of the present invention.

FIG. 2 shows the configuration of the hardware as the substantial part of the multimedia recorder/player 10 including the embodiment of the video editing apparatus according to the present invention. It should be noted that in the example shown in FIG. 2, the audio signal system is omitted for the simplicity of illustration and explanation.

As shown in FIG. 2, the multimedia recorder/player 10 includes a system bus 101 to which there are connected a controller 102, TV broadcast receiver 103, multimedia disk drive 104, memory card drive 105, network communication interface 106, data storage controller 107, data decoder 108, data recording processor 109, thumbnail generator 110, on-screen image generation/output unit 111, display interface 112, operation command input interface 113, game program execution processor 114, clock unit 115 and a remote control signal receiver 116.

Including CPU (central processing unit), program ROM (read-only memory), work RAM (random-access memory), etc., the controller 102 uses the work RAM to perform a variety of control operations such as edit mode control, edition control, etc. according to a program written inn the program ROM.

The TV broadcast receiver 103 selects, from TV signals received by the antenna 12, a broadcast program corresponding to tuning made by the user using a remote commander (not shown) and sends the currently-selected broadcast program to the system bus 101.

The multimedia disk drive 104 reads content data stored in the optical disk 14 such as DVD, CD or the like loaded in the drive 104, and takes it into the multimedia recorder/player 10. Also, in case the DVD is a writable one, the multimedia disk drive 104 can write data into the DVD when supplied with a write command from the controller 102.

The memory card drive 105 reads data from the memory card 15 inserted therein and also writes data to the memory card 15 from the multimedia recorder/player 10.

The network communication interface 106 is connected to the communication line 13 as having been described above. It acquires data such as web content via the Internet and sends predetermined information via the Internet.

The data storage controller 107 has connected thereto a data storage unit 120 which is a hard disk drive, for example. The data storage controller 107 controls data write and read to and from the data storage unit 120.

The data decoder 108 decodes, in response to a user's command accepted via the operation command input unit 40, coded broadcast content from the TV broadcast receiver 103, multimedia disk drive 104 or data storage unit 120 or coded movie, music or similar data read from the DVD or CD and sends it to the system bus 101. The controller 102 controls an output buffer of the on-screen image generation/output unit 111 to store the decoded video data and music data.

The data recording processor 109 is controlled by the controller 102 to convert, in response to an operation command supplied by the user operating the operation command input unit 40, coded broadcast content data from the TV broadcast receiver 103, coded movie or music data read from the multimedia disk drive 104 or web content data acquired via the network communication interface 106 into a recording format for storage into the data storage unit 120. The data recording processor 109 stores the data into the data storage unit 120 via the data storage controller 107. In this example, the recording format is, for example, DVD-VR format.

In this example, the thumbnail generator 110 generates, in the edit mode, a thumbnail of each frame picture from video data read from the data storage unit 120. In this example, the video data has been compressed by the MPEG (Moving Picture Experts Group) coding compression method, for example, that uses the motion-compensation inter-frame encoding.

In this coding compression, data are grouped at every plural frames, for example, at every 15 frames. The unit of grouping of frame pictures is called "GOP (Group Of Pictures). Each GOP includes a frame compressed by an intra-screen complete method. A frame compressed by this intra-screen complete method is an intra-frame picture and called "I picture". A frame picture other than I picture are subjected to the motion-compensation intra-frame encoding, and can be decoded for playback if either or both of frames preceding and following the frame picture is not decoded for playback.

Therefore, a frame picture for which a thumbnail is generated cannot be generated before the preceding and following frame pictures are played back in case it is other than an I picture.

Since the I picture is a picture having been intra-frame encoded, it is possible to reproduce picture data from only the data on the I picture. Thus, a thumbnail can be generated from an I picture, if any, before the preceding and following frame pictures are played back. Since it is not necessary to decode the preceding and following frames, picture data can be reproduced from an I picture, if any, and a thumbnail of the picture data can be generated, both at a high speed.

The on-screen image generation/output unit 111 stores decoded video and audio data supplied from the data decoder 108 into the output buffer incorporated therein. Also, it stores thumbnail data from the thumbnail generator 110, data for displaying characters and symbols for the graphic-user interface, etc. as display image data into an on-screen buffer incorporated therein. The display image data is data which is displayed being superposed on an image of a reproduced picture to be displayed on the display screen 31 of the monitor display 30. In this case, the reproduced-picture image is displayed so that it is visible through the superposing data.

Then, the on-screen image generation/output unit 111 supplies a combination of data stored in the output buffer and display image data stored in the on-screen buffer to the monitor display 30 via the display interface 112. The display interface 112 is connected to the monitor display 30 via the interconnecting cable 11.

Also, when the game program execution processor 114 makes an operation for performing a computer game, the on-screen image generation/output unit 111 generates game image information in cooperation with the game program execution processor 114, and supplies the generated game image information to the monitor display 30 via the display interface 112.

The game program execution processor 114 executes a game program read by the multimedia disk drive 104 from the optical disk 14 or a game program read from the data storage unit 120 the game program execution processor 114 executes a game program in response to a user's command accepted via the operation command input unit 40 and sends video and audio to the on-screen image generation/output unit 111.

The operation command input interface 113 has connected thereto a game controller as the operation command input unit 40 via the cable 11. The operation command input unit 40 includes the cruciform directional button 45 that accepts a directional command for any of the upward, downward, leftward and rightward directions, given by the user as having previously been described, the manual operation buttons 41 to 44 that accept commands such as a content playback, playback stop, menu screen call commands, etc. given by the user, Select button 46SE and Start button 46ST.

A control signal indicative of what an operation is commanded by the user operating which of the operation command input buttons is supplied from the operation command input unit 40 to the system bus 101 via the operation command input interface 113. The controller 102 will make control correspondingly to the control signal.

The clock unit 115 supplies present-time information and calendar information. Also, it is used to measure a variety of timing. Further, it supplies time information which is additional to data to be recorded. The time information to be added to the to-be-recorded data is to indicate a temporal position relative to the top of a video content in each picture frame. The time information may be a present time itself or time information relative to the content top.

When the user has set a TV broadcast reception mode, the controller 102 transfers data from the TV broadcast receiver 103 to the data decoder 108 in which coded video and audio data will be decoded. The data thus decoded are supplied to the monitor display 30 via the on-screen image generation/output unit 111 and display interface 112.

When the controller 102 has set a DVD play mode, it transfers data from the TV broadcast receiver 103 to the data decoder 108 in which video content data and audio data read by the multimedia disk drive 104 from a DVD will be decoded. The data thus decoded are supplied to the monitor display 30 via the on-screen image generation/output unit 111 and display interface 112.

When the user has set a storage mode for TV broadcast or DVD content, the controller 102 controls the data recording processor 109 to convert coded data from the TV broadcast receiver 103 or video content data and audio data read by the multimedia disk drive 104 into a recording format for storage into the data storage unit 120 and store the converted data in the recording format into the data storage unit 120 via the data storage controller 107.

Also, when the in a mode set by the user operating the remote commander 50, the controller 102 displays data read from the memory card 15 or web content data acquired from the network communication interface 106 on the display screen 31 of the monitor display 30 or store the data into the data storage unit 120.

Also in this embodiment, when the multimedia recorder/player 10 is in the edit mode, the controller 102 makes an operation to have the user set an edition start point (IN point) and edition end point (OUT point) of a picture section over which playback is to skip as will be explained below.

It should be noted that the data decoder 108, data recording processor 109, thumbnail generator 110 and on-screen image generation/output unit 111 shown in FIG. 2 may be formed from software.

Functional Description:

Next, main functions of the multimedia recorder/player 10 constructed as above will be explained.

Playback of Broadcast Program Content or External Input Content for Viewing and Listening:

For example, when the user enters a command for selection of TV broadcast program content for viewing and listening by operating the remote commander 50, an infrared remote control signal indicative of the select command is sent from the remote commander 50 to the remote control signal receiver 116. It should be noted that the operation command input unit 40 may be used in place of the remote commander 50. The remote control signal receiver 116 makes discrimination of the select command and sends a control signal which is the result of discrimination to the controller 102 via the bus 101. The controller 102 will make discrimination of the control signal and pass a tuning command to the TV broadcast receiver 103.

Alternately, when the user enters a command for selection of a TV broadcast program content for viewing and listening by operating the operation command input unit 40, for example, while the graphic-user interface is being displayed on the monitor display screen, the controller 102 will detect it and pass a tuning command to the TV broadcast receiver 103. It should be noted that the remote commander 50 may be used instead of the operation command input unit 40.

The TV broadcast receiver 103 selects a TV broadcast program content corresponding to the received tuning command and transfers video data in the currently-selected TV broadcast program content to the data decoder 108. The data decoder 108 decodes the video data in the TV broadcast program content. The decoded video data is supplied under the control of the controller 102 to the monitor display 30 via the display interface 112. Thus, the user can view, and listen to, the TV broadcast program content on the monitor display 30.

Recording and Playback of a Broadcast Program Content:

For example, when the user enters a command for recording data to the data storage unit 120 which is a hard disk drive or for playing back data from the data storage unit 120 by operating the remote commander 50 or operation command input unit 40, the controller 102 will make discrimination between the record and playback commands.

For recording a TV broadcast program content in response to the record command, the controller 102 controls the data recording processor 109 to process MPEG-compressed TV broadcast program content data supplied from the TV broadcast receiver 103, and then controls the data storage controller 107 to write the processed data into the data storage unit 120.

When supplied with the playback command, the controller 102 controls the data storage controller 107 to read subject compressed video content data from the data storage unit 120. The compressed data read from the data storage unit 120 is transferred to the data decoder 108.

The data decoder 108 decodes the compressed content data and supplies the decoded data to the monitor display 30 via the on-screen image generation/output unit 111 and display interface 112 for reproduction on the monitor display 30.

It should be noted that when the received command is a command for recording to a DVD, the controller 102 will to transfer the compressed broadcast program content data to the multimedia disk drive 104 in response to that command. The multimedia disk drive 104 will record the compressed broadcast program content data to the DVD.

When the received command is a command for playback of a video content from a DVD, the controller 102 instructs, in response to that command, the multimedia disk drive 104 to read the designated video content and transfer it to the data decoder 108. Receiving the instruction, the multimedia disk drive 104 read the video content data from the optical disk 14 and transfers it to the data decoder 108. The data decoder 108 decodes the compressed content data and outputs the decoded data to the monitor display 30 via the on-screen image generation/output unit 111 and display interface 112 for playback on the monitor display 30.

Operation as a Computer Game

The user enters a command for selection of a game content by operating the remote commander 50 or operation command input unit 40 while the graphic-user interface screen which will further be described later is being displayed on the display screen of the monitor display 30, the controller 102 will acquire computer game software from a DVD, for example, via the multimedia disk drive 104. Then, the controller 102 will control the on-screen image generation/output unit 111 to generate computer game software-based illustration data.

The computer game software-based illustration data from the on-screen image generation/output unit 111 is sent to the monitor display 30 via the display interface 112.

Graphic-User Interface Screen

In this embodiment, when the Select button on the remote commander 50 or Select button 46SE on the operation command input unit 40 is operated, for example, the controller 102 will control the on-screen image generation/output unit 111 to make α (alpha) blending of a graphic-user interface image, and superpose the α-blended graphic-user interface image in a semi-transparent state on an image being currently displayed on the monitor display 30.

A technique for displaying, on an on-screen image, another image which is semi-transparent is called "α-blending". With this technique, it is possible to blend two image data together at a specified mixing ratio α ($0 \leq \alpha \leq 1.0$) and display the two image data one on the other at a degree of semi-transparency corresponding to the specified mixing ratio α.

More specifically, when the user presses the Select button on the remote commander 50 or Select button 46SE on the operation command input unit 40 while a TV broadcast program content image, image played back from a DVD or a image read from the data storage unit 120 is being displayed, the controller 102 will instruct the on-screen image generation/output unit 111 to generate an image of a graphic-user interface screen.

The on-screen image generation/output unit 111 generates illustration drawn based on a graphic-user interface screen in response to the instruction from the controller 102. The illustration drawn on the graphic-user interface screen, generated by the on-screen image generation/output unit 111, is blended with TV broadcast program video data from the TV broadcast receiver 103 or the like with the α-blending technique, superposed in a semi-transparent state on a TV broadcast program video or the like on the screen of the monitor display 30 to display a graphic-user interface screen.

Figure 3:
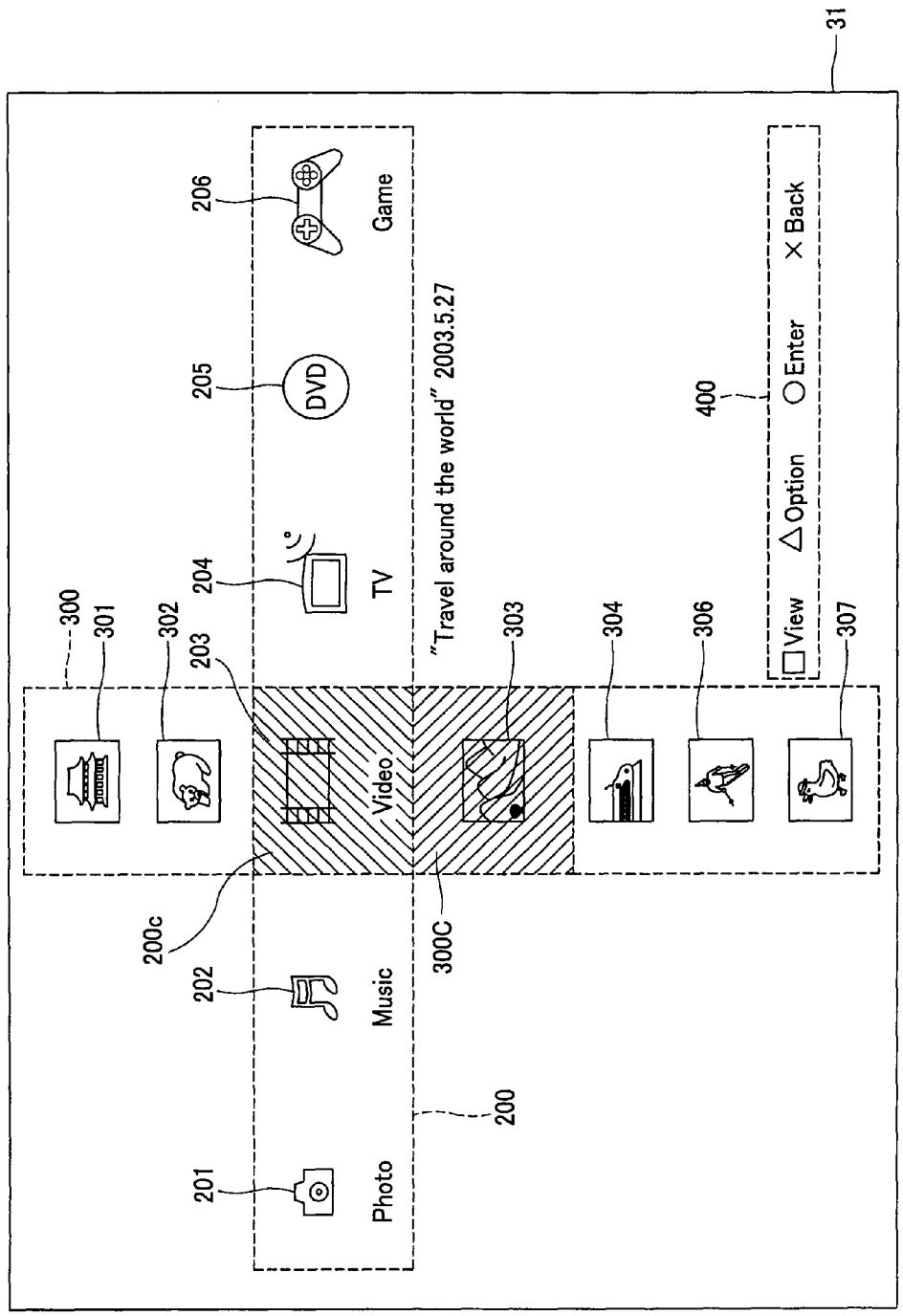
FIG. 3 shows an example of the initial menu screen in the multimedia recording/playback apparatus.

FIG. 3 shows an example of the initial menu screen of a user interface screen generated by the on-screen image generation/output unit 111 under the control of the controller 102 and displayed on the display screen 31 of the monitor display 30 in the multimedia recorder/player 10. A crossing two-dimensional array menu screen as shown in FIG. 3 is used as an initial menu screen in this embodiment. This example of crossing two-dimensional array menu screen appears on, and disappears from, the display screen 31 each time the Select button on the remote commander 50 or Select button 46SE on the operation command input unit 40 is operated.

It should be noted that in the crossing two-dimensional array menu screen of the graphic-user interface, the cursor position (corresponding to a position being selected) is moved in a direction selected by pressing each of the Leftward-move button, Rightward-mode button, Upward move button or Downward move button on the cruciform directional button 45 of the operation command input unit 40 or those on the remote commander 50.

As shown in FIG. 3, the crossing two-dimensional array menu screen includes a media icon array 200 in which a plurality of media icons and setting icons are laid horizontally in a line, content icon array 300 in which a plurality of content icons is laid vertically in a line and a setting item icon array 310. The arrays 200 and 300 cross each other nearly in the middle of the screen.

The media icons included in the media icon array 200 are small identification illustrations that indicate types of media, respectively, the multimedia recorder/player 10 can play. So, they are predetermined ones. In the example shown in FIG. 3, the media icons in the media icon array 200 include a photo icon 201, music icon 202, video icon 203, broadcast icon 204, optical disk icon 205 and game (computer game) icon 206.

As will be known from FIG. 3, when any one of the media icons in the media icon array 200 is selected, the content icon array 300 extending vertically from the icon being selected (hatched in FIG. 3) is displayed.

The content icons included in the content icon array 300 are small identification images of a plurality of contents, respectively. A media in the media icon array 200, which is at the intersection between the content icon array 300 and media icon array 200, is being selected. The media being selected will be referred to as "media of interest" hereunder. The content icons are thumbnails of pictures, letters and illustrations as having previously been described. Such a thumbnail is generated by the thumbnail generator 110.

It should be noted that thumbnails are pre-generated by the thumbnail generator 110 for contents stored in the data storage unit 120 and stored in the data storage unit 120 in correspondence to the stored contents. Any one of the contents is read by the controller 102 from the data storage unit 120. When an icon in the media icon array 200, corresponding to a content stored in the optical disk 14 or memory card 15, is selected, a thumbnail for the content will be generated by the thumbnail generator 110.

In the example shown in FIG. 3, the icon of interest indicates the video icon 203. The video icon 203 corresponds to the data storage unit 120 as a medium. Therefore, in the example in FIG. 3, the content icon included in the content icon array 300 is an icon for a video content recorded in the data storage unit 120. In this example, the content icon array 300 includes content icons 301 to 307 on one screen.

The aforementioned graphic-user interface screen is displayed in a semi-transparent state at the front of a video content image being displayed on the display screen 31.

In this embodiment, the media icon array 200 is not vertically movable but displayed fixed in a position a little above the vertical center of the screen as shown in FIG. 3, for example. However, the entire media icon array 200 including the plurality of media icons 201 to 206 is moved horizontally in correspondence to a horizontal direction designated by the user operating the cruciform directional button 45 on the operation command input unit 40 or manual operation buttons on the remote commander 50.

Also, the content icon array 300 is not horizontally movable but displayed fixed in a position a little deviated to the left from the horizontal center of the screen as shown in FIG. 3, for example. However, the entire content icon array 300 including the plurality of content icons 301 to 306 is moved vertically in correspondence to a vertical direction designated by the user operating the cruciform directional button 45 on the operation command input unit 40 or manual operation buttons on the remote commander 50.

As above, the media icon array 200 having the plurality of media icons 201 to 206 laid horizontally in a line is displayed fixed in a vertical position while the content icon array 300 having the plurality of content icons 301 to 306 laid vertically in a line is displayed fixed in horizontal position. So, an area 200C of intersection between the media icon array 200 and content icon array 300 is fixed in a left-oblique position above the vertical center of the display screen 31.

In this embodiment, the controller 102 recognizes a media icon indicated in the intersection area 200C as an icon being selected (icon for a media of interest).

In this example, an icon for a media of interest, displayed in the intersection area 200C, is displayed differently in color from the icons for other media and with a lower transparency than the other media icons so that it is distinguishable from the other media icons. In the example shown in FIG. 3, the video icon 203 is displayed in the intersection area 200C differently in color from the other media icons and with a lower transparency to indicate that the video icon 203 is being selected. It should be noted that the icon being selected may be displayed in a larger scale for emphasis.

In this embodiment, the controller 102 recognizes a content icon indicated in an area 300C beneath the intersection area 200C as a content icon being selected (icon for a content of interest). The icon for the content of interest, displayed in the area 300C, is also displayed in a manner different from the other content icons and with a lower transparency so that it is distinguishable from the other content icons. The icon being selected may be displayed in a larger scale for emphasis.

In this embodiment, the icon displayed in the fixed intersection area 200C is taken as an icon for a media of interest, while the content icon displayed in an area 300C beneath the intersection area 200C (will be referred to as "area of interest" hereunder) is taken as an icon for a content of interest. By scrolling the media icon array 200 horizontally to display a media icon corresponding to a desired media in the intersection area 200C and scrolling the content icon array 300 vertically to display a content icon corresponding to a desired content in the fixed area 300C, the user selects and sets a desired content in a desired medium.

When any media icon is positively positioned in the intersection area 200C, a color, size and transparency of the media icon are varied for emphasis. Since a media icon positioned in the intersection area 200C is displayed in a manner different from that for other media, so the user can easily select a medium.

When any media icon is positively positioned in the intersection area 200C, the content icon array 300 will be displayed to extend from the intersection area 200C vertically.

Next, the user moves the entire content icon array 300 vertically by operating the cruciform directional button 45 on the operation command input unit 40 or the manual operation buttons on the remote commander 50 to designate the vertical direction. Then, the color, size and transparency of a content icon positioned in the area of interest 300C beneath the intersection area 200C will be varied under the control of the controller 102. It should be noted that in a position near the content-of-interest icon, namely, to the right of the content-of-interest icon in the example in FIG. 3, there will be displayed a video title and date of recording (in the example shown in FIG. 3) as attributes of a content corresponding to the content-of-interest icon under the control of the controller 102.

In this embodiment, the initial menu screen includes a manual operation button display area 400 in which it is indicated whether the Enter key 42, operation button to open the processing function menu, etc. correspond to the manual operation buttons on the operation command input unit 40 and remote commander 50 as shown in FIG. 3. In the manual operation button display area 400, there are displayed operation letters indicating which functions correspond to a circle, triangle, square and crisscross marked on the pushing surfaces of the predetermined four manual operation buttons on the operation command input unit 40 and remote commander 50.

In the example shown in FIG. 3, the manual operation button 42 with a circular mark is assigned as an Enter key and the button 41 with a triangular mark is assigned as an Option key to open the processing function menu screen. Also, the button 43 with a crisscross mark is assigned as a button to return to a preceding processing screen.

Explanation of the Editing Functions:

The video data editing method adopted in the aforementioned multimedia recorder/player according to the present invention will be explained in detail below concerning some embodiments thereof with reference to flow diagrams of the editing operations and illustrations of the display screen changes.

In the multimedia recorder/player 10 according to the aforementioned embodiment, the video icon 203 is selected in the media icon array 200 in the aforementioned crossing two-dimensional array menu and then "edit" is selected from the processing function menu displayed by making a predetermined operation to enter the edit mode. In this edit mode, an edition start point (IN point) and edition end point (OUT point) of a video content section the user wants to skip during the later playback are set while playing back the video content.

When content stored in the data storage unit 120 is played back using the above edit points, the content will be reproduced with skip over the section between the IN and OUT points. Also, when the multimedia recorder/player 10 in a record mode set using the edit points, such a content will be copied into a writable DVD, for example, with the exception of the section between the IN and OUT points.

First Embodiment of the Video Data Editing Method

FIGS. 4 to 7 show together a flow of operations made in the first embodiment of the video data editing method. The flow diagram shows operations made primarily by the controller 102 in the multimedia recorder/player 10. Also, FIGS. 8 and 9 to 15 show changes of the display screen of the monitor display 30 in the first embodiment. The first embodiment of the editing method will be explained herebelow with reference to these drawings.

It should be noted here that in the following explanation, it is assumed that the user uses only the operation command input unit 40. However, it is of course that the remote commander 50 may be used instead of the operation command input unit 40.

The controller 102 in the multimedia recorder/player 10 determines whether the Select button 46SE on the operation command input unit 40 assigned for displaying the crossing two-dimensional array menu screen has been operated (in step S101). In case the controller 102 decides in step S101 that any button other than the Select button 46SE has been operated, it will make another operation corresponding to that manual operation button (in step S102).

In case the controller 102 decides in step S101 that the Select button 46SE on the operation command input unit 40 has been operated, it goes to step S103 where it will instruct the on-screen image generation/output unit 111 to generate and output image data on the crossing two-dimensional array menu screen.

The on-screen image generation/output unit 111 will generate image data on the crossing two-dimensional array menu screen including small identification images such as stored media icons and content icons, and supplies the image data to the monitor display 30 via the display interface 112. Therefore, the display screen 31 of the monitor display 30 will display the crossing two-dimensional array menu screen having previously been explained with reference to FIG. 3.

Figure 8A:
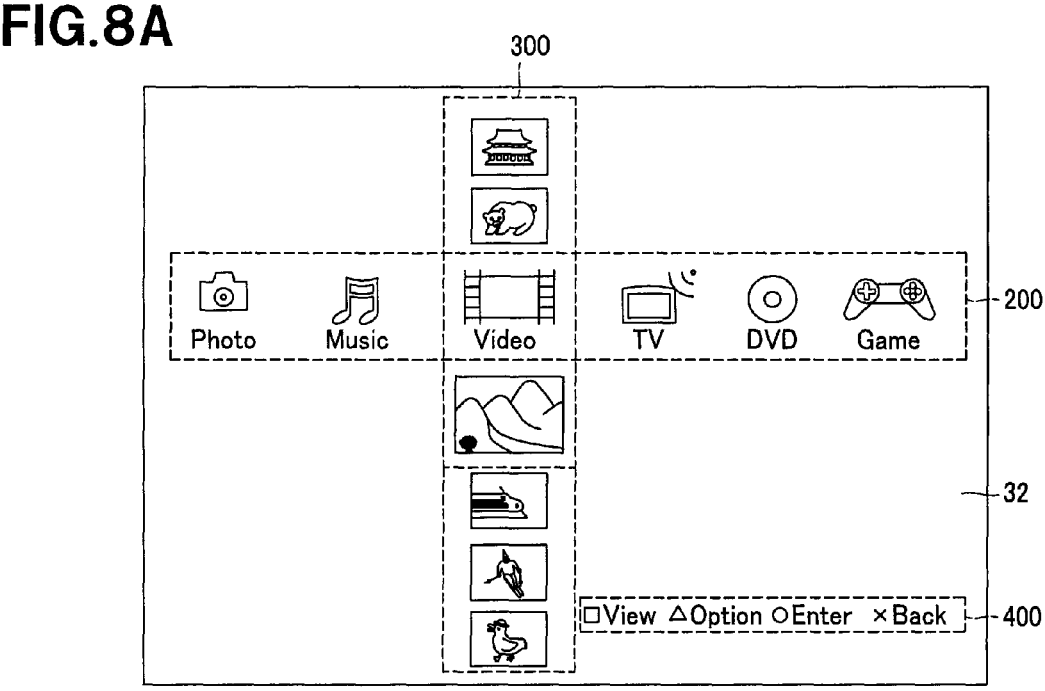
FIGS. 8A and 8B explain the user-interface screen for shifting to the edit mode in the video data editing apparatus as the embodiment of the present invention.

In step S104, the controller 102 determines whether the video icon 203 has been selected while the menu screen is being displayed. In case the controller 102 decides that the video icon 203 has not been selected, it will go to step S105 where it will make an operation corresponding to the currently-selected media icon. In case the controller 102 decides in step S104 that the video icon 203 has been selected, it will go to step S106 where it will make an arrangement to display the content icon array 300 including a video content stored in the data storage unit 120 on the display screen 31 of the monitor display 30 as shown in FIGS. 3 and 8A.

Also in step S106, operation by the user of the Upward move button (will be referred to as "Up key" hereunder) or Downward move button (will be referred to as "Down key" hereunder) on the cruciform directional button 45 will lead to acceptance of a command for selection of a specific to-be-edited video content in the video content icon array 300 displayed on the display screen 31.

In step S107, the controller 102 determines whether the manual operation button 41 as an Option button on the operation command input unit 40 has been operated. In case the controller 102 decides that the button 41 has not been operated, it goes to step S108 where it will make another operation corresponding to the operation of the button 43 as a Return button.

Figure 8B:
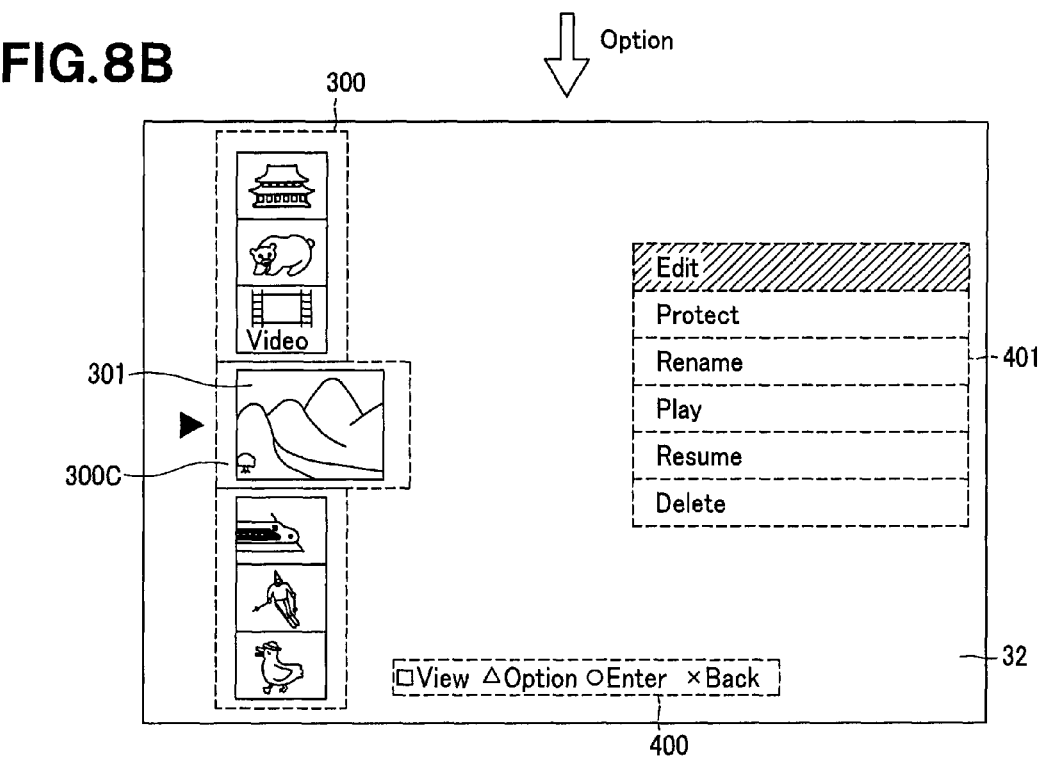

In case the controller 102 decides in step S107 that the manual operation button 41 has been operated, it goes to step S109 where it will control the on-screen image generation/output unit 111 to display an underlying processing function menu screen (option menu screen) as shown in FIG. 8B.

In the underlying processing function menu screen, the media icon array 200 is omitted and the content icon array 300 being nearly in the screen center is moved to the left end of the display screen 31 of the monitor display 30 as shown in FIG. 8B. An underlying processing function item group 401 is displayed in a space developed due to the omission of the media icon array and movement of the content icon array 300.

In step S110, the controller 102 determines whether selection of "edit" has been accepted as one item in the underlying processing function item group 401. In case the controller 102 decides that no "edit" has been accepted, it goes to step S111 where it will accept selection of another processing function and make another operation.

In case the controller 102 decides in step S110 that the selection of "edit" has been accepted as one of processing function item, it will shift the multimedia recorder/player 10 to the edit mode. At this time, a video content displayed in the area 300C and being selected is to be edited.

Figure 9:
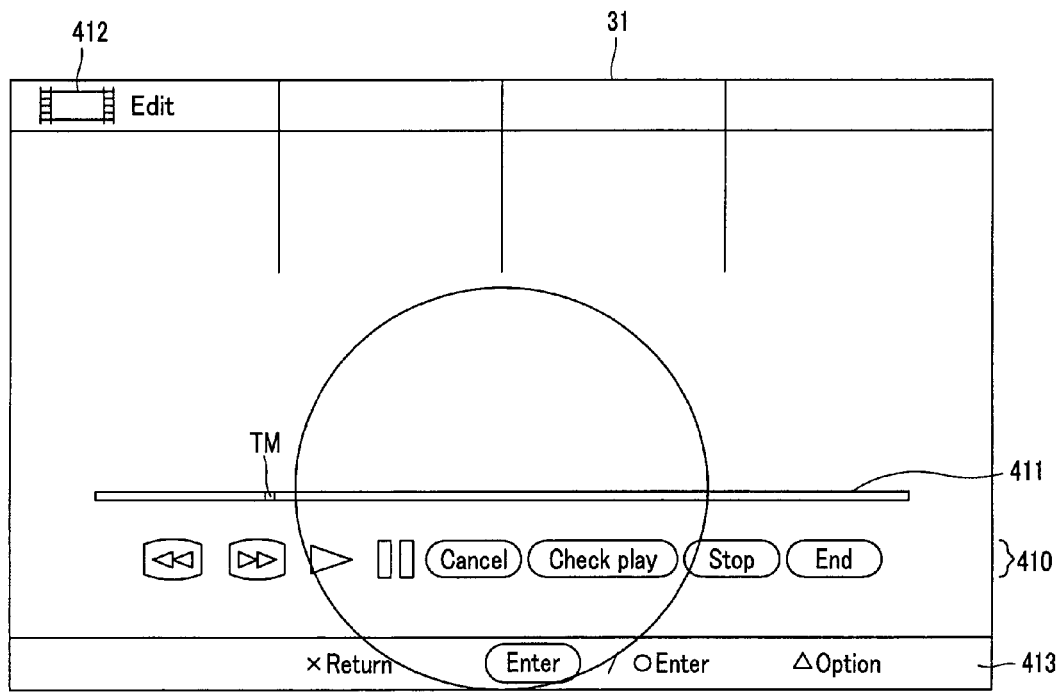
FIG. 9 explains the screen for search play in the edit mode in the video data editing apparatus as the embodiment of the present invention.

In step S112, the on-screen image generation/output unit 111 is operated under the control of the controller 102 to erase the crossing two-dimensional array menu from the display screen and display a screen of an edit-mode search play mode as shown in FIG. 9.

When in the edit-mode search play mode, a group 410 of operation buttons is displayed on the display screen 31, including a fast forward, rewind, normal play, pause, cancel, check play, stop, end and similar buttons for a video content and the cursor is positioned on any of button icons in the operation button icon group 410 as shown in FIG. 9. In this condition, the button icon on which the cursor stays is ready for operation by the user.

In this embodiment, when the multimedia recorder/player 10 in a GOP or frame mode, which will be described in detail later, the operation button icon group 410 is displayed so palely on the screen that the user will not be able to operate any operation button icon in the group 410. In this embodiment, however, by operating a predetermined button, for example, the Leftward-move button on the operation command input unit 40 or remote commander 50 (will be referred to as "Left key" hereunder) when the multimedia recorder/player 10 is in the GOP mode, the operation button icon group 410 is displayed deep and the cursor is positioned on any button icon in the operation button icon group 410. In this condition, the button icon on which the cursor stays is ready for operation by the user.

In this example, there is displayed a time bar 411 with a display mark TM that indicates which portion of the total play time of a to-be-edited video content a reproduced image being displayed shares. On this time bar 411, the direction from the left to right in the drawing plane is a direction of elapse. Therefore, a video content starts being played back at the left end of the time bar 411 and the present-time mark TM moves sequentially from the left to right as the playback time passes.

During the search play mode, the user roughly locates an edition start point and edition end point by selecting the fast forward or rewind and normal play functions to display a reproduced image of the video content on the display screen 31 and watching the reproduced image. Then, when an edition start point is roughly detected, the user presses the Pause button. In this first embodiment, operation of the Pause button during the search play mode will shift the multimedia recorder/player 10 from the search play mode to GOP mode.

It should be noted that in the upper portion of the edit mode screen, there are always displayed an edit mode indicator 412 indicating a video content edit mode and an indicator 413 indicating the correspondence between the Return button 43, Enter key 42 and operation button 41 and the manual operation buttons on the operation command input unit 40 and remote commander 50.

In step S113, the controller 102 determines, during the search play mode, whether any button icon in the operation button icon group 410 has been operated for search play. In case the controller 102 decides that no operation has been made for the search play, it goes to step S116 where it will determine whether the Return button 43 has been operated. On the contrary, in case the controller 102 decides that an operation for the search play has been made, it will go back to step S109, namely, to the screen state as shown in FIG. 8B. In case the controller 102 decides in step S116 that the Return button 43 has not been operated, it will go back to step S113 where it will monitor a command for search play.

It should be noted that also in the following explanation, the Return button 43 is always effective to return to a preceding step of operation. However, the operation after the Return button 43 is operated will not be explained in the following flow diagrams for the simplicity of explanation.

In case the controller 102 decides in step S113 that the operation for search play has been made, it goes to step S114 where it will control the on-screen image generation/output unit 111 to display a reproduced image in a playback position corresponding to the button operation on the display screen 31 of the monitor display 30 and indicate the position of the reproduced image in the entire to-be-edited video content with the mark TM on the time bar 411.

In step S115, the controller 102 monitors whether the Pause button has been operated. In case it decides that the Pause button has not been operated, it goes back to step S113. On the contrary, in case the controller 102 decides that the Pause button has been operation, it will suspend the display of the reproduced image on the display screen 31 of the monitor display 30 at the time when the Pause button has been operated, and go to step S121 in FIG. 5 where it will shift to the GOP mode (group-unit edit point select mode) in which for example, every fifteenth frame as a GOP unit is set as an edit point.

Figure 10A:
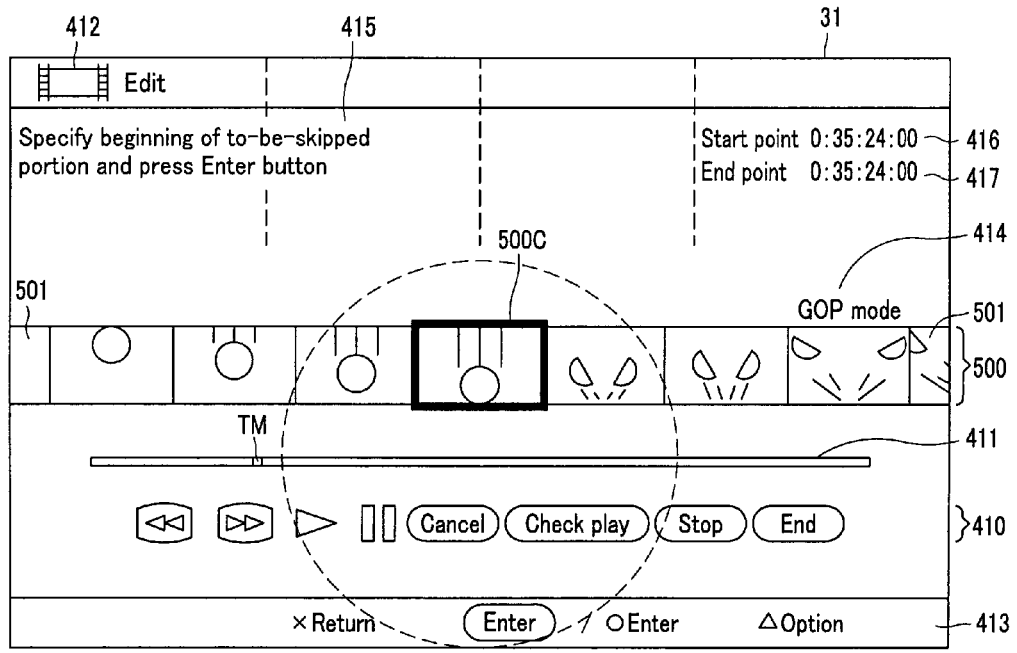
FIGS. 10A and 10B explain the edit-point setting user-interface screen in the video data editing method as the first embodiment of the present invention.

FIG. 10A shows an example of the GOP mode screen. In this GOP-mode screen, there are displayed an edit point select mode field 414 and message field 415 for prompting the edit point setting. In FIG. 10A, there are shown the edit point select mode field 414 carrying letters meaning that the edit point select mode is the GOP mode and the message field 415 carrying a prompt message for setting of an edition start point with letters.

During the GOP mode and a frame mode which will be described in detail later, the operation button icon group 410 is displayed palely and no button in the group 410 can be operated and the time bar 411 has an edit point position indicated with a mark TM thereon. That is, on the time bar 411, the mark TM indicates where the edition start point is in the entire to-be-edited content.

Further in this embodiment, when the multimedia recorder/player 10 is in the GOP or frame mode, the display screen 31 displays a start point field 416 indicating a relative time point of the edition start point from the beginning of the to-be-edited content and an end point field 417 indicating a relative time point of the edition end point from the beginning of the to-be-edited content as shown in FIGS. 10 to 15.

As shown in FIG. 10A, a GOP-unit thumbnail array 500 corresponding to the group-unit thumbnail array is displayed on the GOP mode screen. In the GOP-unit thumbnail array 500, a plurality of GOP-unit thumbnails 501 each being a small image of an I picture in each GOP is laid in a sequence of their elapsed time. In case a GOP includes 15 frames, for example, the GOP-unit thumbnails 501 are picture frames, whose interval is 0.5 sec, of the to-be-edited video content.

The entire GOP-unit thumbnail array 500 moves to the right or left depending upon the operation of the Leftward-move button (will be referred to as "Left key" hereunder) or Rightward-mode button (will be referred to as "Right key" hereunder) on the operation command input unit 40 and remote commander 50.

In this example, the GOP-unit thumbnail displayed in a central area 500C of the GOP-unit thumbnail array 500 is taken as currently selected as shown in FIG. 10A.

In the example shown in FIG. 10A, the currently-selected GOP-unit thumbnail is emphatically displayed being framed in a noticeable color such as yellow for differentiation from other GOP-unit thumbnails. Thus, the user can know at a glance a GOP-unit thumbnail of a currently-selected picture being displayed on the playback screen. It should be noted that the currently-selected GOP-unit thumbnail displayed in the central area 500C may be displayed not being framed in a noticeable color but being different in size from other GOP-unit thumbnails or being surrounded by a different color from that around the other GOP-unit thumbnails. It should be noted that this emphatic display is not essential.

By operating the Left or Right key, the user can select a GOP-unit thumbnail other than the currently-selected one being displayed in the area 500C. When the currently-selected GOP-unit thumbnail is replaced through operation of the Left or Right key, a picture displayed as a whole on the display screen 31 is also taken as a picture frame corresponding to the currently-selected GOP-unit thumbnail. Thus, the user can check the content by viewing the GOP-unit thumbnail as well as the picture displayed on the display screen 31.

In short, the GOP-unit thumbnail array 500 and a frame-unit thumbnail array 600 which will further be described later are displayed in semi-transparent state with the α-blending technique on a picture frame corresponding to a currently-selected GOP-unit thumbnail or frame-unit thumbnail. This is also true with the following explanation.

Namely, when the multimedia recorder/player 10 is in the GOP mode, the controller 102 monitors in step S122 whether the Left or Right key on the operation command input unit 40 or remote commander 50 has been operated. In case the controller 102 decides that the Left or Right key has been operated, it will go to step S123 where it will control the on-screen image generation/output unit 111 to move the entire GOP-unit thumbnail array 500 leftward or rightward for selecting a thumbnail other than the currently-selected GOP-unit thumbnail.

In this embodiment, the controller 102 is so adapted that when the user operates the Enter button on the operation command input unit 40 or remote commander 50 during the GOP mode, it can set a GOP-unit frame (I picture) as an edit point.

Also in this embodiment, when the user operates the Up key or Option button on the operation command input unit 40 or remote commander 50 during the GOP mode, the controller 102 shifts the multimedia recorder/player 10 to a frame mode (frame-unit edit-point select mode) in which one of a plurality of picture frames included in a GOP corresponding to the currently-selected GOP-unit thumbnail can be selected and set as an edit point.

Also in this embodiment in the GOP mode, when the operation command input unit 40 or remote commander 50 has not been operated for more than a predetermined length of time, the GOP mode itself is shifted to the frame mode.

In this embodiment, in case the controller 102 decides in step S122 that the Left or Right key has been operated or after a thumbnail other than the currently-selected GOP-unit thumbnail has been selected in step S123, it goes to step S124 where it will determine whether the Enter key 42 has been operated. In case the controller 102 decides in step S124 that the Enter key 42 has been operated, it goes to step S141 in FIG. 6 where it will determine whether the Enter key 42 has been operated for the first time after the edit mode is started, that is, when a first edit point (first edition start point) has been set.

In case the controller 102 decides in step S141 that the Enter key 42 has been operated when the first edit point is set, it goes to step S142 where it will take, as frame position information on the edition start point (IN point), information on the position, in a to-be-edited content, of a picture frame corresponding to the currently-selected GOP-unit thumbnail, for example, information on a relative time point of the picture frame at the edit point from the beginning of the to-be-edited content, and write the time point information in correspondence to data in the to-be-edited content in the data storage unit 120.

According to this embodiment, the start point field 416 on the display screen 31 will then have indicated with letters therein the position of a relative time point of the edition start point from the beginning of the to-be-edited content and the time bar 411 will have indicated thereon with a mark TM to which time point in the entire to-be-edited content the edition start point corresponds. It should be noted that at this time, the end point field 417 will then have indicated with letters therein the same time point as in the start point field 416.

Thereafter, the controller 102 goes to step S143 where it will shift the multimedia recorder/player 10 to a state in which an edition end point is settable and acceptable. In setting and acceptance of the edition end point, the controller 102 will fix the content of the start point field 416 while changing the content of the end point field 417 correspondingly to the changing, by the user, of the edition end point.

Also, the time bar 411 indicates the edition end point with a mark TM along with a section mark 418 that informs the user of a section from a last set edition start point to an edition end point going to be set. The section mark 418 from the edition start point to edition end point is indicated on the time bar 411 in a color different from that of the rest of the time bar 411. For example, the time bar 411 is displayed in blue, while the section mark 418 from the edition start point to edition end point is indicated in white.

Next in step S144, the controller 102 determines whether the Left or Right key has been operated. In case the controller 102 decides in step S144 that the Left or Right key has been operated, it goes back to step S123 where it will select a thumbnail other than the currently-selected GOP-unit thumbnail from the GOP-unit thumbnail array 500, and will repeat the operations in step S123 and subsequent steps as shown in FIG. 10B.

Figure 10B:
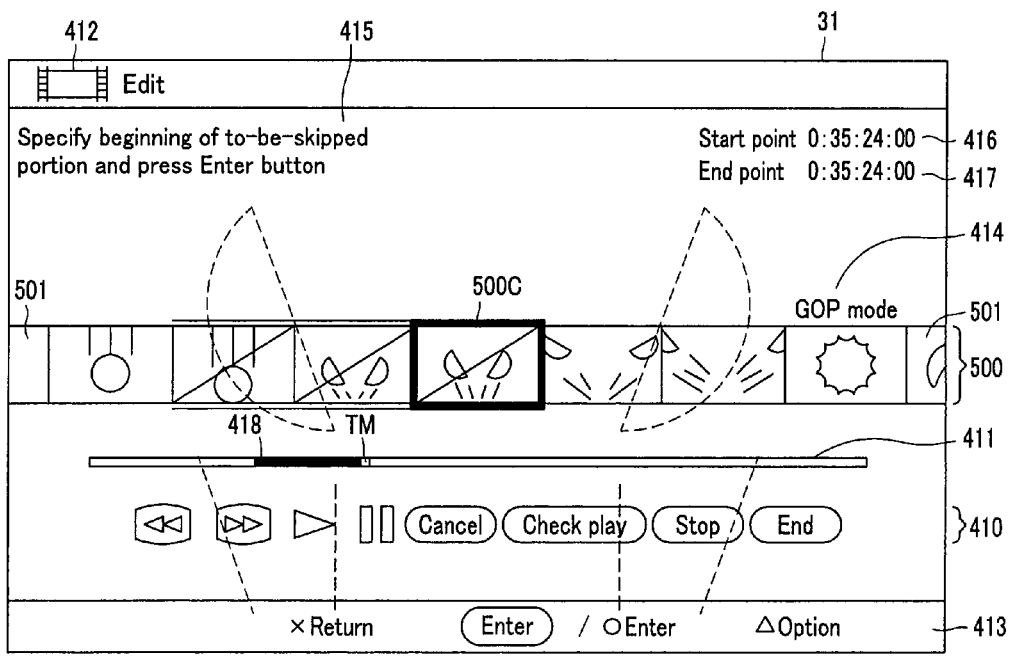

At this time, in case the edition end point is settable and acceptable, the message field 415 indicates a prompt message for setting and entry of an edition end point, the indicated value in the start point field 416 is fixed and only the indicated value in the end point field 417 is changed and indicated in response to a user's operation for search of an edit point, as shown in FIG. 10B. The time bar 411 will indicate a section mark 418 between edition start and end points as shown smudged in FIG. 10B.

Figure 6:
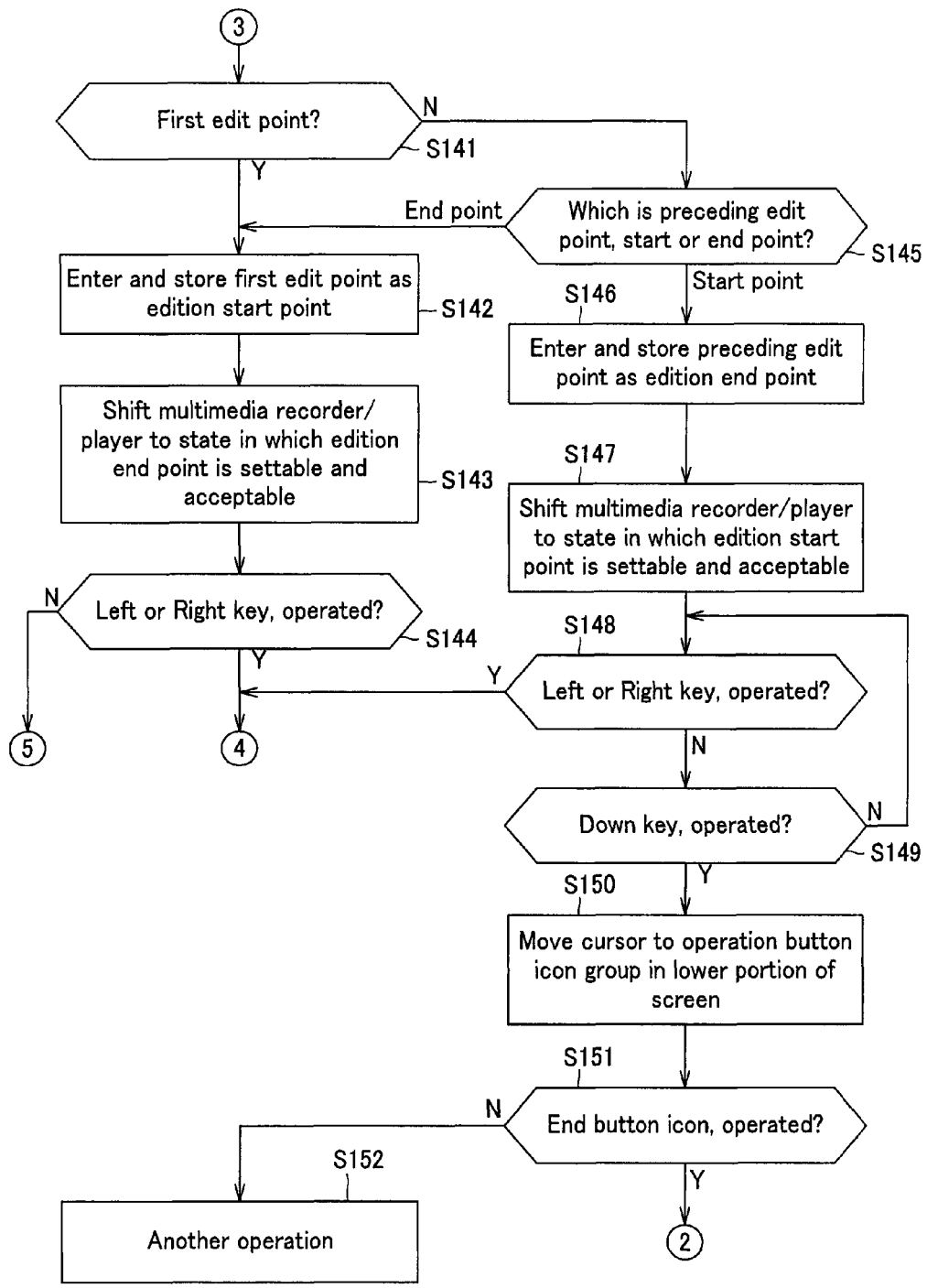
FIG. 6 shows a part of the flow diagram explaining the operations of the essential components of the video data editing method as the first embodiment of the present invention.

As in the aforementioned example, when the controller 102 decides in step S124 that the user has operated the Enter key 42 during the GOP mode, it will decide in step S141 in FIG. 6 that the edit point is not any first one. So the controller 104 will go to step S145. In step S145, the controller 102 will determine whether the last set edit point is an edition start point or edition end point. Since the controller 102 decides here that the last set edit point is an edition start point, it goes to step S146 where it will enter the set edit point as frame position information on an edition end point (OUT point) ad write it in correspondence to data in a to-be-edited content in the data storage unit 120.

It should be noted that in case the controller 102 decides in step S145 that the last set edit point is an edition end point, it goes back to step S142 where it will repeat the operations in step S142 and subsequent steps.

After the storage of the edition end point is complete in step S146, the controller 102 goes to step S147 where it will shift the multimedia recorder/player 10 to a state in which an edition start point is settable and acceptable and to step S148 where it will determine whether the Left or Right key has been operated. In case the controller 102 decides in step S148 that the Left or Right key has been operated, it goes back to step S123 where it will display a prompt for setting and setting of an edition start point in the message field 415 as shown in FIG. 10A, select a thumbnail other than the currently-selected GOP thumbnail in the GOP-unit thumbnail array 500 and repeat the operations in step S123 and subsequent steps.

As in the aforementioned example, the controller 102 accepts setting and entry of an edition start point and stores, in response to the operation of the Enter key 42, frame position information on the set edition start point into the data storage unit 120 in correspondence to the to-be-edited content. Also, the controller 102 will accept setting and entry of an edition end point and store, in response to the operation of the Enter key 42, frame position information on the set edition end point into the data storage unit 120 in correspondence to the to-be-edited content.

With the above operations, it is possible to set edit points in units of 15 frames, for example, corresponding to the GOP-unit thumbnail when the multimedia recorder/player 10 is in the GOP mode.

In case the controller 102 decides in step S148 that the Left or Right key has been operated, it goes to step S149 where it will determine whether the Down key has been operated. In case the controller 102 decides that the Down key has not been operated, it will go back to step S148.

In case the controller 102 decides in step S149 that the Down key has been operated, it goes to step S150 where it will shift the multimedia recorder/player 10 from the GOP mode to check play mode, display the operation button icon group 410 in the lower portion of the display screen deeply and move the cursor to the operation button icon group 410.

In step S151, the controller 102 determines whether the End button icon in the operation button icon group 410 has been operated. In case the controller 102 decides that the End button icon has been operated, it goes back to step S109 where it will display the option menu screen on the display screen 31.

In case the controller 102 decides in step S151 that the End button icon has not been operated, it goes to step S152 where it will make another operation corresponding to the operation of the play button icon, fast forward icon, rewind icon or the like.

As having previously been described, this embodiment can set edit points even in units of frames included in GOP by shifting the multimedia recorder/player 10 from the GOP mode to frame mode. That is, by operating the Up key or operation button 41 in the GOP mode, it is possible to shift the multimedia recorder/player 10 from the GOP mode to frame mode. In the GOP mode, it is possible to shift the multimedia recorder/player 10 from the GOP mode to frame mode also when no operation has been made for more than the predetermined length of time.

Figure 5:
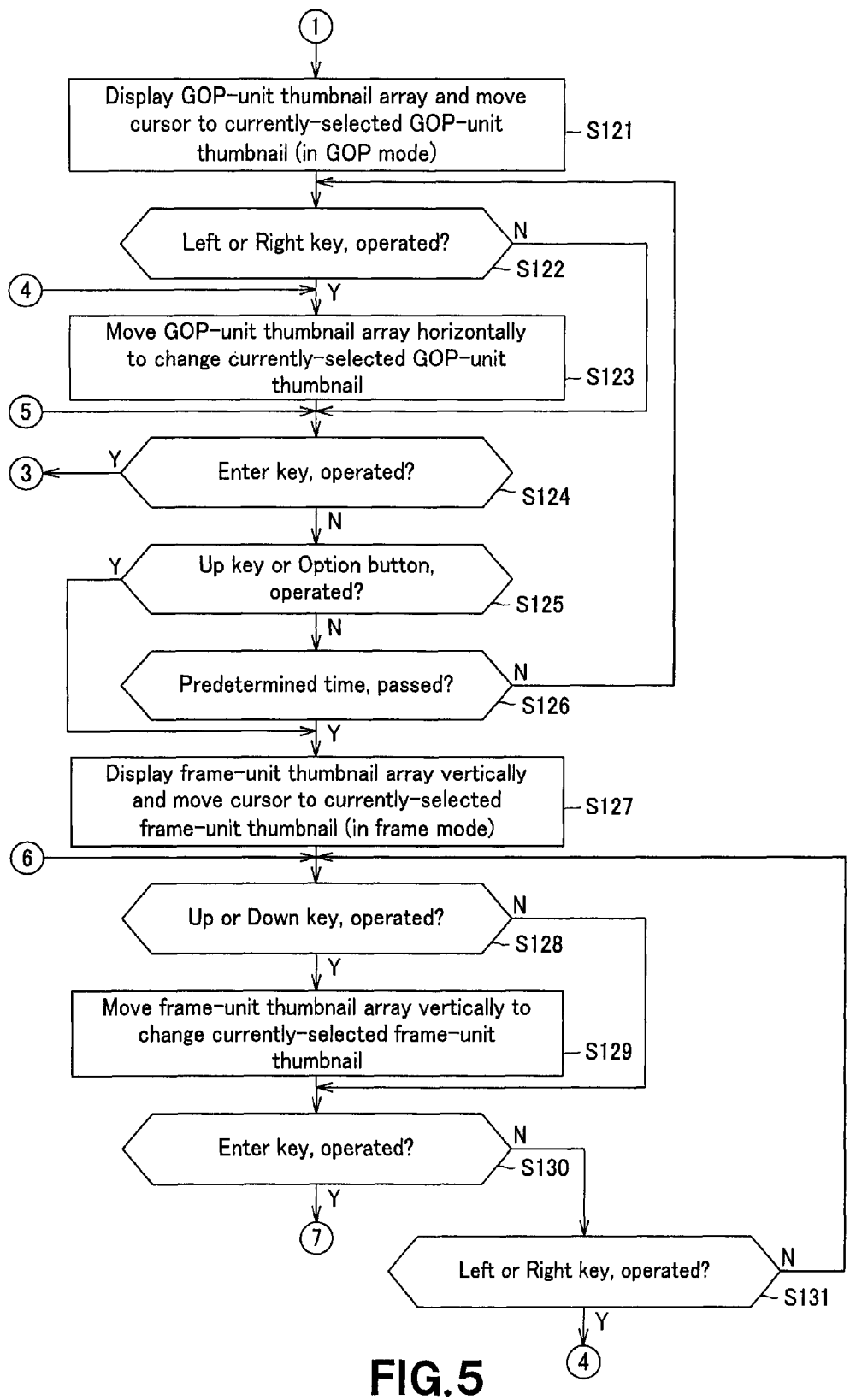
FIG. 5 shows a part of the flow diagram explaining the operations of the essential components of the video data editing method as the first embodiment of the present invention.

In case the controller 102 decides in step S124 in FIG. 5 that the Enter key 42 has not been operated in the GOP mode, it goes to step S125 where it will determine whether the Up key or operation button 41 has been operated. In case the controller 102 decides in step S125 that the Up key or operation button 41 has not been operated, it goes to step S126 where it will determine whether no operation has been made for more than the predetermined length of time. In case the controller 102 decides that no operation has been made for more than the predetermined length of time, it goes back to step S122 where it will monitor whether the Left or Right key is operated.

In case the controller 102 decides in step S125 that the Up key or operation button 41 has been operated or in case it decides in step S126 that no operation has been made for more than the predetermined length of time, it goes to step S127 where it will shift from the GOP mode to frame mode.

Figure 11A:
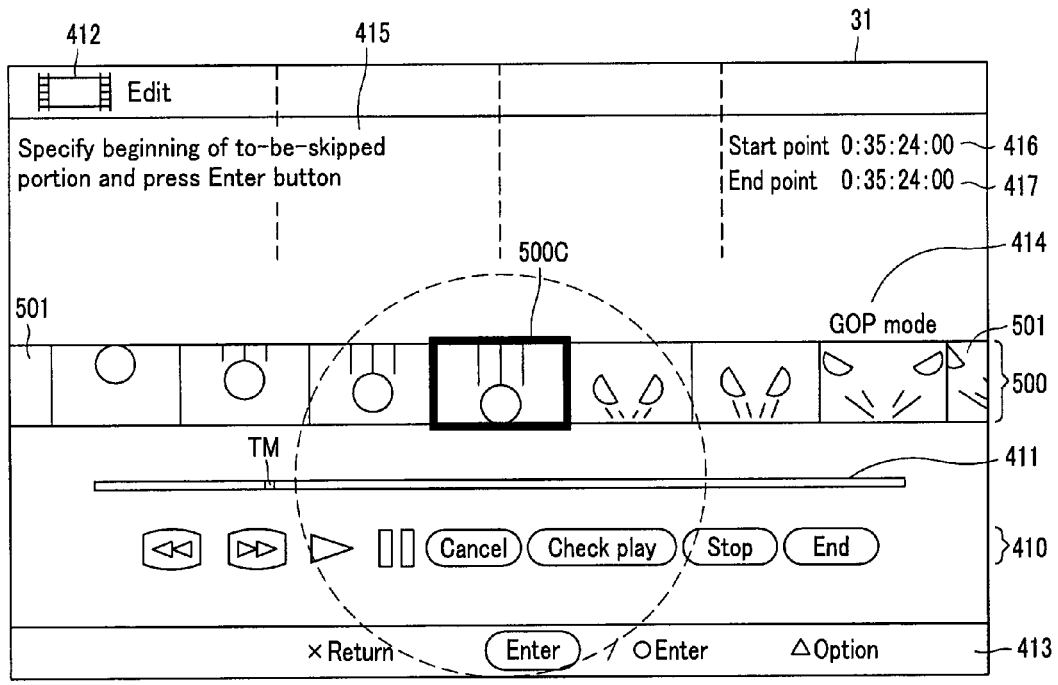
FIGS. 11A and 11B explain the edit-point setting user-interface screen in the video data editing method as the first embodiment of the present invention.
Figure 11B:
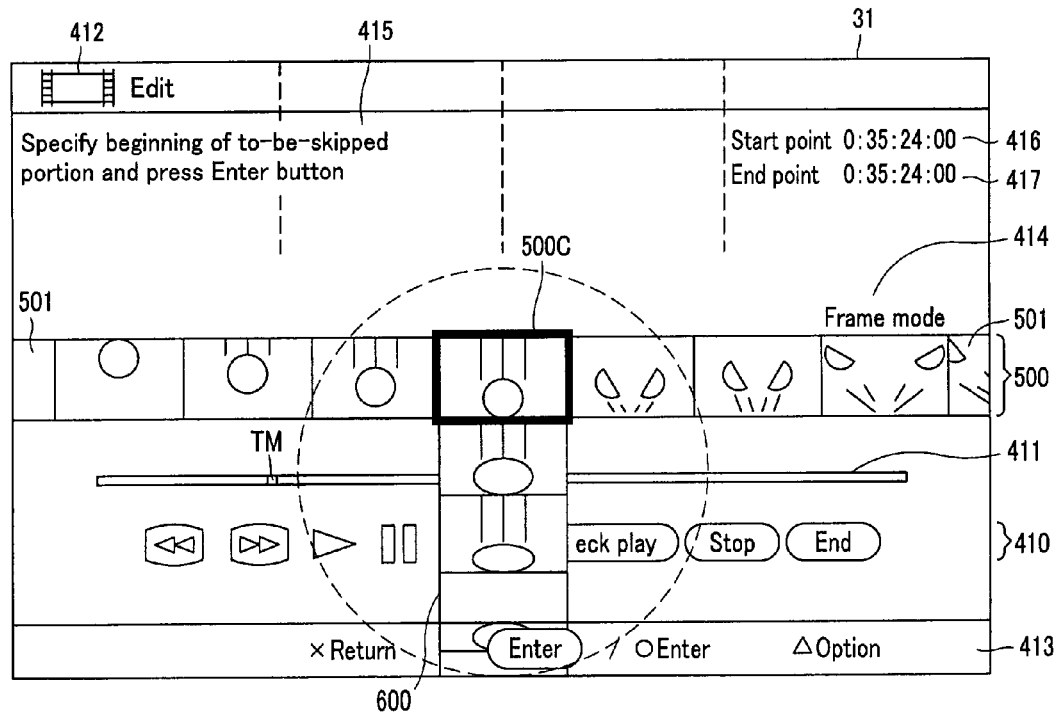

More specifically, when the GOP mode shown in FIG. 11A, for example, is shifted to the frame mode, a screen as shown in FIG. 11B will appear. That is, the controller 102 controls the on-screen image generation/output unit 111 to display a frame-unit thumbnail array 600 in which thumbnails of a plurality of picture frames (which will be referred to as "frame-unit thumbnail" hereunder) included in a GOP corresponding to the currently-selected GOP-unit thumbnail in the GOP-unit thumbnail array 500 is laid in a sequence of their elapsed time below the area 500C.

In this example, the direction from the top toward the bottom of the display screen is taken as a direction in which the time passes. Therefore, the plurality of picture frames included in the frame-unit thumbnail array 600 includes a plurality of frames (15 frames, for example) between a currently-selected GOP-unit thumbnail in the area 500C and a GOP-unit thumbnail at the right of the area 500C.

In the example shown in FIG. 11B, the thumbnail in the area 500C is not changed at the first time point when the multimedia recorder/player 10 has shifted from the GOP mode to frame mode. This is intended to make the GOP-unit thumbnail in the area 500C and frame-unit thumbnail flush at their tops with each other in order to minimize something incongruous with the display after the mode shift. On this account, the frame-unit thumbnail array 600 is displayed only below the area 500C to keep the thumbnail in the area 500C unchanged.

Figure 12A:
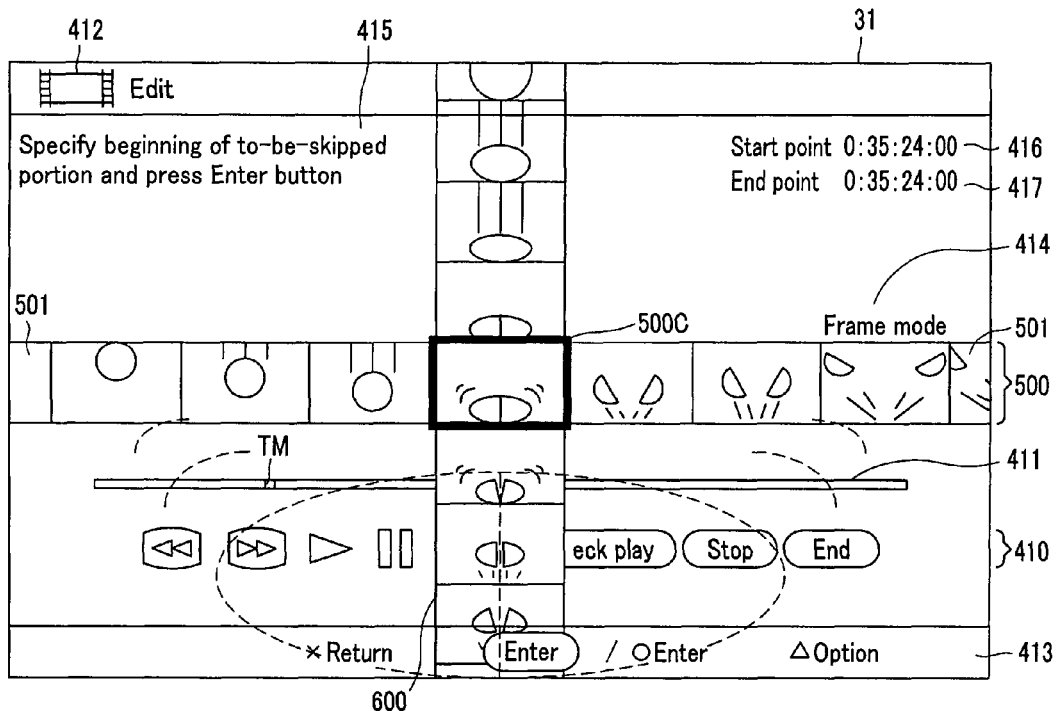
FIGS. 12A and 12B explain the edit-point setting user-interface screen in the video data editing method as the first embodiment of the present invention.

By operating the Up key on the operation command input unit 40 or remote commander 50 in this condition, it is possible to move the entire frame-unit thumbnail array 600 upward as shown in FIG. 12A. Also, by operating the Down key on the operation command input unit 40 or remote commander 50, it is possible to move the entire frame-unit thumbnail array 600 downward.

In this embodiment, the GOP-unit thumbnail array 500 and frame-unit thumbnail array 600 are laid to intersect each other in a position of interest (position of the currently-selected thumbnail) quite as in the crossing two-dimensional array menu as shown in FIG. 12A. Thus, the first embodiment is advantageously friendly to the user in that edit points can easily be set and set as in the case of the crossing two-dimensional array menu.

Also, the frame-unit thumbnail in the frame-unit thumbnail array 600 is displayed in the central area 500C and emphatically displayed being framed in yellow, for example, for differentiation from other thumbnails similarly to the currently-selected GOP-unit thumbnail.

During the frame mode, the frame-unit thumbnail array 600 can be moved vertically by operating the Up or Down key to change the currently-selected frame-unit thumbnail in the area 500C.

When the currently-selected frame-unit thumbnail is changed by operating the Up or Down key, a picture displayed as a whole on the display screen 31 is also taken as a picture frame corresponding to the currently-selected frame-unit thumbnail. Thus, the user can check the content by viewing the frame-unit thumbnail as well as a picture displayed on the display screen 31.

By operating the Enter key 42 on the operation command input unit 40 or remote commander 50 when the multimedia recorder/player 10 is in this frame mode, it is possible to set edit points in units of a picture frame.

Figure 13A:
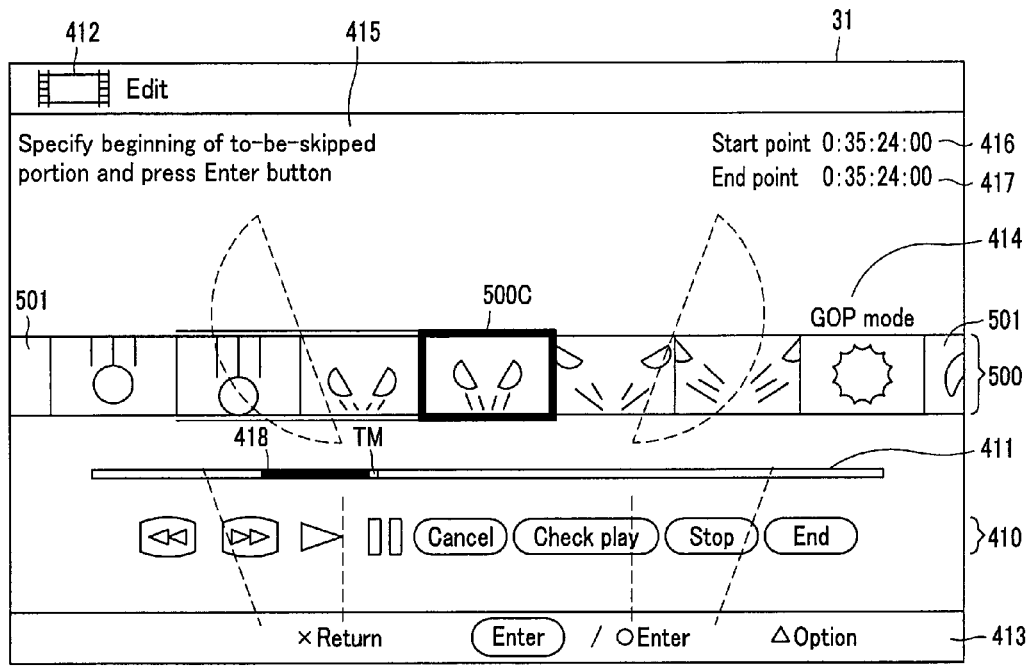
FIGS. 13A and 13B explain the edit-point setting user-interface screen in the video data editing method as the first embodiment of the present invention.

In this embodiment, when the Left or Right key is operated during the frame mode, the controller 102 determines the key operation to have been made for shift from the frame mode to GOP mode, erases the frame-unit thumbnail array 600, thus displays only the GOP-unit thumbnail array 500 and changes the currently-selected GOP-unit thumbnail in a direction corresponding to the Left or Right key operated, as will be shown in FIG. 13A.

Then, by operating the Up key or operation button 41 again during the GOP mode, it is possible to shift the multimedia recorder/player 10 to the frame mode. With these operations, it is possible in this embodiment to set GOP-unit edit points or frame-mode edit points by shifting the multimedia recorder/player 10 between the GOP and frame modes.

The above-mentioned operations in the frame mode will further be explained below with reference to the flow diagrams in FIGS. 5 and 7.

Figure 12B:
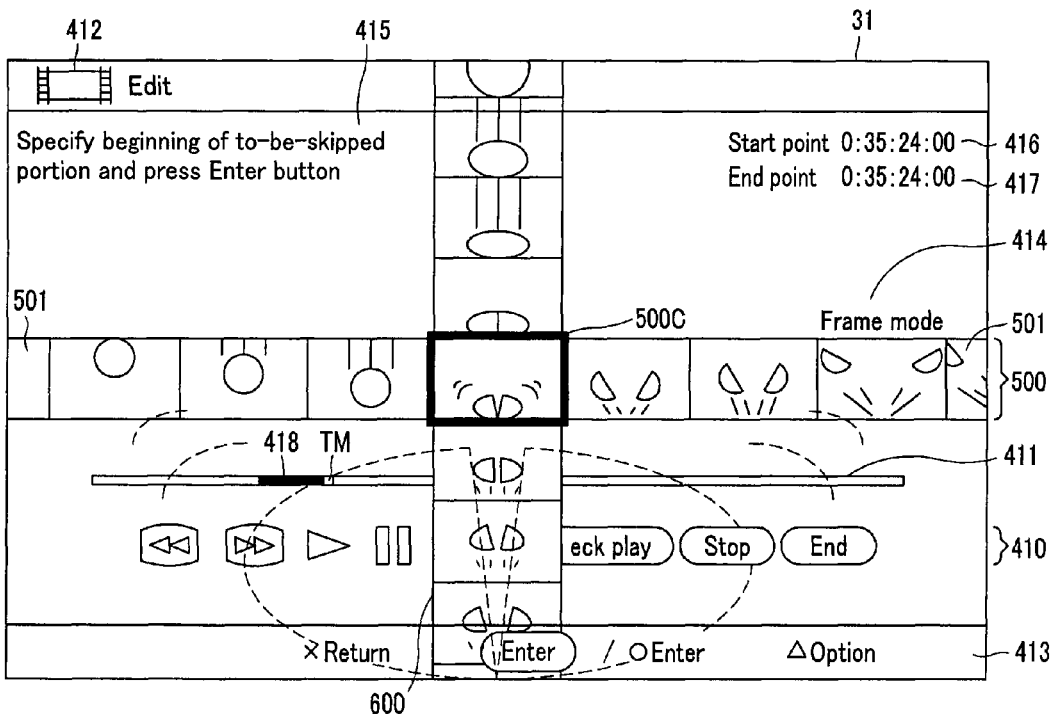

During the frame mode, the controller 102 determines in step S128 in FIG. 5 whether the Up or Down key has been operated. In case the controller 102 decides that the Up or Down key has been operated, it moves the entire frame-unit thumbnail array 600 vertically on the display screen 31 in a direction corresponding to the key operated to change the currently-selected frame-unit thumbnail in the area 500C as shown in FIGS. 12A and 12B.

Next, the controller 102 determines in step S130 whether the Enter key 42 has been operated. Also in case the controller 102 decides in step S128 that the Up or Down key has not been operated, it goes to step S130 where it will determine whether the Enter key 42 has been operated.

Figure 7:
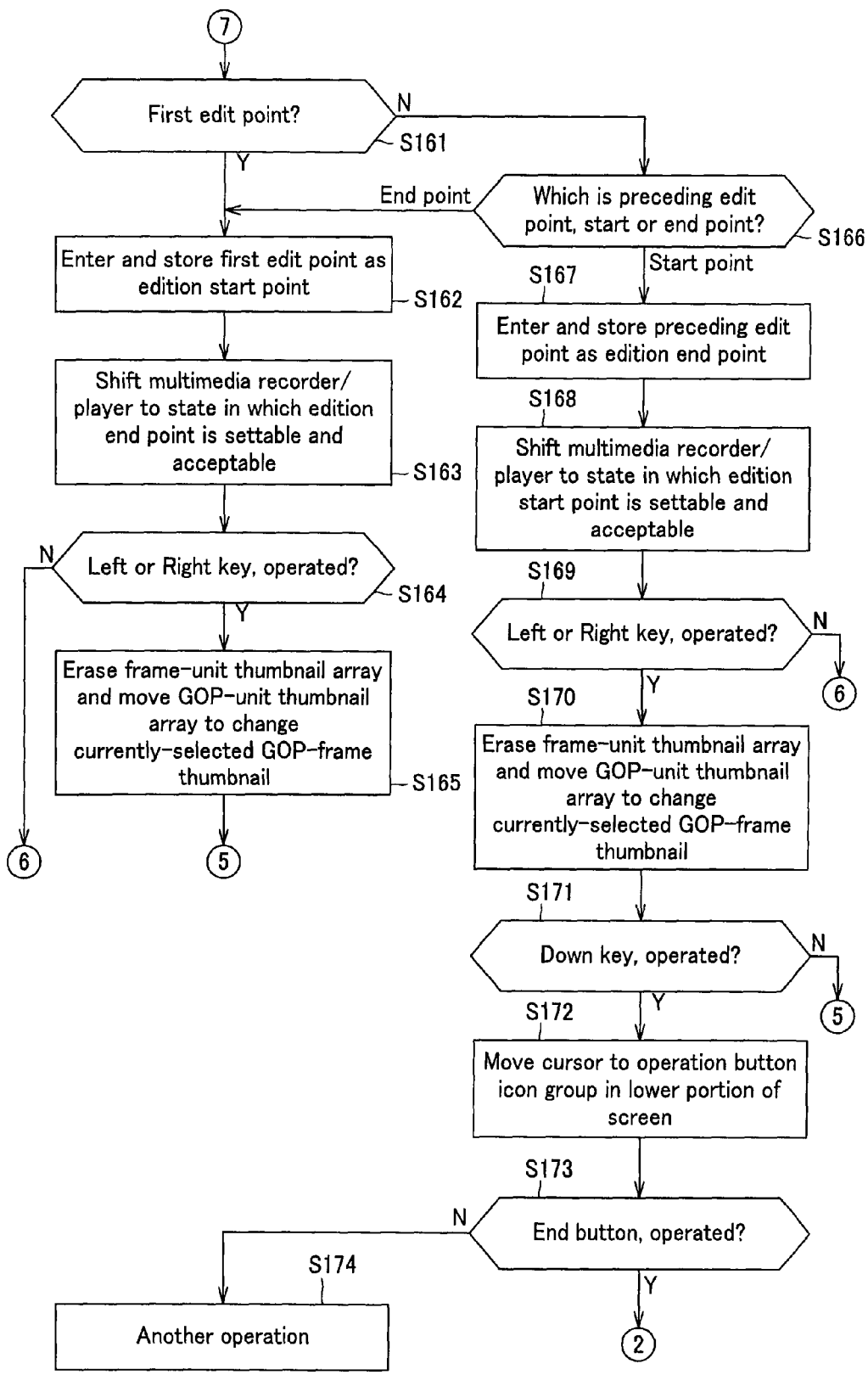
FIG. 7 shows a part of the flow diagram explaining the operations of the essential components of the video data editing method as the first embodiment of the present invention.

In case the controller 102 decides in step S130 that the Enter key 42 has been operated, it goes to step S161 in FIG. 7 where it will determine whether the Enter key 42 has been operated for the first time after the edit mode is started, that is, whether the set edit point is the first edition start point.

In case the controller 102 decides in step S161 that the set edit point is the first edition start point, it goes to step S162 where it will determine, as frame position information on the edition start point (IN point), information on the position, in a to-be-edited content, of a picture frame corresponding to the currently-selected frame-unit thumbnail, for example, information on a relative time point of the picture frame at the edit point from the beginning of the to-be-edited content, and write the time point information in correspondence to data in the to-be-edited content in the data storage unit 120.

Thereafter, the controller 102 goes to step S163 where it will shift the multimedia recorder/player 10 to a state in which an edition end point is settable and acceptable and determine in step S164 whether the Left or Right key has been operated. In case the controller 102 decides in step S164 that the Left or Right key has not been operated, it goes back to step S128 where it will repeat the operations in step S128 and subsequent steps.

At this time, in case the edition end point is settable and acceptable when the multimedia recorder/player 10 is in the frame mode, the message field 415 indicates a prompt message for setting and entry of an edition end point, the indicated value in the start point field 416 is fixed and only the indicated value in the end point field 417 is changed and indicated in response to a user's operation for search of an edit point. The time bar 411 will indicate a section mark 418 between edition start and end points as having previously been described.

As in the aforementioned example, in case the controller 102 decides in step S130 that the user has operated the Enter key 42 when the multimedia recorder/player 10 is in the frame mode, it will decide in step S161 in FIG. 7 that the edit point is not any first one. So the controller 104 will go to step S166. In step S166, the controller 102 will determine whether the last set edit point is an edition start point or edition end point. Since the controller 102 decides here that the last set edit point is an edition start point, it goes to step S167 where it will determine the set edit point as frame position information on an edition end point (OUT point) ad write it in correspondence to data in a to-be-edited content in the data storage unit 120.

It should be noted that in case the controller 102 decides in step S166 that the last set edit point is an edition end point, it goes back to step S162 where it will repeat the operations in step S162 and subsequent steps.

After the storage of the edition end point is complete in step S167, the controller 102 goes to step S168 where it will shift the multimedia recorder/player 10 to a state in which an edition start point is settable and acceptable and to step S169 where it will determine whether the Left or Right key has been operated. In case the controller 102 decides in step S169 that the Left or Right key has not been operated, it goes back to step S128 where it will repeat the operations in step S128 and subsequent steps.

In case the controller 102 decides in step S169 that the Left or Right key has been operated, it goes to step S170 where it will determine the key operation to be a shift from the frame mode to GOP mode, erase the frame-unit thumbnail array 600, thus display only the GOP-unit thumbnail array 500 and change the currently-selected GOP-unit thumbnail in the GOP-unit thumbnail array 500 correspondingly to either the Left or Right key operated by the user.

Next in step S171, the controller 102 determines whether the Down key has been operated. In case the controller 102 decides that the Down key has not been operated, it will go back to step S124.

In case the controller 102 decides in step S171 that the Down key has been operated, it goes to step S172 where it will shift the multimedia recorder/player 10 from the GOP mode to frame mode and display the operation button icon group 410 in the lower portion of the display screen deeply and move the cursor to the operation button icon group 410.

Then, the controller 102 determines in step S173 whether the End button icon in the operation button icon group 410 has been operated. In case the controller 102 decides that the End button icon has been operated, it goes back to step S109 where it will display the option menu screen on the display screen 31.

In case the controller 102 decides in step S173 that the End button icon has not been operated, it goes to step S174 where it will make another operation corresponding to the operation of the play button icon, fast forward icon, rewind icon or the like.

In case the controller 102 decides in step S164 that the Left or Right key has been operated, it goes to step S165 where it will determine the key operation to be a shift to the GOP mode, erase the frame-unit thumbnail array 600, thus display only the GOP-unit thumbnail array 500 and change the currently-selected GOP-unit thumbnail in the GOP-unit thumbnail array 500 correspondingly to either the Left or Right key operated by the user. Thereafter, the controller 102 goes back to step S124 where it will repeat the operations in step S124 and subsequent steps With the above operations, it is possible during the frame mode to set edit points in units of a picture frame corresponding to the frame-unit thumbnail.

In the first embodiment, when a specific frame in GOP corresponding to a certain GOP-unit thumbnail is set as an edition start point while a specific frame in GOP corresponding to another GOP-unit thumbnail is set as an edition end point, there will be made the following control operations and edit point setting operations. These control operations and edit point setting operations will be explained below with reference to changes on the display screen.

First when the multimedia recorder/player 10 is in the GOP mode as shown in FIG. 11A, the user operates the Left or Right key to select GOP which will include a picture frame which should desirably be an edition start point with a corresponding GOP-unit thumbnail being taken as a currently-selected GOP-frame thumbnail in the area 500C. Upon entry of the currently-selected GOP-unit thumbnail, the user operates the Up key or Option button to shift the multimedia recorder/player 10 from the GOP mode to frame mode and display a frame mode screen as shown in FIG. 11B.

Then the user operates the Up or Down key during the frame mode to move the frame-unit thumbnail array 600 as shown in FIGS. 12A and 12B, to thereby select a frame-unit thumbnail corresponding to the picture frame as the edition start point as a currently-selected frame-unit thumbnail in the area 500C.

Then, the user operates the Enter key 42 to set, as an edition start point, a picture frame corresponding to the currently-selected frame-unit thumbnail on the frame mode screen as shown in FIG. 12B, for example. Then, data on the set edition start point is stored into the data storage unit 120 correspondingly to a to-be-edited video content as having previously been described.

Next, the user operates the Left or Right key to select GOP that will include the picture frame as the edition end point as shown in FIG. 12B. Then, the multimedia recorder/player 10 is shifted from the GOP mode to frame mode, thus the GOP mode screen appears as shown in FIG. 13A, and the currently-selected GOP-unit thumbnail in the area 500C is changed correspondingly to the operation of the Left or Right key. Further, the user operates the Left or Right key to select the GOP which will include the picture frame which is to be the edition end point by taking a corresponding GOP-unit thumbnail as the currently-selected GOP-unit thumbnail in the area 500C.

At this time, a section from the edition start point to the currently-selected GOP-unit thumbnail is indicated as a section mark 418 on the time bar 411 and all the thumbnails including from the GOP-unit thumbnails in GOP including a frame as the edition start point to the GOP-unit thumbnail including a frame as the edition end point are emphatically displayed being framed in a noticeable color, for example, as shown in FIG. 13A. In FIG. 13A, this emphasis is made using a doublet added to the GOP-unit thumbnail in a corresponding section.

Figure 13B:
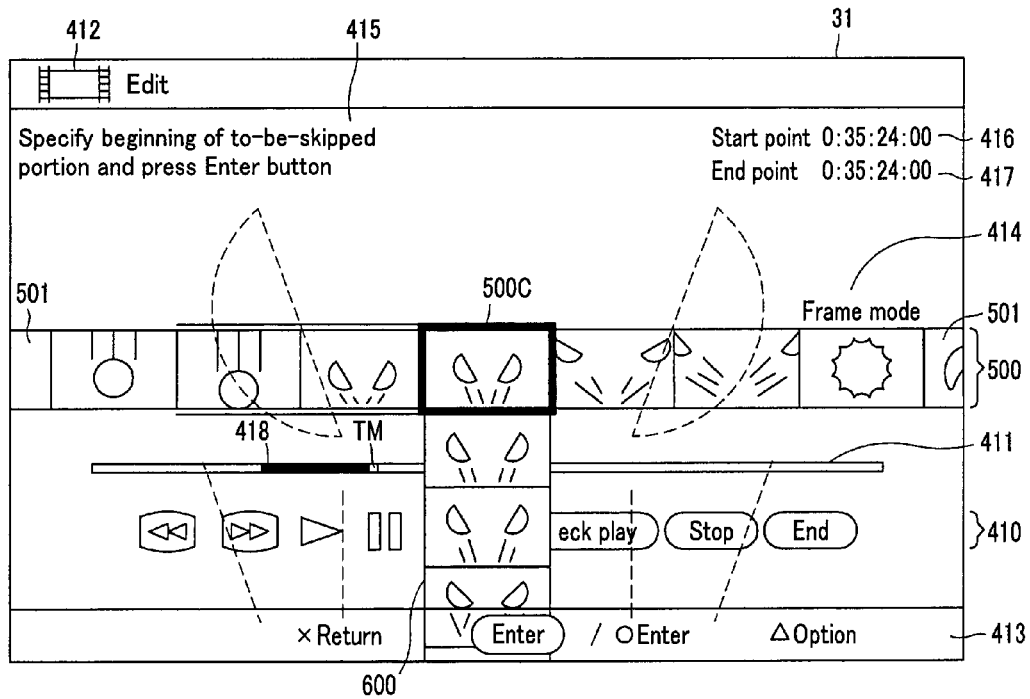

Upon selection of the currently-selected GOP-unit thumbnail, the user operates the Up key or Option button to shift the multimedia recorder/player 10 from the GOP mode to frame mode and display a frame mode screen as shown in FIG. 13B.

Figure 14A:
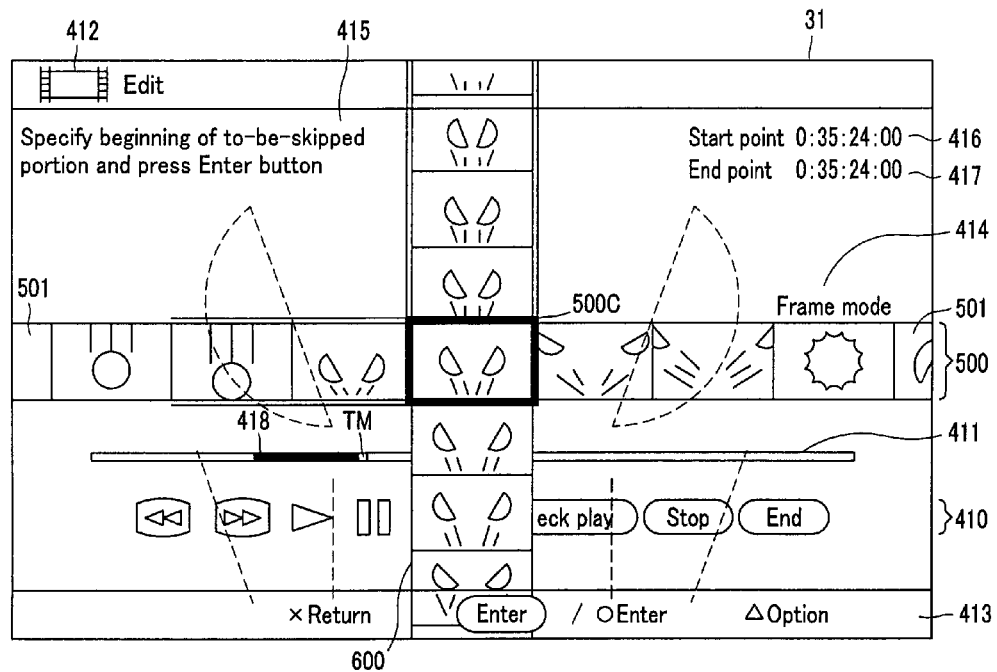
FIGS. 14A and 14B explain the edit-point setting user-interface screen in the video data editing method as the first embodiment of the present invention.
Figure 14B:
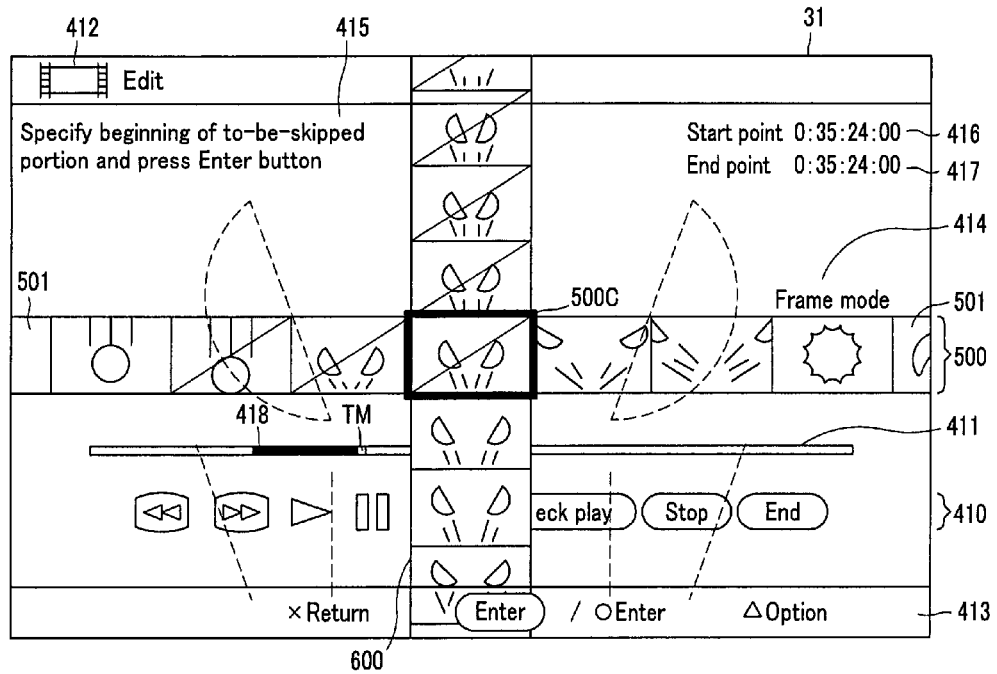

Then, the user operates the Up or Down key during the frame mode to move the frame-unit thumbnail array 600 as shown in FIGS. 14A and 14B, to thereby select a frame-unit thumbnail corresponding to the picture frame as the edition end point by taking it as the currently-selected frame-unit thumbnail in the area 500C.

Further, the user operates the Enter key 42 to set a picture frame corresponding to the frame-unit thumbnail as an edition end point on the frame mode screen as shown in FIG. 14B, for example. Then, data on the edition end point thus set is stored into the data storage unit 120 in correspondence to a to-be-edited video content as having previously been described.

At this time, the user is warned of the GOP-unit thumbnail array 500 and frame-unit thumbnail array 600 with a doublet being appended to a section from the edition start point to the edition end point as shown in FIG. 14A before a frame-unit thumbnail as the edition end point is selected and set.

When the user operates the Enter key 42 for an edition start point, thumbnails including from a GOP-unit thumbnail including the edition start point to a frame-unit thumbnail at an edition end point are displayed on the display screen 31 as well in such a manner that they are differentiated from other thumbnails as shown in FIG. 14B. Each of the thumbnails is displayed being hatched in FIG. 14B. Actually, however, no hatching is used but the thumbnails are displayed in different colors, for example, for such differentiation between the thumbnails.

When setting of a set of edition start and end points of a section is complete with the above operations and is followed by setting edition start and end points of another section, the user operates either the Left or Right key. Then, the state shown in FIG. 11A will be restored and next edition start and end points be set similarly. Thus, it is possible to set edition start and end points of each of necessary sections.

Figure 15:
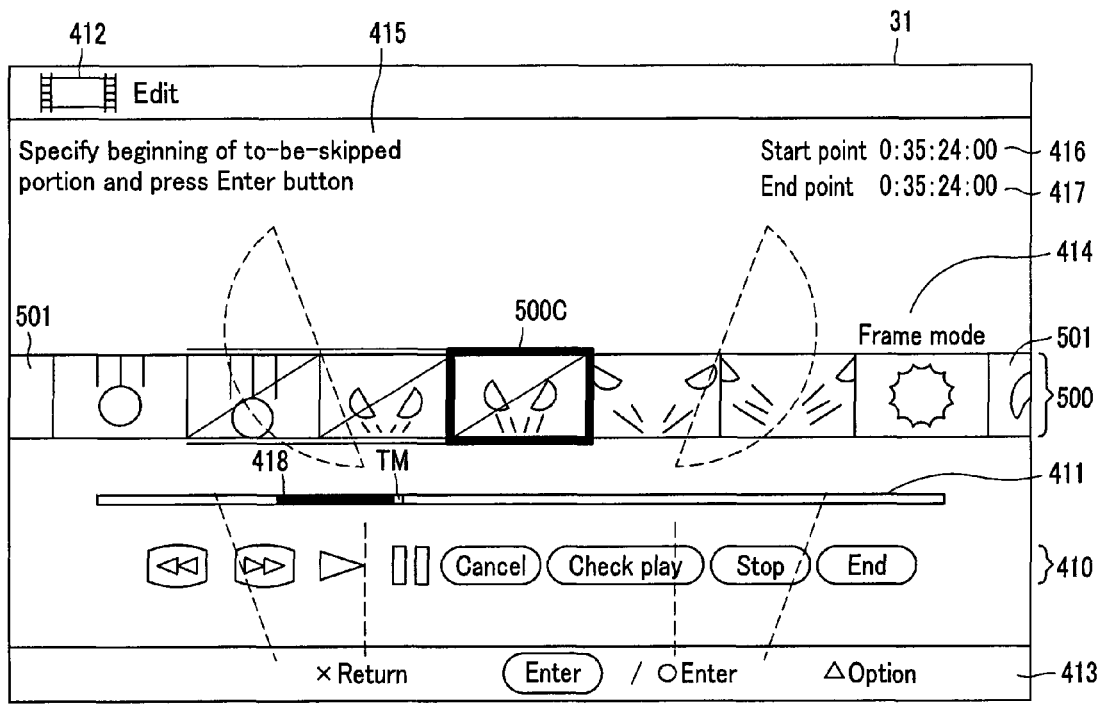
FIG. 15 explains the edit-point setting user-interface screen in the video data editing method as the first embodiment of the present invention.

After a last edition end point is set, the user operates the Down key on the display screen shown in FIG. 14B. Then, a GOP mode screen appears as shown in FIG. 15. On this display screen, a section from an edition start point to an edition end point is displayed differently from the rest in the GOP-unit thumbnail array 500 and it is also indicated with a section mark 418 on the time bar 411.

Second Embodiment of the Video Data Editing Method

In the aforementioned first embodiment, in case different GOP frames are taken as edition start and end points, respectively, for setting edit points in units of a frame, the GOP mode is restored once. The second embodiment is similar to the aforementioned first embodiment in that the multimedia recorder/player 10 is shifted from the search play mode to GOP mode and edit points are set in the GOP mode but different from the first embodiment in that once the multimedia recorder/player 10 is shifted from the GOP mode to frame mode as shown in FIG. 13A, it is not necessary to return to the GOP mode but edit points can be set for each of frames included in different GOPs, respectively.

Namely, in the first embodiment, an edition start point is set in the frame mode shown in FIG. 12B, for example, and another GOP is selected. Then, by operating the Left or Right key to set an edition end point, the GOP mode is restored once. In the second embodiment, however, the state shown in FIG. 14A is directly attained without return to the GOP mode.

More particularly, by operating the Left or Right key in the frame mode as shown in FIG. 12B to change the currently-selected GOP-unit thumbnail in the GOP-unit thumbnail array 500, the currently-selected GOP-unit thumbnail is changed and the frame-unit thumbnail array 600 is changed to a frame-unit thumbnail array including thumbnails of a plurality of frames included in a GOP corresponding to a GOP-unit thumbnail which has newly become a currently-selected GOP-unit thumbnail at the same time.

In the second embodiment, by operating the Up or Down key in this condition, the frame-unit thumbnail array 600 can be moved vertically to change the currently-selected frame-unit thumbnail.

Further, when the Left or Right key is operated, the currently-selected GOP-unit thumbnail is changed and the frame-unit thumbnail array 600 is changed to a frame-unit thumbnail array including thumbnails of a plurality of frames included in a GOP corresponding to a GOP-unit thumbnail which has newly become a currently-selected GOP-unit thumbnail at the same time.

Namely, in the second embodiment, when the Left or Right key is operated in the frame mode, the currently-selected GOP-unit thumbnail in the area 500C is changed. When the Up or Down key is operated, the currently-selected frame-unit thumbnail in the area 500C is changed. Therefore, in the second embodiment, edit points per frame can be set only in the frame mode. In other words, the frame mode in the second embodiment is a so-called GOP/frame mode.

Figure 4:
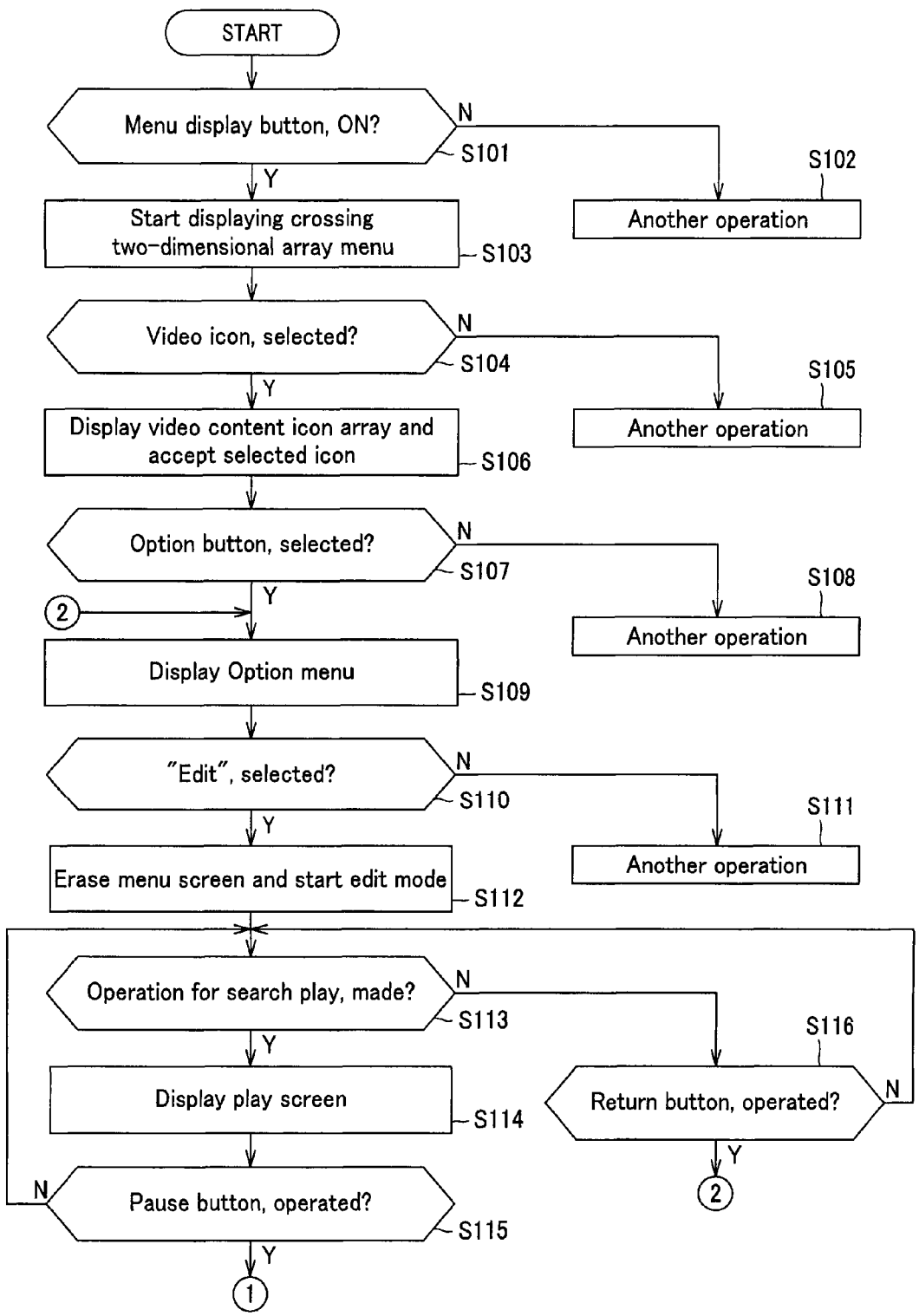
FIG. 4 shows a part of a flow diagram explaining the operations of the essential components of a first embodiment of the video data editing method according to the present invention.
Figure 16:
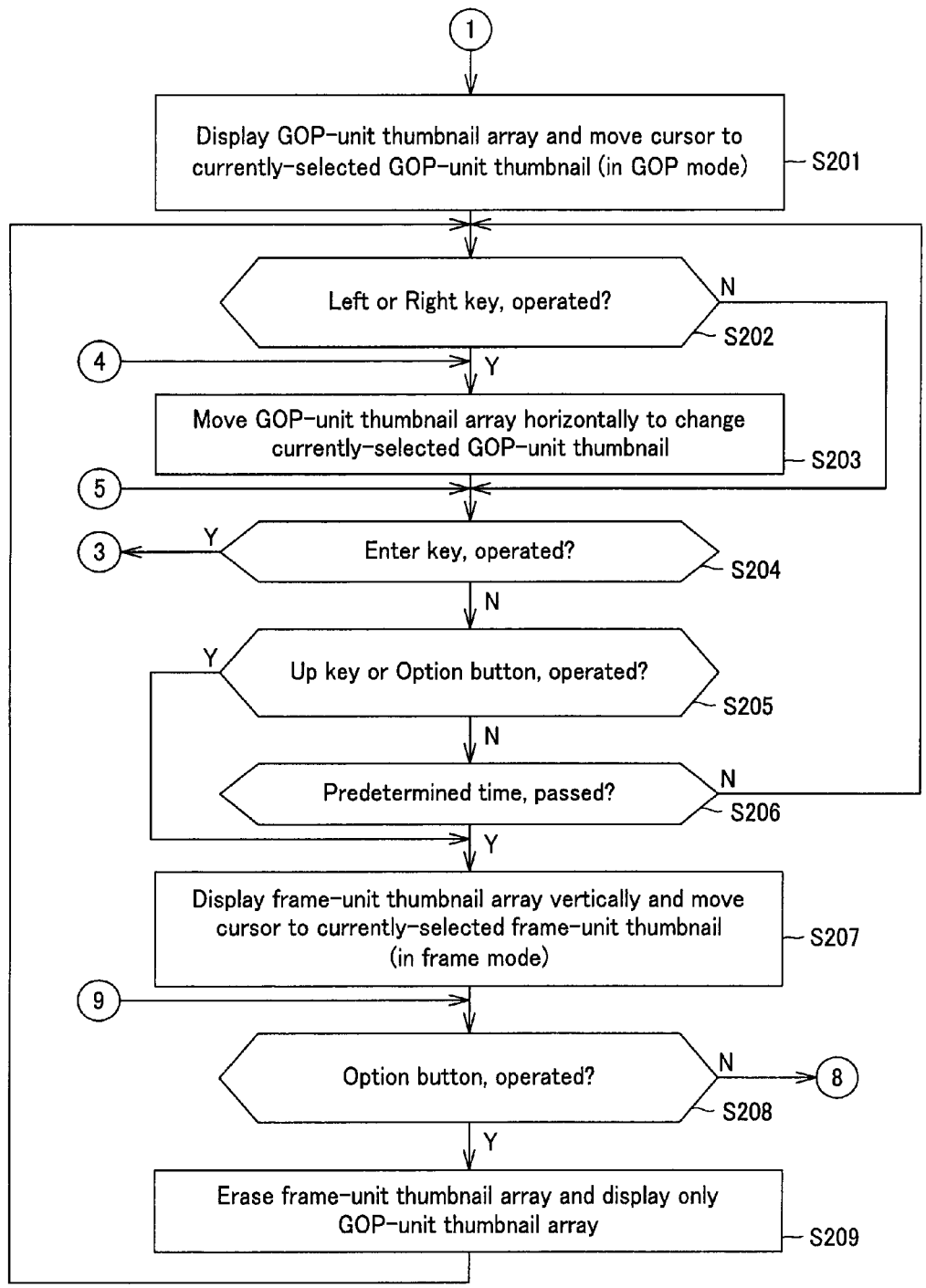
FIG. 16 shows a part of the flow diagram explaining the operation made for setting edit points in a second embodiment of the video data editing method according to the present invention.
Figure 17:
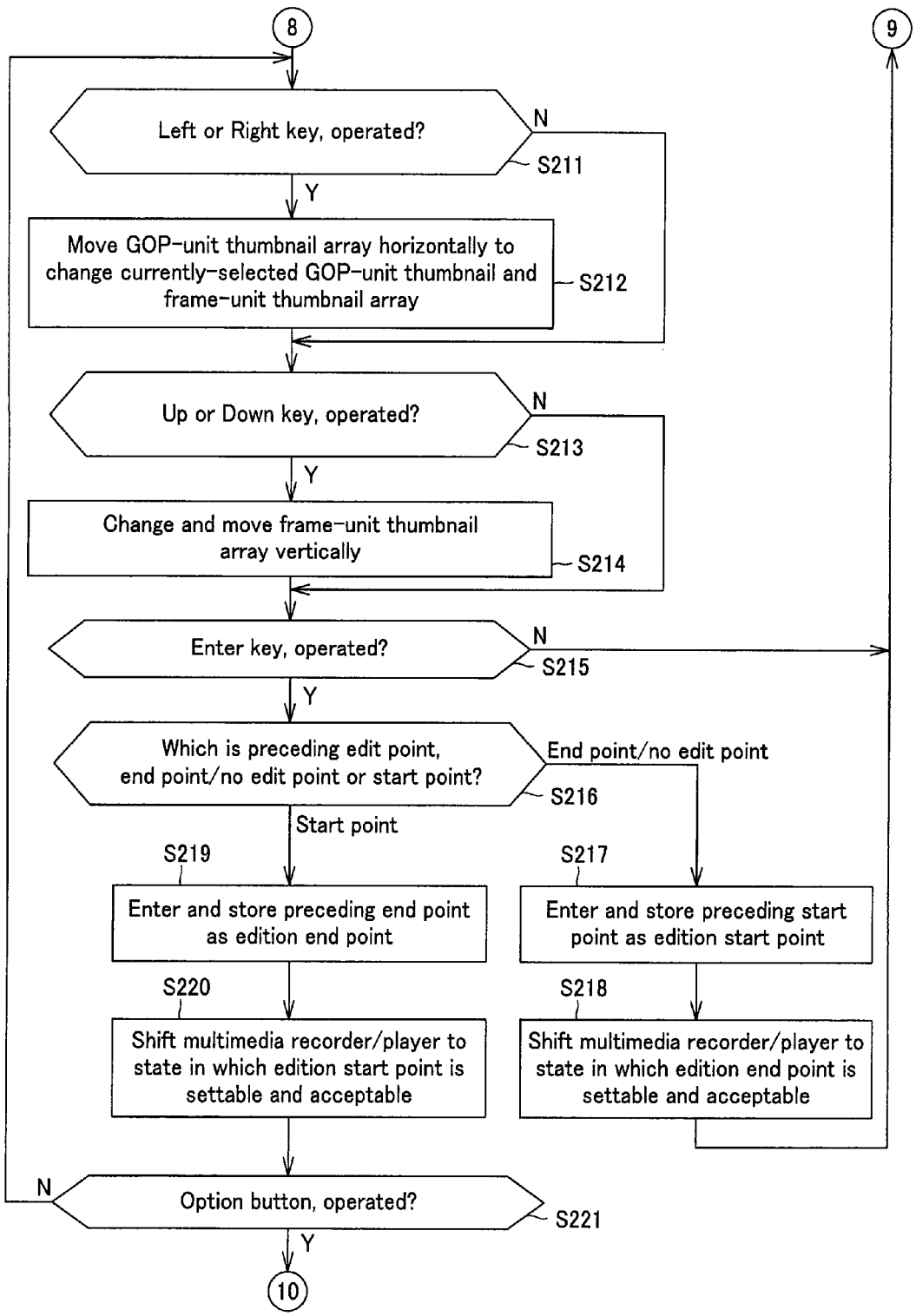
FIG. 17 shows a part of the flow diagram explaining the operations made for setting edit points in the video data editing method as the second embodiment of the present invention.
Figure 18:
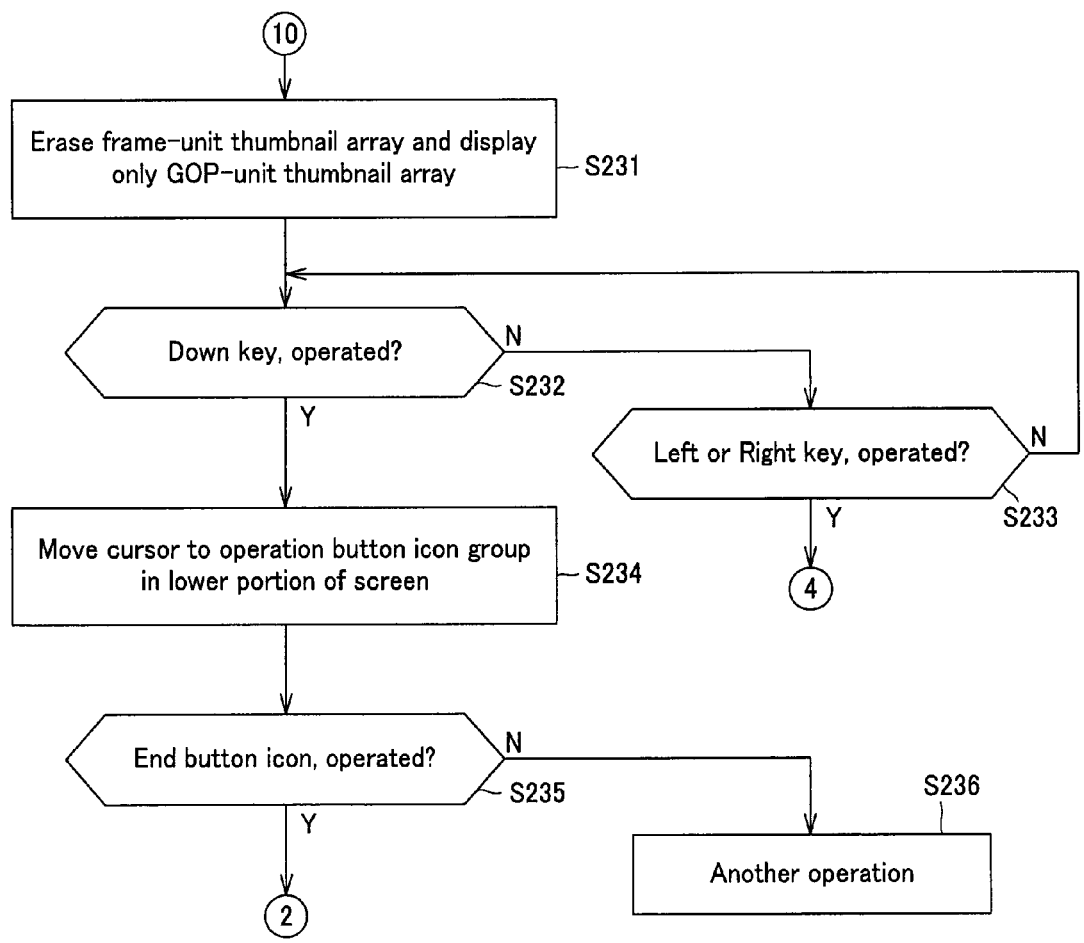
FIG. 18 shows a part of the flow diagram explaining the operations made for setting edit points in the video data editing method as the second embodiment of the present invention.

Next, the operations of the controller 102 in the second embodiment will be explained with reference to flow diagrams in FIGS. 16 to 18. The aforementioned flows of operations in FIGS. 4 and 6 are also quite true with the second embodiment, and so will not be explained any more below. FIGS. 16 to 18 show flows of essential operations of the controller 102 in the second embodiment, being continued from the flow of operation shown in FIG. 4.

In case the controller 102 decides in step S115 in FIG. 4 that the Pause button has been operated, it goes to step S201 in FIG. 16 where it will stop one of reproduced pictures being displayed on the display screen 31 of the monitor display 30 when the Pause button is operated and select the GOP mode (group-unit edit point select mode) in which a fifteenth one of 15 frames in one GOP can be set as an edit point.

In the GOP mode, the controller 102 monitors in step S202 whether the Left or Right key on the operation command input unit 40 or remote commander 50 has been operated. In case the controller 102 decides that the Left or Right key has been operated, it goes to step S203 where it will control the on-screen image generation/output unit 111 to move the GOP-unit thumbnail array 500 as a whole leftward or rightward for changing the currently-selected GOP-unit thumbnail.

In case the controller 102 decides in step S202 that the Left or Right key has not been operated or after the currently-selected GOP-unit thumbnail is changed in step S203, it goes to step S204 where it will determine whether the Enter key 42 has been operated. In case the controller 102 decides in step S204 that the Enter key 42 has been operated, it goes to step S141 in FIG. 6 where it will set an I picture of GOP corresponding to the currently-selected GOP-unit thumbnail as an edition start point and store data on the edition start point into the data storage unit 120 in correspondence to a to-be-edited video content. Then, the controller 102 will make the operations in step S141 and subsequent steps.

In case the controller 102 decides in step S204 that the Enter key 42 has not been operated, the controller 104 goes to step S205 where it will determine whether the Up key or operation button 41 has been operated. In case the controller 102 decides in step S205 that the Up key or operation button 41 has not been operated, it goes to step S206 where it will determine whether no operation has been made for more than a predetermined length of time. In case the controller 102 decides that no operation has been made for more than the predetermined length of time, the controller returns to step S202 where it will monitor whether the Left or Right key has been operated.

Figure 21A:
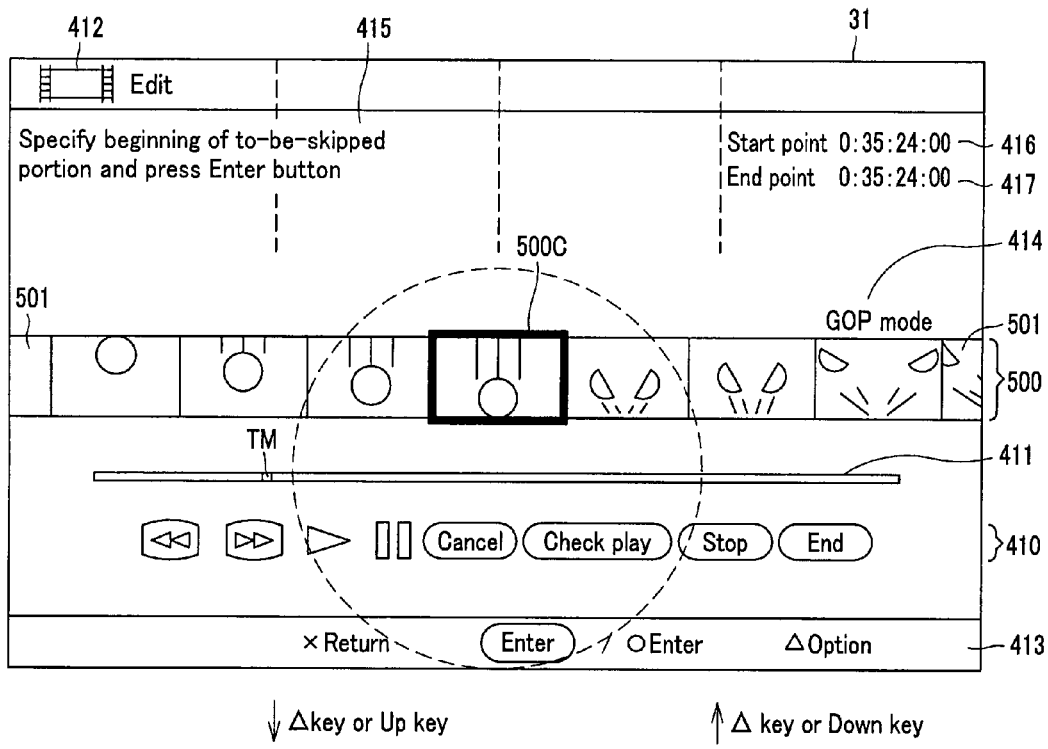
FIGS. 21A and 21B explain the edit-point setting user-interface screen in a fourth embodiment of the video data editing method according to the present invention.
Figure 21B:
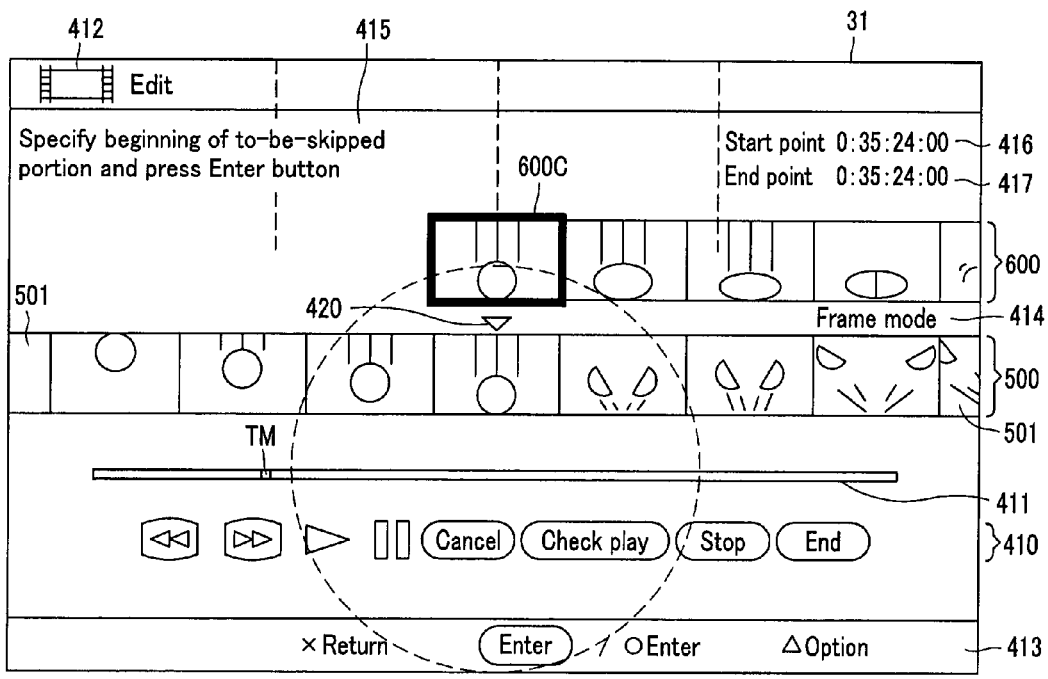

In case the controller 102 decides in step S205 that the Up key or operation button 41 has been operated or in case it decides in step S206 that no operation has been made for more than the predetermined length of time, it goes to step S207 where it will shift the multimedia recorder/player 10 from the GOP mode to frame mode and provide a screen as shown in FIG. 21B for example.

In step S208, the controller 102 determines whether the operation button 41 has been operated. In case the controller 102 decides that the operation button 41 has been operated, it will take the key or button operation as a one for return to the GOP mode and goes to step S209 where it will erase the frame-unit thumbnail array 600 and thus display only the GOP-unit thumbnail array 500 on the screen. Thereafter, the controller 102 returns to step S202.

In case the controller 102 decides in step S208 that the operation button 41 has not been operated, it goes to step S211 in FIG. 17 where it will determine whether the Left or Right key has been operated. In case the controller 102 decides that the Left or Right key has been operated, it goes to step S212 where it will move the GOP-unit thumbnail array 500 in a direction corresponding to a direction designed by the operated key to change the currently-selected GOP-unit thumbnail and change the frame-unit thumbnail array 600 to a thumbnail array of a plurality of frames included in a GOP corresponding to the currently-selected GOP-unit thumbnail.

Next to step S212, the controller 102 goes to step S213 where it will determine whether the Up or Down key has been operated. Also in case the controller 102 decides in step S211 that the Left or Right key has not been operated, it goes to step S213 where it will determine whether the Up or Down key has been operated.

In case the controller 102 decides in step S213 that the Up or Down key has been operated, it goes to step S214 where it will move the frame-unit thumbnail array 600 as a whole in a direction corresponding to a direction designed by the operated key vertically on the display screen 31 to change the currently-selected frame-unit thumbnail in the area 500C as shown in FIGS. 12A and 12B.

Next, the controller 102 determines in step S215 whether the Enter key 42 has been operated. In case the controller 102 decides in step S213 that the Up or Down key has not been operated, it jumps to step S215 where it will determine whether the Enter key 42 has been operated.

In case the controller 102 decides in step S215 that the Enter key 42 has not been operated, it goes back to step S208 where it will determine whether the operation button 41 has been operated and repeat the operations in step S208 and subsequent steps. In case the controller 102 decides in step S215 that the Enter key 42 has been operated, it goes to step S216 where it will determine whether the set edit point is an edition start or end point.

In case the controller 102 decides in step S216 that the preceding edit point is an edition end point or that there is no preceding edit point (the edit point is a first edit point), it goes to step S217 where it will determine, as frame position information on the edition start point (IN point), information on the position, in a to-be-edited content, of a picture frame corresponding to the currently-selected frame-unit thumbnail, for example, information on a relative time point of the picture frame at the edit point from the beginning of the to-be-edited content, and write the time point information in correspondence to data in the to-be-edited content in the data storage unit 120.

Thereafter, the controller 102 goes to step S218 where it will shift the multimedia recorder/player 10 to a state in which an edition end point is settable and acceptable, and then returns to step S208 where it will determine whether the operation button 41 has been operated. And the controller 102 repeats the operations in step S208 and subsequent steps.

In case the controller 102 decides in step S216 that the preceding edit point is an edition start point, it goes to step S219 where it will take the determined edit point (edit point of each picture frame) as frame position information on an edition end point (OUT point) and write it in correspondence to a to-be-edited convent in the data storage unit 120. Upon completion of the storage of the edition end point, it goes to step S220 where it will shift the multimedia recorder/player 10 to a state in which the edition start point is settable and acceptable, and then to step S221 where it will determine whether the operation button 41 has been operated. In case the controller 102 decides that the operation button 41 has not been operated, it goes back to step S211 where it will repeat the operations in step S211 and subsequent steps.

In case the controller 102 decides in step S221 that the operation button 41 has been operated, it goes to step S231 in FIG. 18 where it will determine that the mode of operation has been shifted from the frame mode to GOP mode, erase the frame-unit thumbnail array 600 and thus display only the GOP-unit thumbnail array 500.

Next in step S232, the controller 102 determines whether the Down key has been operated. In case the controller 102 decides that the Down key has not been operated, it goes to step S233 where it will determine the Left or Right key has been operated. In case the controller 102 decides in step S233 that the Left or Right key has not been operated, it goes back to step S232 where it will repeat the operations in step S232 and subsequent steps. In case the controller 102 decides in step S233 that the Left or Right key has been operated, it goes back to step S203 in FIG. 16 where it will repeat the operations in step S203 and subsequent steps.

In case the controller 102 decides in step S232 that the Down key has been operated, it goes to step S234 where it will shift the multimedia recorder/player 10 from the GOP mode to search play mode, display the operation button icon group 410 in the lower portion of the screen deeply and move the cursor to the operation button icon group 410.

Then, the controller 102 determines in step S235 whether the End button icon in the operation button icon group 410 has been operated. In case the controller 102 decides that the End button icon has been operated, it goes back to step S109 where it will display the option menu screen on the display screen 31.

In case the controller 102 decides in step S235 that the End button icon has not been operated, it goes to step S236 where it will make another operation such as search play corresponding to the operation of the play button icon, fast forward icon, rewind icon or the like.

As above, when the second embodiment is in the frame mode, the operation is made as in the GOP/frame mode so that the currently-selected GOP-unit thumbnail in the GOP-unit thumbnail array 500 can be changed without any operation for shifting to the GOP mode, which means that the second embodiment is very friendly to the user.

Third Embodiment of the Video Data Editing Method

The third embodiment is an expanded version of the second embodiment. Also in the second embodiment, the multimedia recorder/player 10 is shifted from the search play mode to frame mode via the GOP mode, and the mode shift between the frame and GOP modes is made by operating a specific operation button, for example, the operation button 41 (or Up key for shift from the GOP to frame mode) is used in the aforementioned example.

According to the third embodiment, however, the multimedia recorder/player 10 is shifted from the search play mode directly to the frame mode (GOP/frame mode) in the aforementioned second embodiment and edit points can be set in the GOP/frame mode.

Figure 19:
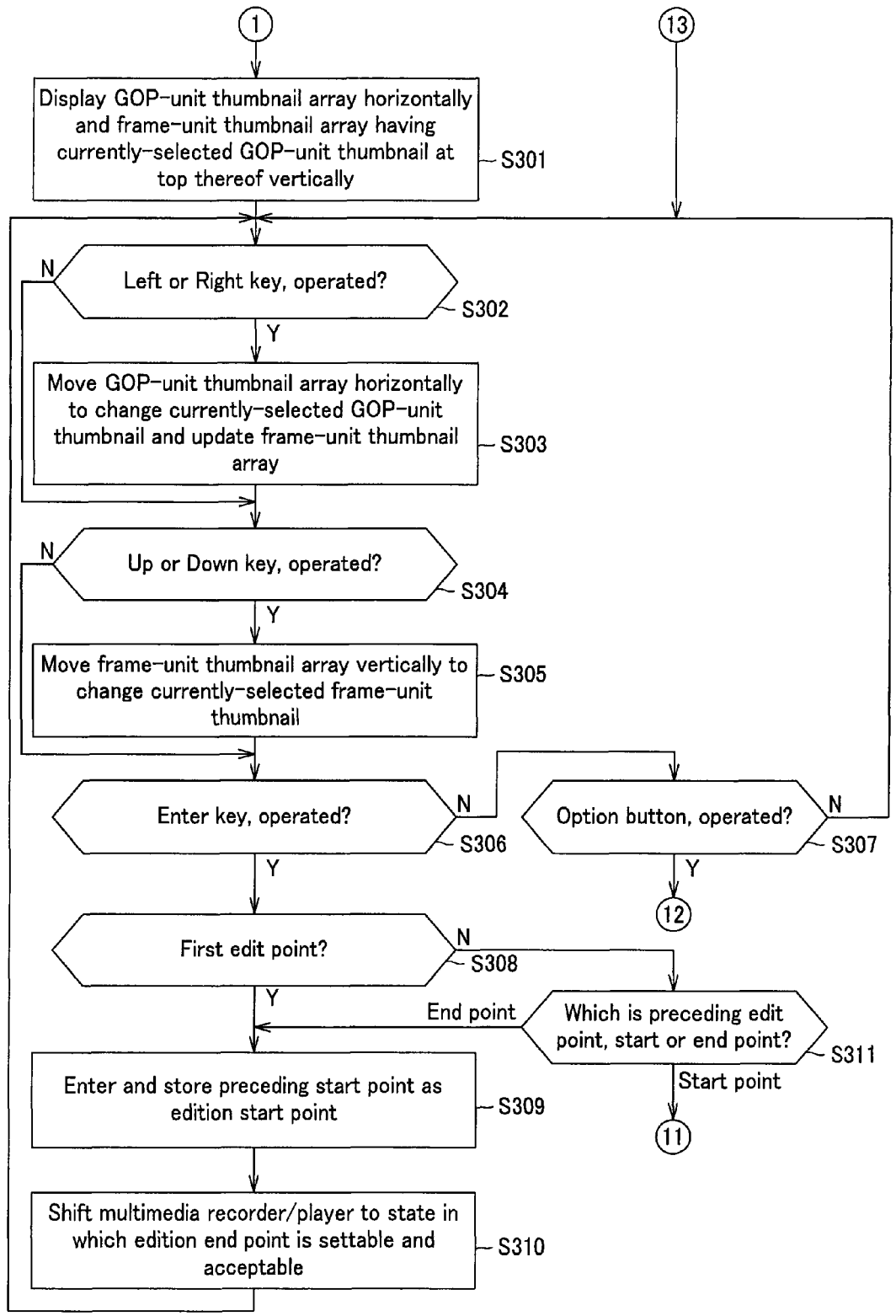
FIG. 19 shows a part of the flow diagram explaining the operations made for setting edit points in a third embodiment of the video data editing method according to the present invention.
Figure 20:
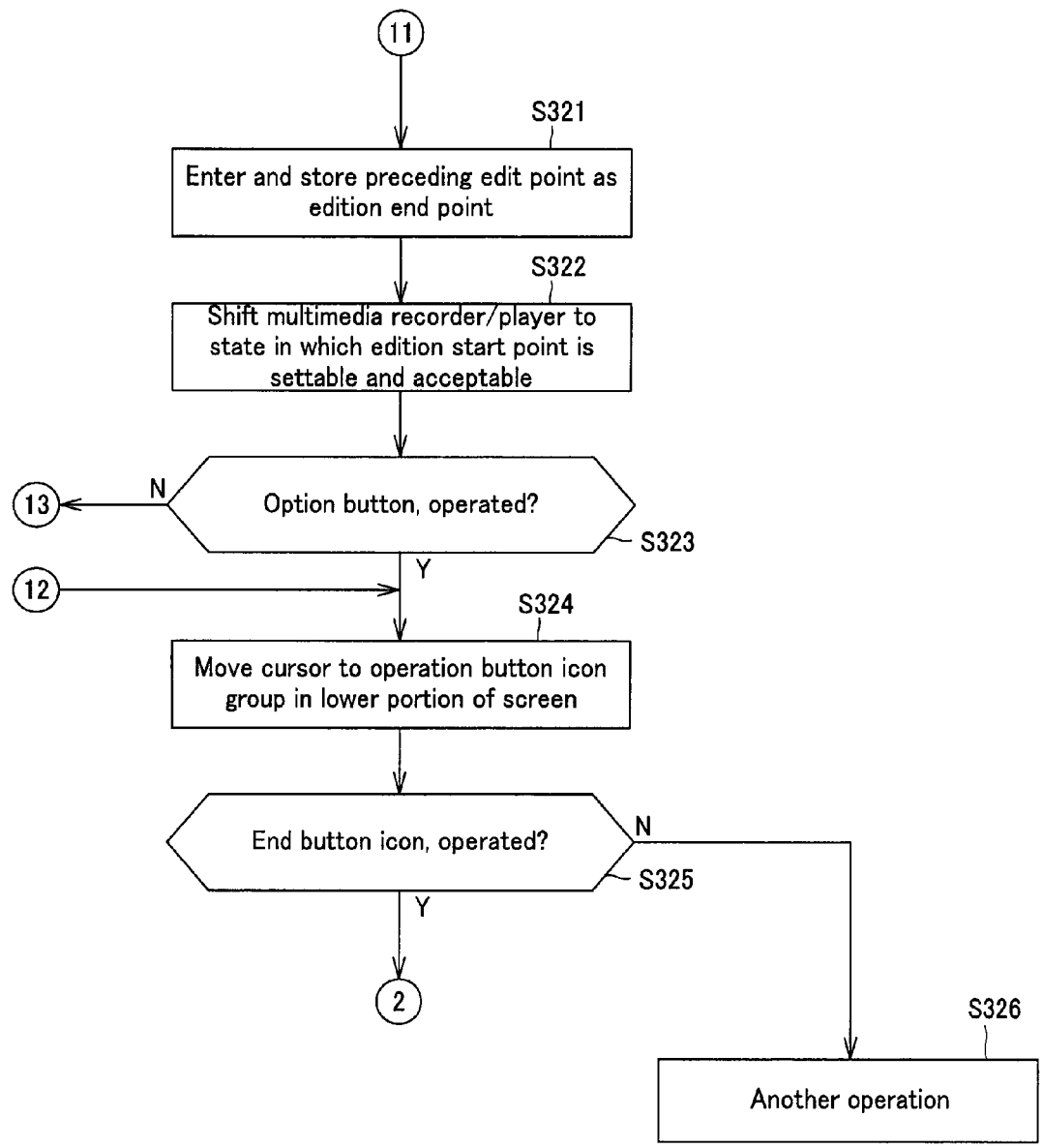
FIG. 20 shows a part of the flow diagram explaining the operations made for setting edit points in the video data editing method as the third embodiment of the present invention.

The operations of the controller 102 in the third embodiment will be explained below with reference to FIGS. 19 and 20. The aforementioned flows of operations in FIGS. 4 and 6 are also quite true with the third embodiment, and so will not be explained any more below. FIGS. 19 and 20 show flows of essential operations of the controller 102 in the third embodiment, being continued from the flow of operation shown in FIG. 4.

That is, in case the controller 102 decides in step S115 in FIG. 4 that the Pause button has been operated, it goes to step S301 in FIG. 19 where it will stop one of reproduced pictures being displayed on the display screen 31 of the monitor display 30 when the Pause button is operated, display the GOP-unit thumbnail array 500 as shown in FIG. 12A and frame-unit thumbnail array 600 and shift the multimedia recorder/player 10 to the GOP/frame mode in which a GOP-unit picture frame can be set as an edit point and each picture frame as an edit point.

The controller 102 determines in step S302 whether the Left or Right key has been operated. In case the controller 102 decides that the Left or Right key has been operated, it goes to step S303 where it will move the GOP-unit thumbnail array 500 in a direction corresponding to a direction designated by the operated key to change the currently-selected GOP-unit thumbnail while changing the frame-unit thumbnail array 600 to an array of a plurality of frames included in a GOP corresponding to the currently-selected GOP-unit thumbnail.

Next to step S303, the controller 102 goes to step S304 where it will determine whether the Up or Down key has been operated. Also in case the controller 102 decides in step S302 that the Left or Right key has not been operated, it goes to step S304 where it will determine whether the Up or Down key has been operated.

In case the controller 102 decides in step S304 that the Up or Down key has been operated, it goes to step S305 where it will move the frame-unit thumbnail array 600 as a whole in a direction corresponding to a direction designed by the operated key vertically on the display screen 31 to change the currently-selected frame-unit thumbnail in the area 500C as shown in FIGS. 13A and 13B.

Next, the controller 102 determines in step S306 whether the Enter key 42 has been operated. Also in case the controller 102 decides in step S306 that the Up or Down key has not been operated, it jumps to step S306 where it will determine whether the Enter key 42 has been operated.

In case the controller 102 decides in step S306 that the Enter key 42 has been operated, it goes to step S308 where it will determine whether the Enter key 42 has been operated for the first time after the edit mode is started, namely, whether a first edit point (first edition start point) has been set.

In case the controller 102 decides in step S308 that the edit point is the first one, it goes to step S309 where it will determine, as frame position information on the edition start point (IN point), information on the position, in a to-be-edited content, of a picture frame corresponding to the currently-selected GOP- or frame-unit thumbnail, for example, information on a relative time point of the picture frame at the edit point from the beginning of the to-be-edited content, and write the time point information in correspondence to data in the to-be-edited content in the data storage unit 120.

Thereafter, the controller 102 goes to step S310 where it will shift the multimedia recorder/player 10 to a state in which an edition end point is settable and acceptable, and back to step S302.

Also, in case the controller 102 decides in step S308 that the edit point is not any first one, it goes to step S311 where it will determine whether the set edit point is an edition start or end point. In case the controller 102 decides in step S311 that the set edit point is an edition end point, it goes back to step S309 where it will repeat the operations in step S309 and subsequent steps.

In case the controller 102 decides in step S311 that the set edit point is an edition start point, it goes to step S321 in FIG. 20 where it will determine the set edit point as frame position information on the edition end point (OUT point) and write it in correspondence to data in a to-be-edited content in the data storage unit 120.

After the edition end point is stored in step S321, the controller 102 goes to step S322 where it will shift the multimedia recorder/player 10 to a state in which an edition start point is settable and acceptable, and goes to step S323 where it will determine whether the operation button 41 has been operated. In case the controller 102 decides in step S323 that the operation button 41 has not been operated, it goes back to step S302 where it will repeat the operations in step S302 and subsequent steps.

In case the controller 102 decides in step S323 that operation button 41 has been operated, it goes to step S324 where it will shift the multimedia recorder/player 10 to the search play mode, display the operation button icon group 410 in the lower portion of the screen deeply and move the cursor to the operation button icon group 410.

Then, the controller 102 determines in step S325 whether the End button icon in the operation button icon group 410 has been operated. In case the controller 102 decides that the End button icon has been operated, it goes back to step S109 where it will display the option menu screen on the display screen 31.

In case the controller 102 decides in step S325 that the End button icon has not been operated, it goes to step S326 where it will make another operation such as search play correspondingly to the operation of the play button icon, fast forward icon, rewind icon or the like.

In case the controller 102 decides in step S306 that the End key 42 has not been operated, it goes to step S307 where it will determine whether the operation button 41 has been operated. In case the controller 102 decides that the Option button has not been operated, it goes back to step S302. Also, in case the controller decides in step S307 that the Option button has been operated, it goes back to step S324 where it will repeat the operations in step S324 and subsequent steps.

With the above operations in the third embodiment, it is possible to shift the multimedia recorder/player 10 from the search play mode to GOP/frame mode and set edit points. Therefore, the currently-selected GOP-unit thumbnail in the GOP-unit thumbnail array and the frame-unit thumbnail array can be changed without having to make any shift between the GOP and frame modes, which means that the second embodiment is very friendly to the user.

Fourth Embodiment of the Video Data Editing Method

In the aforementioned first to third embodiments, the GOP-unit thumbnail array 500 and frame-unit thumbnail array 600 are laid to intersect each other. However, the present invention is not limited to such a crossing layout of the GOP-unit thumbnail array 500 and frame-unit thumbnail array 600 but the latter may be laid in various manners.

The fourth embodiment adopts one of such various manners of array arrangement, in which the GOP-unit thumbnail array 500 and frame-unit thumbnail array 600 are laid in two parallel lines, that is, the GOP-unit thumbnail array 500 is laid horizontally and the frame-unit thumbnail array 600 is laid in parallel to the GOP-unit thumbnail array 500.

FIG. 21A shows an example of GOP mode screen in the fourth embodiment. The DOP mode screen is quite the same as the GOP mode screen in the aforementioned first to third embodiments. The currently-selected GOP-unit thumbnail in the area 500C emphatically displayed being framed in yellow, for example, where the cursor is positioned is changed correspondingly to the operation of the Left or Right key. Also, GOP-unit edit points can be set using GOP-unit thumbnails correspondingly to the user-made operation of the Enter key 42 precisely as in the first to third embodiments.

FIG. 21B shows an example of frame mode screen in the fourth embodiment. Namely, also in the fourth embodiment, the frame-unit thumbnail array 600 includes a plurality of picture frames, for example, 15 picture frames, included in GOP corresponding to the currently-selected GOP-unit thumbnail in the area 500C in the GOP-unit thumbnail array 500 as in the aforementioned first to third embodiments.

In the frame mode in the fourth embodiment, the frame-unit thumbnail array 600 is displayed above and in parallel to the GOP-unit thumbnail array 500 as shown in FIG. 21B. When in the frame mode, frame-unit thumbnails selected by the user for edition are positioned in an area 600C above the area 500C, which is different from the first to third embodiments.

Thus, when the multimedia recorder/player 10 is shifted from the GOP mode to frame mode, the cursor displayed emphatically being framed in yellow, for example, is moved from the area 500C to the area 600C as shown in FIGS. 21A and 21B, and it is informed to the user that the currently-selected frame-unit thumbnail is positioned in the central area 600C in the frame-unit thumbnail array 600 during the frame mode.

When the user operates the Left or Right key in this condition, the currently-selected frame-unit thumbnail is changed. Further, when the user operates the Enter key 42 in the frame mode, the controller 102 will set and accept a frame-unit edition start or end point correspondingly and store it into the data storage unit 120 in correspondence to a to-be-edited content as having previously been described.

In the fourth embodiment, the mode shift from the GOP mode to frame mode is made by operating the Option button or Up key. Accordingly, the mode shift from the frame mode to GOP mode is made by operating the Option button or Down key.

Also in the fourth embodiment, letters "GOP mode" and "Frame mode" are displayed on the display screen 31, which informs the user of the mode of edition being selected. In the fourth embodiment, however, since only a GOP-unit thumbnail array is displayed on the display screen 31 during the GOP mode and both the GOP-unit thumbnail array 500 and frame-unit thumbnail array 600 are displayed on the display screen 31 during the frame mode, display with letters indicating such modes may not be provided, which is also true with the first and second embodiments.

It should be noted that when the multimedia recorder/player 10 is in the frame mode, a link mark 420 is displayed between the areas 500C and 600C to inform the user of GOP to which the frame-unit thumbnail array 600.

In the fourth embodiment, when a specific frame in GOP corresponding to a certain GOP-unit thumbnail is set as an edition start point and a specific frame in GOP corresponding to another GOP-unit thumbnail is set as an edition end point, operations are controlled and edit-point setting operations are effected as will be described below. The operation control and edit-point setting operations will be explained with reference to changes on the display screen.

First, the user operates the Left or Right key when the multimedia recorder/player 10 is in the GOP mode as shown in FIG. 21A to select GOP which will include a picture frame as an edition start point by taking a corresponding GOP-unit thumbnail as a currently-selected GOP-unit thumbnail in the area 500C. After completion of the selection of GOP which will include a picture frame which is to be an edition start point as a currently-selected GOP-unit thumbnail, the user operates the Up key or Option button to shift the multimedia recorder/player 10 from the GOP mode to frame mode, to thereby display a frame mode screen as shown in FIG. 21B.

Figure 22A:
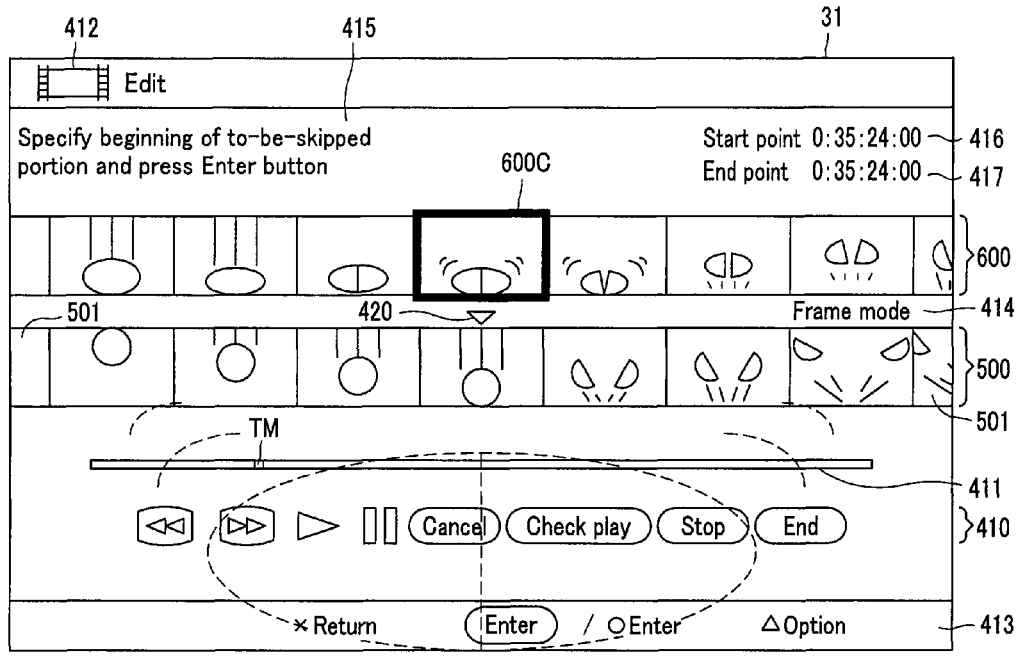
FIGS. 22A and 22B explain the edit-point setting user-interface screen in the video data editing method as the fourth embodiment of the present invention.
Figure 22B:
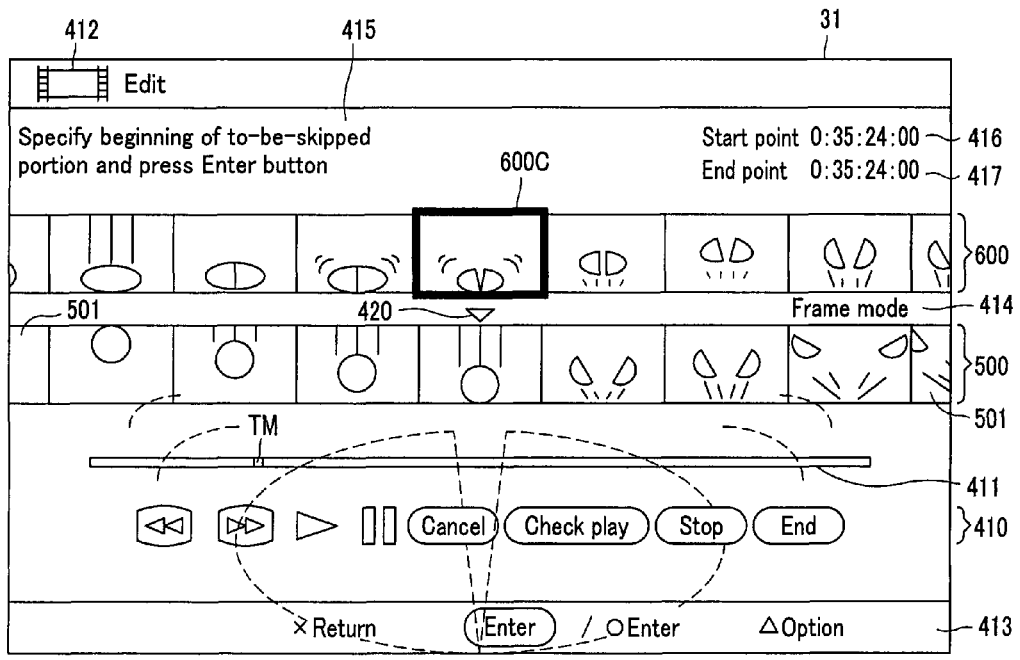

Then, the user selects a frame-unit thumbnail corresponding to a picture frame as the edition start point as a currently-selected frame-unit thumbnail in the area 600C by operating the Left or Right key when the multimedia recorder/player 10 is in the frame mode to move the frame-unit thumbnail array 600 as shown in FIGS. 22A and 22B.

Then, the user operates the Enter key 42 as shown in FIG. 22B for example to set, in the frame mode screen, a picture frame corresponding to the currently-selected frame-unit thumbnail as an edition start point. Then, information on the set edition start point is stored in the data storage unit 120 in correspondence to a to-be-edited video content as having previously been described.

Figure 23A:
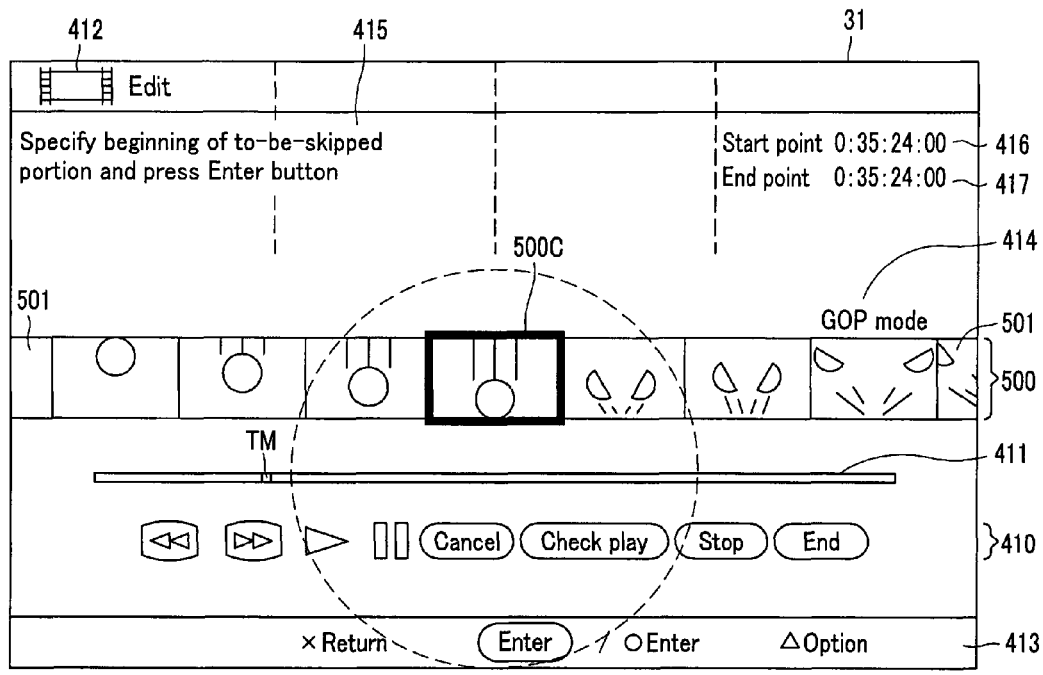
FIGS. 23A and 23B explain the edit-point setting user-interface screen in the video data editing method as the fourth embodiment of the present invention.

Next, the user operates the Down key or operation button 41 to select GOP which will include the picture frame as the edition end point as shown in FIG. 22B. Then, the multimedia recorder/player 10 is shifted from the frame mode to GOP mode and the GOP mode screen is displayed as shown in FIG. 23A. When the user operates the Left or Right key in the GOP mode, GOP which will include a picture frame which is to be an edition end point is selected by taking a GOP-unit thumbnail corresponding to the GOP as a currently-selected GOP-unit thumbnail in the area 500C as shown in FIG. 23B.

Figure 23B:
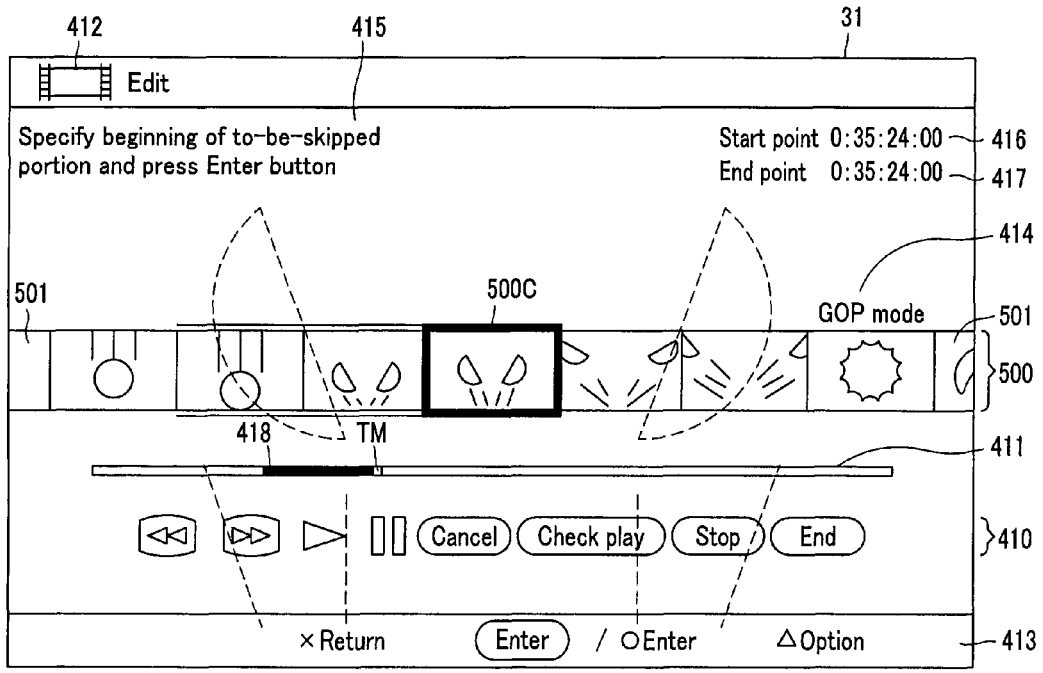

At this time, a section from the edition start point to the currently-selected GOP-unit thumbnail is displayed as a section mark 418 on the time bar 411 and all the thumbnails including from the GOP-unit thumbnail in GOP including the edition start point to a currently-selected GOP-unit thumbnail which is assumed to include a frame as an edition end point are emphatically displayed being framed in a noticeable color as shown in FIG. 23B. FIG. 23B shows a GOP-unit thumbnail of a corresponding section displayed emphatically with a doublet.

Figure 24A:
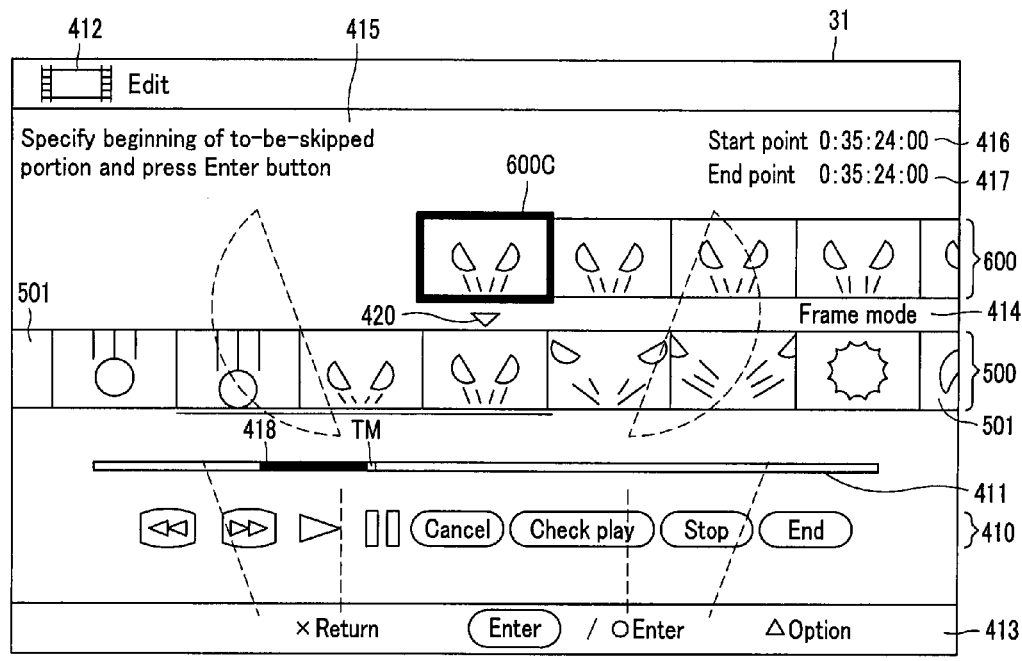
FIGS. 24A and 24B explain the edit-point setting user-interface screen in the video data editing method as the fourth embodiment of the present invention.

After completion of the section of the currently-selected GOP-unit thumbnail, the user operates the Up or Option button on the screen shown in FIG. 23B for example to shift the multimedia recorder/player 10 from the GOP mode to frame mode, to thereby display a frame mode screen as shown in FIG. 24A.

Figure 24B:
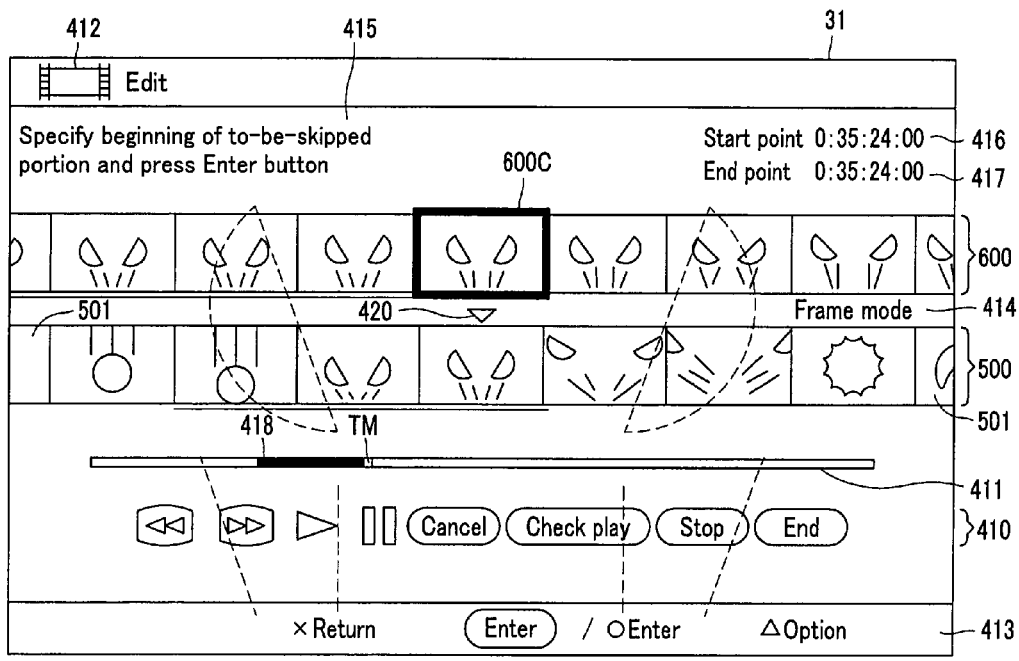
Figure 25A:
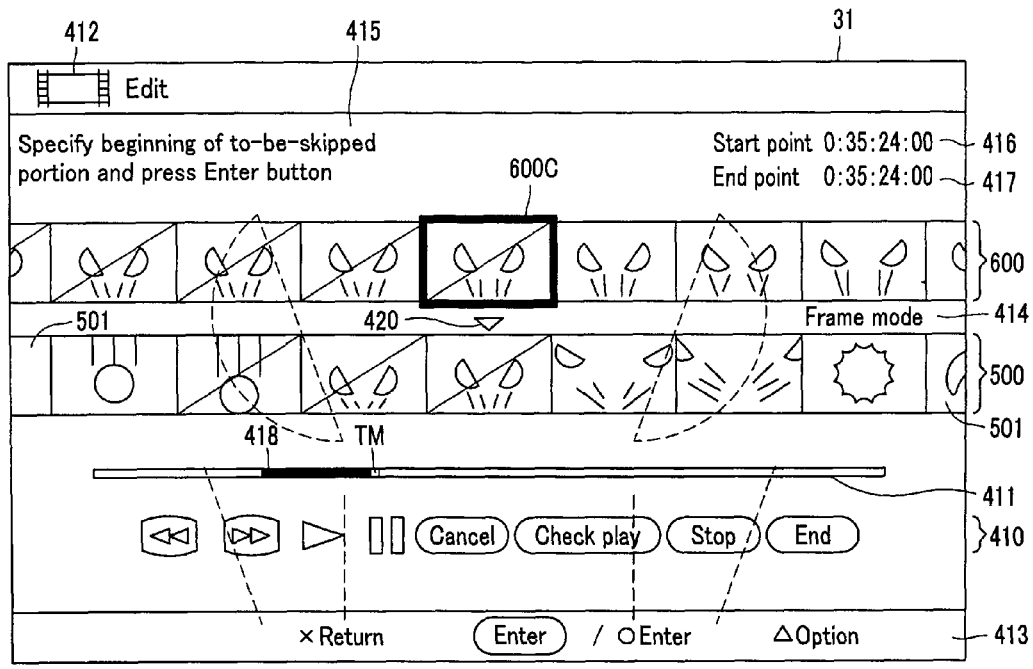
FIGS. 25A and 25B explain the edit-point setting user-interface screen in the video data editing method as the fourth embodiment of the present invention.

Then, the user operates the Left or Right key in the frame mode to move the frame-unit thumbnail array 600 as shown in FIGS. 24B and 25A, to thereby select a frame-unit thumbnail corresponding to the picture frame as an edition end point by taking the latter as a currently-selected frame-unit thumbnail in the area 600C.

Then, the user operates the Enter key 42 as shown in FIG. 25A to set a picture frame corresponding to the currently-selected frame-unit thumbnail as an edition end point on the frame mode screen. Information on the set edition end point is stored into the data storage unit 120 in correspondence to a to-be-edit video content.

At this time, when the user has selected and set a frame-unit thumbnail as an edition end point, a section, of the GOP- and frame-unit thumbnail arrays 500 and 600, from the edition start point to edition end point is indicated hatched as shown in FIG. 25A to inform the user of the section. That is, when the user has operated the Enter key 42 for an edition start point, a section from a GOP-unit thumbnail including the edition start point to a frame-unit thumbnail as an edition end point is displayed differently from other thumbnails as shown in FIG. 25A.

It should be noted that FIG. 25A shows each thumbnail being hatched. Actually, however, each thumbnail is not so hatched but is displayed in a color different from those of the other thumbnails.

Figure 25B:
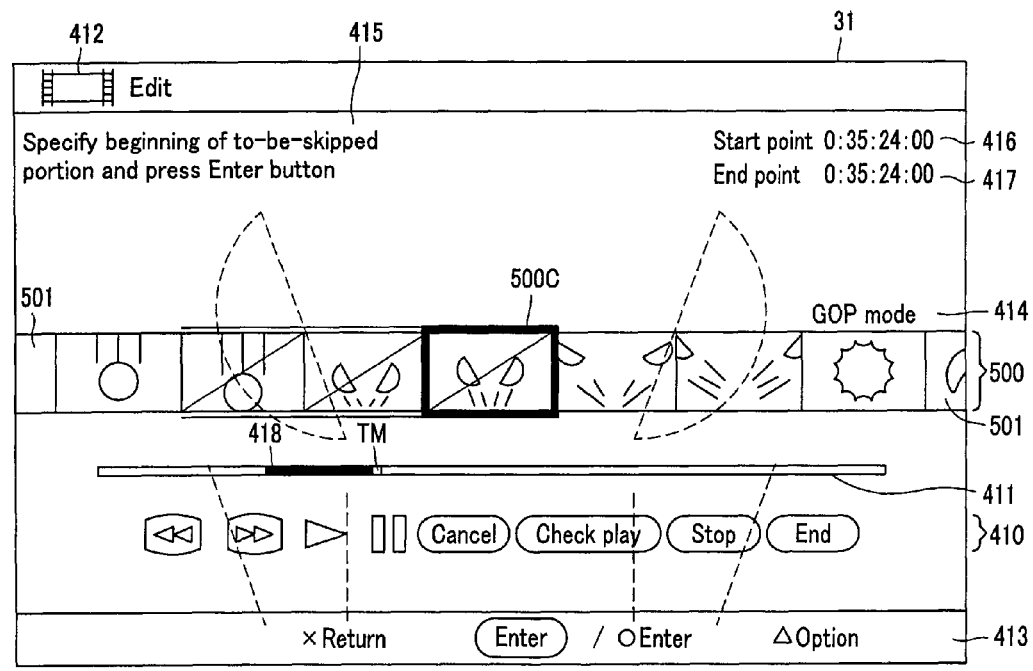

Next, to go to another GOP in order to set an edition start point and edition end point of another section, the user operates the Down key or Option button. Then, the multimedia recorder/player 10 returns to the GOP mode as shown in FIG. 25B, and subsequently a next edition start point and edition end point are set as above. Thus, edition start points and edition end points of a plurality of necessary sections can be set.

Next, the operations of the controller 102 in the fourth embodiment will be explained with reference to flow diagrams in FIGS. 26 and 27. The aforementioned flows of operations of the first embodiment in FIGS. 4 and 6 are also quite true with the fourth embodiment, and so will not be explained any more below.

Figure 26:
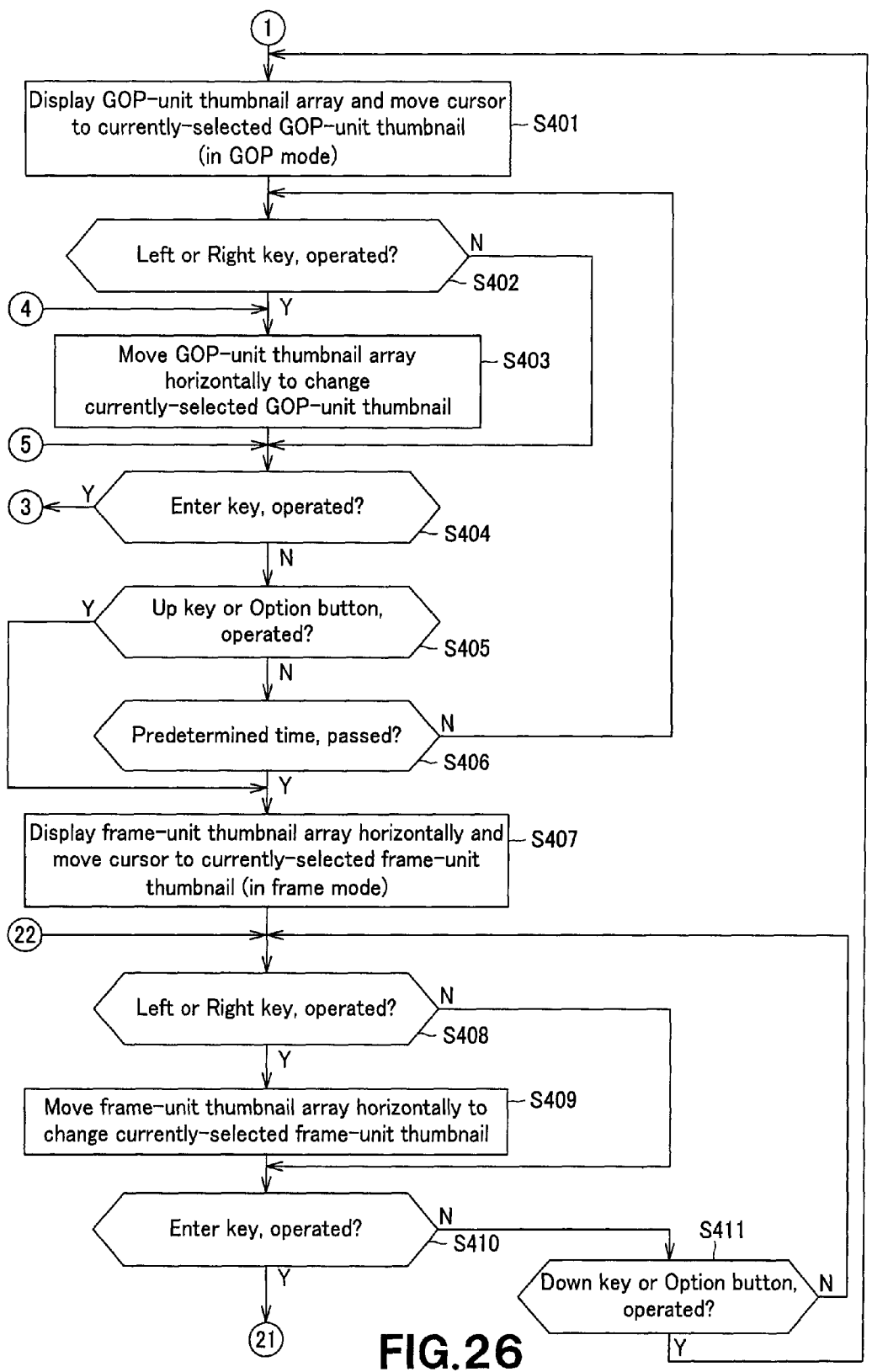
FIG. 26 shows a part of the flow diagram explaining the operations made for setting edit points in the video data editing method as the fourth embodiment of the present invention.
Figure 27:
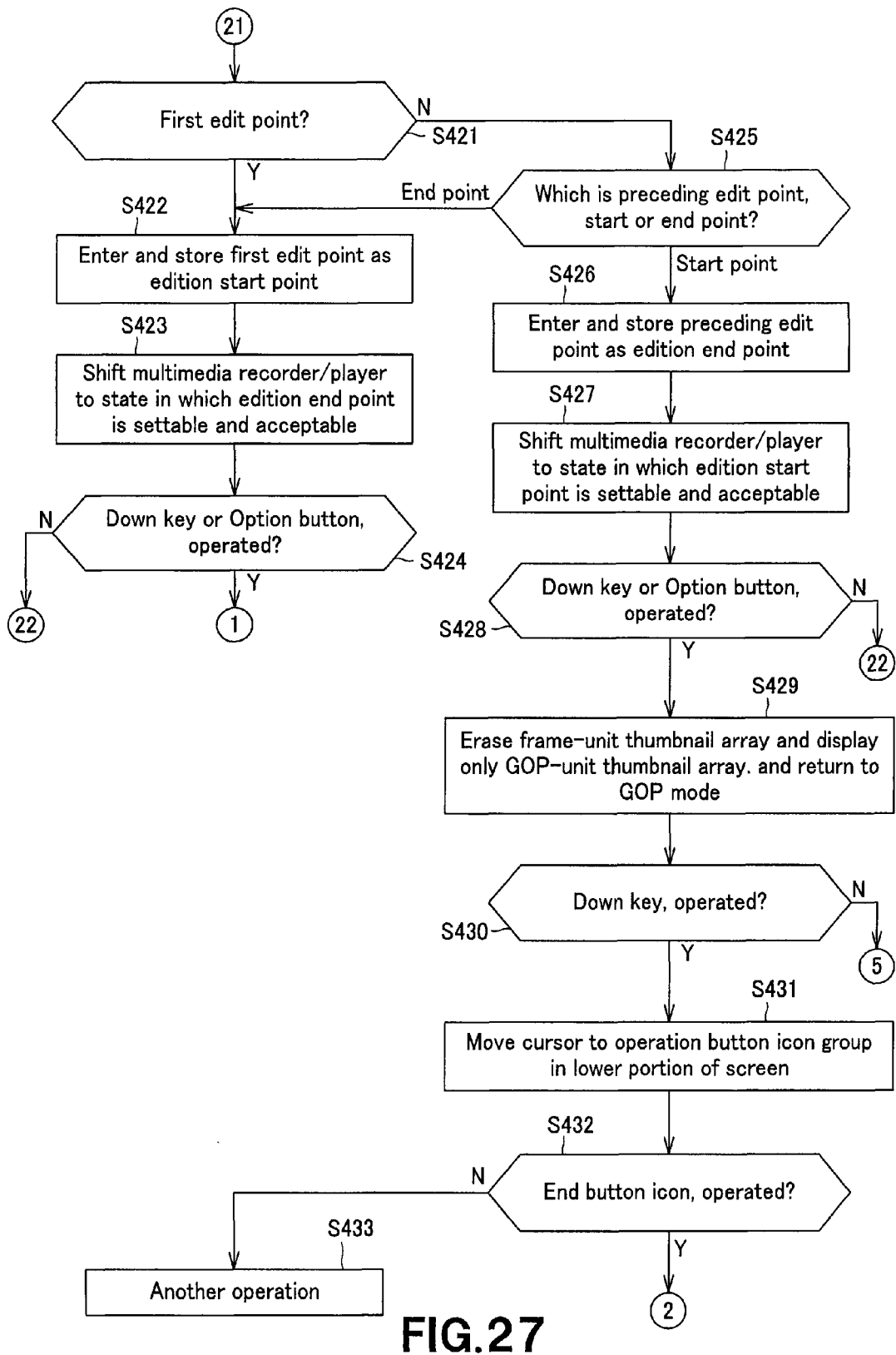
FIG. 27 shows a part of the flow diagram explaining the operations made for setting edit points in the video data editing method as the fourth embodiment of the present invention.

FIGS. 26 and 27 show flows of essential operations of the controller 102 in the fourth embodiment, being continued from the flow of operation shown in FIG. 4.

In case the controller 102 decides in step S115 in FIG. 4 that the Pause button has been operated, it goes to step S401 in FIG. 26 where it will stop one of reproduced pictures being displayed on the display screen 31 of the monitor display 30 when the Pause button is operated and select the GOP mode (group-unit edit point select mode) in which a fifteenth one of 15 frames in one GOP can be set as an edit point.

In the GOP mode, the controller 102 monitors in step S402 whether the Left or Right key on the operation command input unit 40 or remote commander 50 has been operated. In case the controller 102 decides that the Left or Right key has been operated, it goes to step S403 where it will control the on-screen image generation/output unit 111 to move the GOP-unit thumbnail array 500 as a whole leftward or rightward for changing the currently-selected GOP-unit thumbnail.

In case the controller 102 decides in step S402 that the Left or Right key has not been operated or after the currently-selected GOP-unit thumbnail is changed in step S403, it goes to step S404 where it will determine whether the Enter key 42 has been operated. In case the controller 102 decides in step S404 that the Enter key 42 has been operated, it goes to step S141 in FIG. 6 where it will set an I picture (frame) of GOP corresponding to the currently-selected GOP-unit thumbnail as an edition start point and store data on the edition start point into the data storage unit 120 in correspondence to a to-be-edited video content. Then, the controller 102 will make the operations in step S141 and subsequent steps.

In case the controller 102 decides in step S404 that the Enter key 42 has not been operated, the controller 104 goes to step S405 where it will determine whether the Up key or operation button 41 has been operated. In case the controller 102 decides in step S405 that the Up key or operation button 41 has not been operated, it goes to step S406 where it will determine whether no operation has been made for more than a predetermined length of time. In case the controller 102 decides that no operation has been made for more than the predetermined length of time, it returns to step S402 where it will monitor whether the Left or Right key has been operated.

In case the controller 102 decides in step S405 that the Up key or operation button 41 has been operated or in case it decides in step S406 that no operation has been made for more than the predetermined length of time, it goes to step S407 where it will shift the multimedia recorder/player 10 from the GOP mode to frame mode and provide a screen in which the GOP-unit thumbnail array 500 and frame-unit thumbnail array 600 displayed horizontally in two lines as shown in FIG. 21B for example.

Next, the controller 102 determines in step S408 whether the Left or Right key has been operated. In case the controller 102 decides that the Left or Right key has been operated, it goes to step S409 where it will move the frame-unit thumbnail array 600 in a direction corresponding to a direction designated by the key to change the currently-selected frame-unit thumbnail in the area 600C.

Next to step S409, the controller 102 goes to step S410 where it will determine whether the Enter key 42 has been operated. Also in case the controller 102 decides in step S408 that the Left or Right key has not been operated, it goes to step S410 where it will determine whether the Enter key 42 has been operated.

In case the controller 102 decides in step S410 that the Enter key 42 has not been operated, it goes to step S411 where it will determine whether the Down key or operation button 41 has been operated. In case the controller 102 decides that the Down key or operation button 41 has not been operated, it goes back to step S408 where it will repeat the operations in step S408 and subsequent steps.

Also, in case the controller 102 decides in step S411 that the operation button 41 has been operated, it takes the operation as a command for return to the GOP mode and goes back to step S401 where it will erase the frame-unit thumbnail array 600 and thus display only the GOP-unit thumbnail array 500.

In case the controller 102 decides in step S410 that the Enter key 42 has been operated, it goes to step S421 in FIG. 27 where it will determine whether the Enter key 42 has been operated for the first time after the edit mode is started, that is, whether a first edit point (first edition start point) has been set.

In case the controller 102 decides in step S421 that the first edit point has been set, it goes to step S422 where it will determine, as frame position information on the edition start point (IN point), information on the position, in a to-be-edited content, of a picture frame corresponding to the currently-selected frame-unit thumbnail, for example, information on a relative time point of the picture frame at the edit point from the beginning of the to-be-edited content, and write the time point information in correspondence to data in the to-be-edited content in the data storage unit 120.

Thereafter, the controller 102 goes to step S423 where it will shift the multimedia recorder/player 10 to a state in which an edition end point is settable and acceptable and determine in step S424 whether the Down key or operation button 41 has been operated. In case the controller 102 decides in step S424 that the Down key or operation button 41 has not been operated, it goes back to step S408 where it will repeat the operations in step S408 and subsequent steps.

Also, in case the controller 102 decides that the Down key or operation button 41 has been operated, it decides that the key or button operation is to return to the GOP mode and goes back to step S401 where it will erase the frame-unit thumbnail array 600 and thus display only the GOP-unit thumbnail array 500 on the screen.

Also, in case the controller 102 decides in step S421 that the edit point is not any first one, it goes to step S425 where it will determine whether the set edit point is an edition start or end point. In case the controller 102 decides in step S425 that the set edit point is an edition end point, it goes back to step S422 where it will repeat the operations in step S422 and subsequent steps.

In case the controller 102 decides in step S425 that the set edit point is an edition start point, it goes to step S426 where it will determine the set edit point (picture frame-unit edit point) as frame position information on the edition end point (OUT point) and write it in correspondence to data in a to-be-edited content in the data storage unit 120.

Thereafter, After the edition end point is stored in step S426, the controller 102 goes to step S427 where it will shift the multimedia recorder/player 10 to a state in which an edition start point is settable and acceptable, and goes to step S428 where it will determine whether the Down key or operation button 41 has been operated. In case the controller 102 decides in step S428 that the Down key or operation button 41 has not been operated, it goes back to step S408 where it will repeat the operations in step S408 and subsequent steps.

Also, in case the controller 102 decides in step S428 that the Down key or operation button 41 has been operated, it goes to step S429 where it will determine that the key or button operation has been made for returning from the frame mode to GOP mode, erase the frame-unit thumbnail array 600 and thus display only the GOP-unit thumbnail array 500.

Next, the controller 102 determines in step S430 whether the Down key has been operated. In case the controller 102 decides that the Down key has not been operated, it goes back to step S404 where it will repeat the operations in step S404 and subsequent steps.

In case the controller 102 decides in step S430 that the Down key has been operated, it goes to step S431 where it will shift the multimedia recorder/player 10 from the GOP mode to frame mode, display the operation button icon group 410 in the lower portion of the screen deeply and move the cursor to the operation button icon group 410.

Then, the controller 102 determines in step S432 whether the End button icon in the operation button icon group 410 has been operated. In case the controller 102 determines that the End button icon has been operated, it goes back to step S109 in FIG. 4 where it will display an option menu screen on the display screen 31.

In case the controller 102 decides in step S432 that the End button icon has not been operated, it goes to step S433 where it will make another operation such as search play corresponding to the operation of the play button icon, fast forward icon, rewind icon or the like.

In the fourth embodiment, since the frame-unit thumbnail array 600 and GOP-unit thumbnail array 500 are displayed horizontally in parallel to each other, the time bar 411 displayed in the lower portion of the screen will not be partially be concealed as compared with the display in which the frame-unit thumbnail array 600 is displayed vertically on the screen, which is very friendly to the user.

Fifth Embodiment of the Video Data Editing Method

The fifth embodiment is a variant of the fourth embodiment and has the same relation with the latter as that of the second embodiment with the first embodiment. That is, in this fifth embodiment, the operations down to the shift from the search play mode to first GOP mode are similar to those in the fourth embodiment. However, once the multimedia recorder/player 10 has set the frame mode, the GOP-unit thumbnail array 500 and frame-unit thumbnail array 600 are always displayed in parallel to each other unless the operation button 41 for example is operated for forced shift to the GOP mode. Namely, in the frame mode of this fifth embodiment, edit points may be set for a GOP-unit frame and also for each frame. That is, the fifth embodiment adopts a so-called GOP/frame mode.

When the user operates the Up key in the frame mode with the cursor positioned in the area 500C of the GOP-unit thumbnail array 500 and multimedia recorder/player 10 being in a GOP-unit edit-point setting state, the cursor moves to the area 600C of the frame-unit thumbnail array 600 and the multimedia recorder/player 10 is shifted to a frame-unit edit-point setting state.

Also, when the user operates the Down key in the frame mode with the cursor positioned in the area 600C of the frame-unit thumbnail array 600 and multimedia recorder/player 10 being in a frame-unit edit-point setting state, the cursor moves to the area 500C of the GOP-unit thumbnail array 500 and the multimedia recorder/player 10 is shifted to a GOP-unit edit-point setting state.

Therefore, in the fifth embodiment, a thumbnail can easily be selected between the GOP- and frame-unit thumbnails by operating the Up and Down keys during the frame mode. Another GOP can be selected without having to return from the frame mode to GOP mode once as in the fourth embodiment.

By operating the Enter key 42 when the cursor is positioned at a currently-selected GOP-unit thumbnail during the frame mode, it is possible to set GOP-unit edit points. Also, by operating the Enter key 42 when the cursor stays at a currently-selected frame-unit thumbnail, it is possible to set frame-unit edit points.

Sixth Embodiment of the Video Data Editing Method

The sixth embodiment is also a variant of the fourth embodiment and has the same relation with the latter as that of the third embodiment with the first embodiment. That is, in this sixth embodiment, the multimedia recorder/player 10 can shift from the search play mode directly to the frame mode (GOP/frame mode) as in the fifth embodiment so that GOP- and frame-unit edit points can be set in the GOP/frame mode.

Also in this sixth embodiment, when the Up key is operated during the frame mode (GOP/frame mode) with the cursor staying in the area 500C of the GOP-unit thumbnail array 500 and multimedia recorder/player 10 being in the GOP-unit edit-point setting state as in the fifth embodiment, the cursor moves to the area 600C of the frame-unit thumbnail array 600 and the multimedia recorder/player 10 is shifted to the frame-unit edit-point setting state.

Also when the Down key is operated during the frame mode (GOP/frame mode) with the cursor staying in the area 600C of the frame-unit thumbnail array 600 and multimedia recorder/player 10 being in the frame-unit edit-point setting state, the cursor moves to the area 500C of the GOP-unit thumbnail array 500 and the multimedia recorder/player 10 is shifted to the GOP-unit edit-point setting state.

Therefore, when the multimedia recorder/player 10 is in the frame mode (GOP/frame mode) of the sixth embodiment, a thumbnail can easily be selected between the GOP- and frame-unit thumbnails by operating the Up and Down keys and also another GOP can be selected without having to returning from the frame mode to GOP mode once as in the fourth embodiment.

Seventh Embodiment of the Video Data Editing Method

In all the aforementioned embodiments, there is available a condition in which both the GOP-unit thumbnail array 500 and frame-unit thumbnail array 600 are displayed in one display screen when the multimedia recorder/player 10 is in the frame mode or GOP/frame mode. In the seventh embodiment, however, only the GOP-unit thumbnail array 500 is displayed during the GOP mode while only the frame-unit thumbnail array 600 is displayed during the frame mode. In the seventh embodiment, the GOP and frame modes are alternately selected by making a special operation, for example, by operating the Option button.

In this seventh embodiment, when a specific frame in GOP corresponding to a certain GOP-unit thumbnail is set as an edition start point and a specific frame in GOP corresponding to another GOP-unit thumbnail is set as an edition end point, operations are controlled and edit-point setting operations are effected as will be described below. The operation control and edit-point setting operations will be explained with reference to changes on the display screen.

Figure 28A:
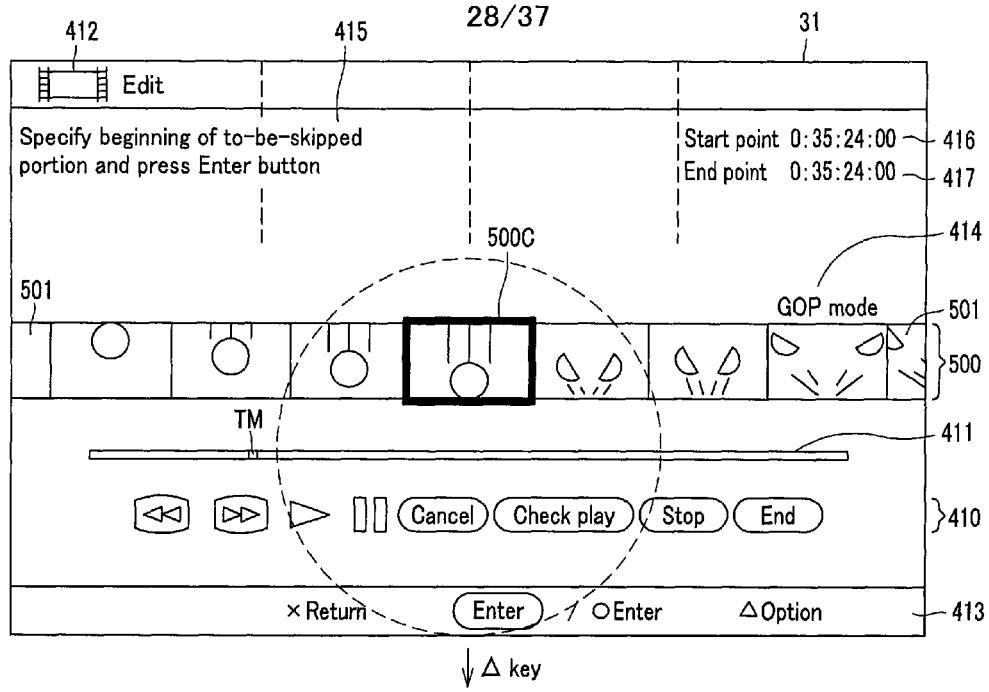
FIGS. 28A and 28B explain the edit-point setting user-interface screen in a seventh embodiment of the video data editing method according to the present invention.

First, the user operates the Left or Right key when the multimedia recorder/player 10 is in the GOP mode as shown in FIG. 28A to select GOP which will include a picture frame as an edition start point by taking a corresponding GOP-unit thumbnail as a currently-selected GOP-unit thumbnail in the area 500C. On the GOP-mode screen, there is displayed "GOP mode" in the edit-point select mode field 414 as in the aforementioned embodiments.

Figure 28B:
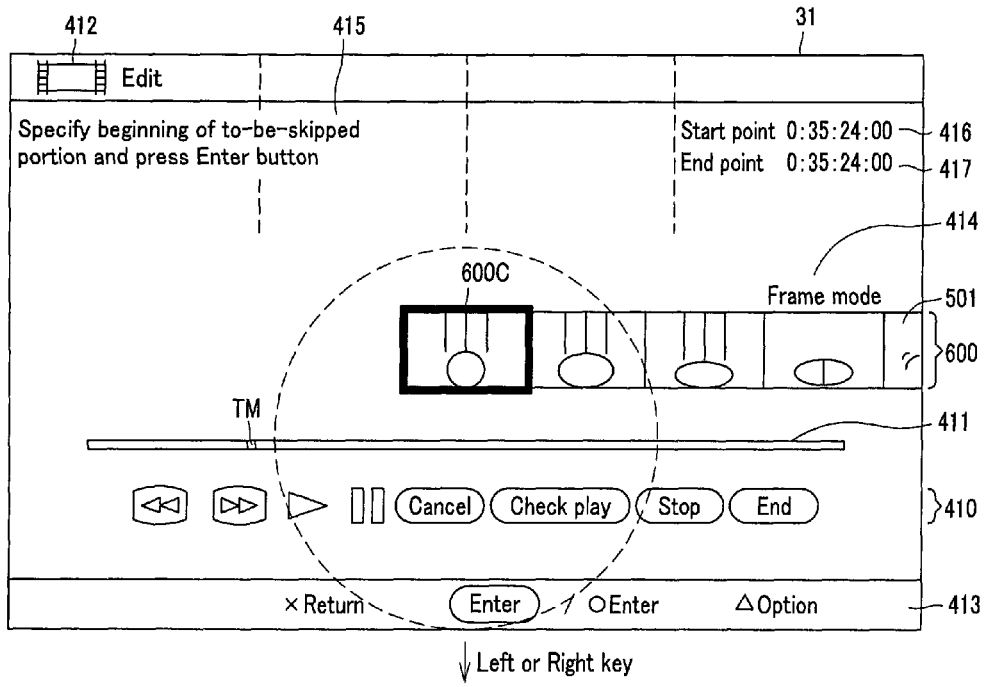

After completion of the selection of GOP which will include a picture frame which is to be an edition start point as a currently-selected GOP-unit thumbnail, the user operates the Option button to shift the multimedia recorder/player 10 from the GOP mode to frame mode, to thereby erase the GOP-unit thumbnail array 500 and display a frame mode screen in which the frame-mode thumbnail array 600 is to be displayed as shown in FIG. 28B. On the frame mode screen, there is displayed "Frame mode" in the edit-point select mode field 414 as in the aforementioned embodiments.

Figure 29A:
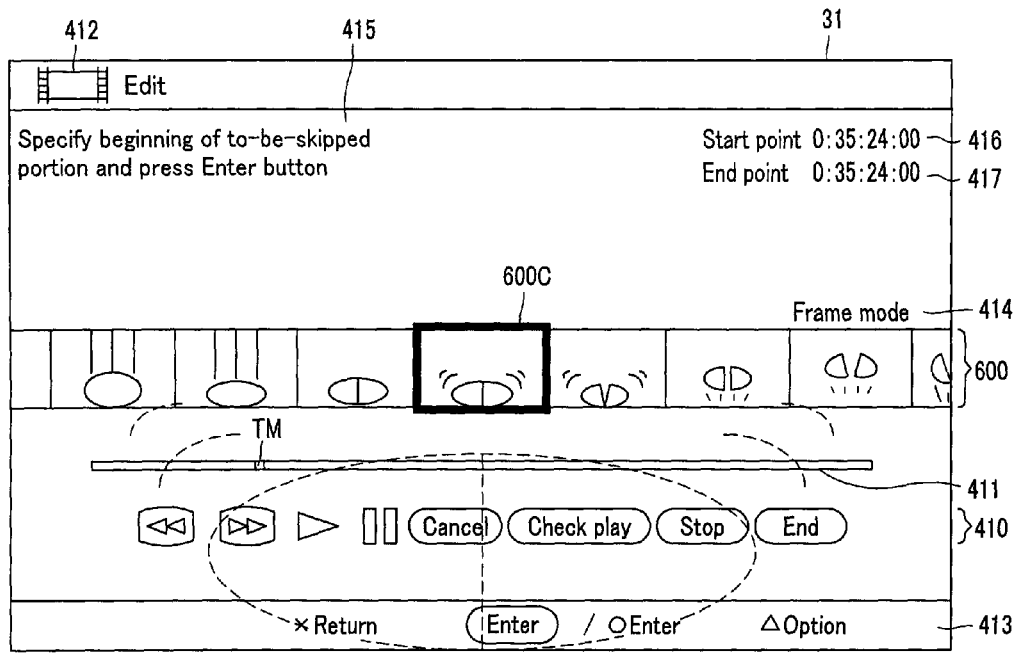
FIGS. 29A and 29B explain the edit-point setting user-interface screen in the video data editing method as the seventh embodiment of the present invention.
Figure 29B:
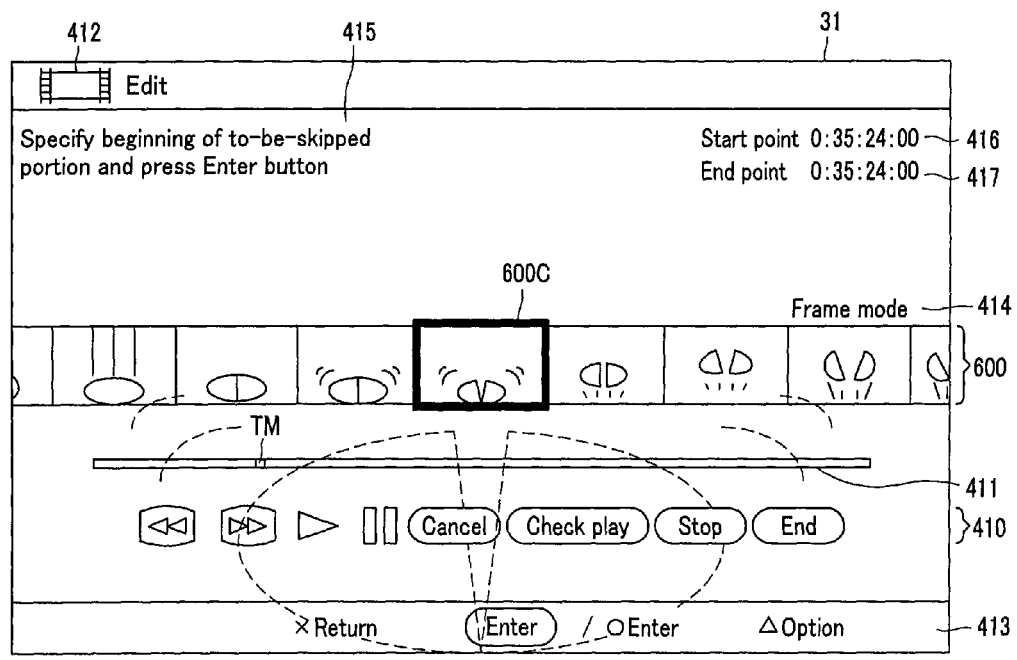

Then, the user selects a frame-unit thumbnail corresponding to a picture frame as the edition start point as a currently-selected frame-unit thumbnail in the area 600C by operating the Left or Right key when the multimedia recorder/player 10 is in the frame mode to move the frame-unit thumbnail array 600 as shown in FIGS. 29A and 29B.

Then, the user operates the Enter key 42 as shown in FIG. 29B for example to set, in the frame mode screen, a picture frame corresponding to the currently-selected frame-unit thumbnail as an edition start point. Then, the controller 102 will store information on the set edition start point into the data storage unit 120 in correspondence to a to-be-edited video content as having previously been described.

Figure 30A:
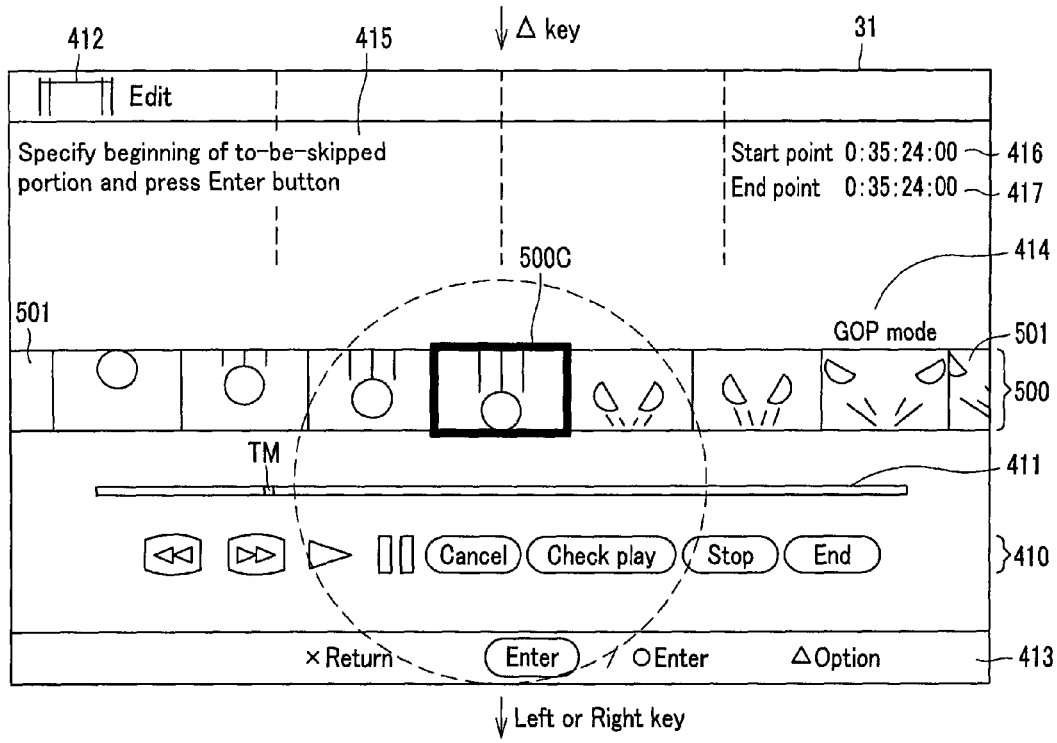
FIGS. 30A and 30B explain the edit-point setting user-interface screen in the video data editing method as the seventh embodiment of the present invention.

Next, the user operates the operation button 41 in this example to select GOP which will include the picture frame as the edition end point as shown in FIG. 29B. Then, the multimedia recorder/player 10 is shifted from the frame mode to GOP mode and the GOP mode screen is displayed as shown in FIG. 30A. At this time, the message field 415 will indicate "Message for prompting setting of edition end point" instead of "Message for prompting setting of edition start point" having ever been displayed.

Figure 30B:
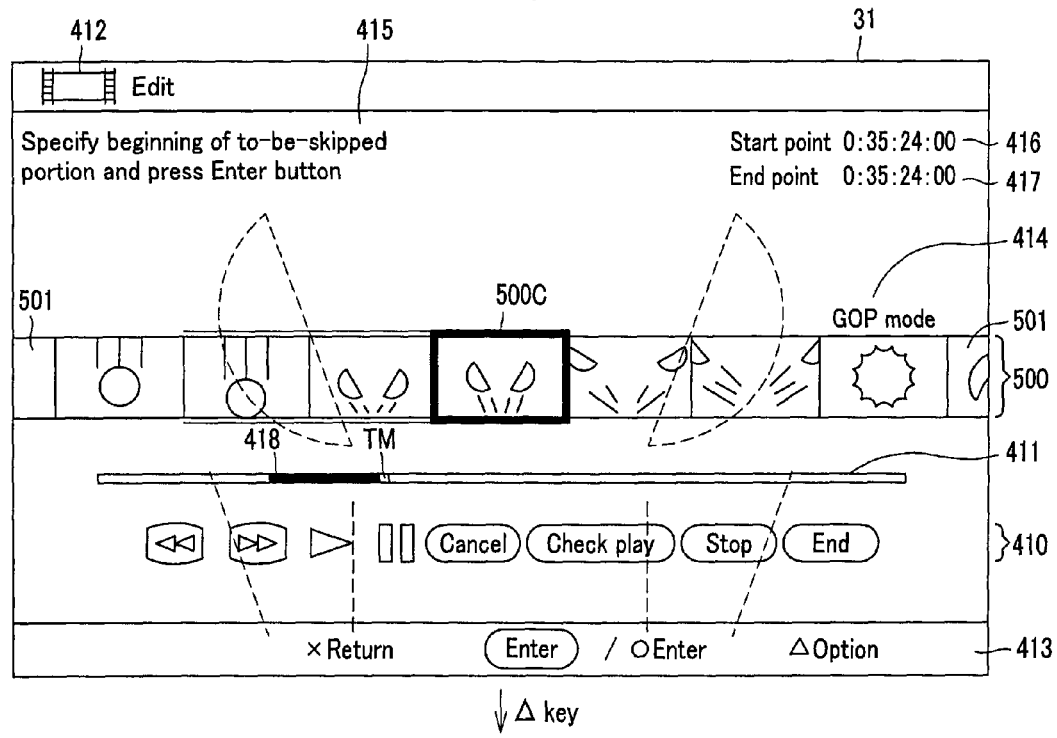

When the user operates the Left or Right key during the GOP mode, GOP which will include a picture frame which is to be an edition end point is selected by taking a GOP-unit thumbnail corresponding to the GOP as a currently-selected GOP-unit thumbnail in the area 500C as shown in FIG. 30B.

At this time, a section from the edition start point to the currently-selected GOP-unit thumbnail is displayed as a section mark 418 on the time bar 411 as shown in FIG. 30B and all the thumbnails including from the GOP-unit thumbnail in GOP including the edition start point to a currently-selected GOP-unit thumbnail which is assumed to include a frame as an edition end point are emphatically displayed being framed in a noticeable color. FIG. 30B shows a GOP-unit thumbnail of a corresponding section displayed emphatically with a doublet.

Figure 31A:
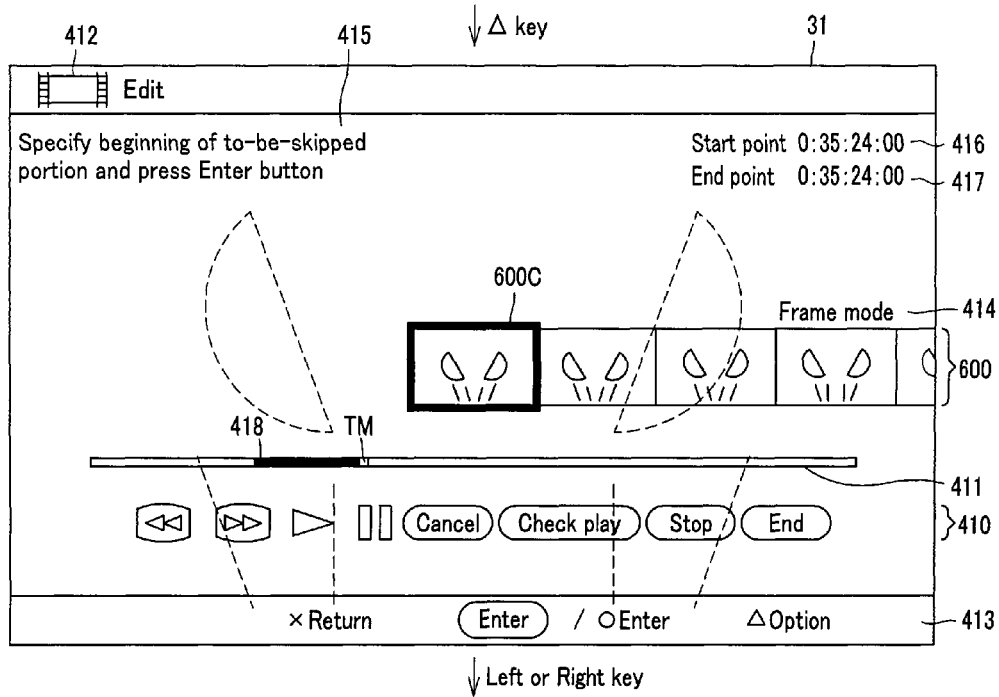
FIGS. 31A and 31B explain the edit-point setting user-interface screen in the video data editing method as the seventh embodiment of the present invention.

After completion of the section of the currently-selected GOP-unit thumbnail, the user operates the Option button, for example in this example, on the screen shown in FIG. 30B for example to shift the multimedia recorder/player 10 from the GOP mode to frame mode, to thereby display a frame mode screen as shown in FIG. 31A.

Figure 31B:
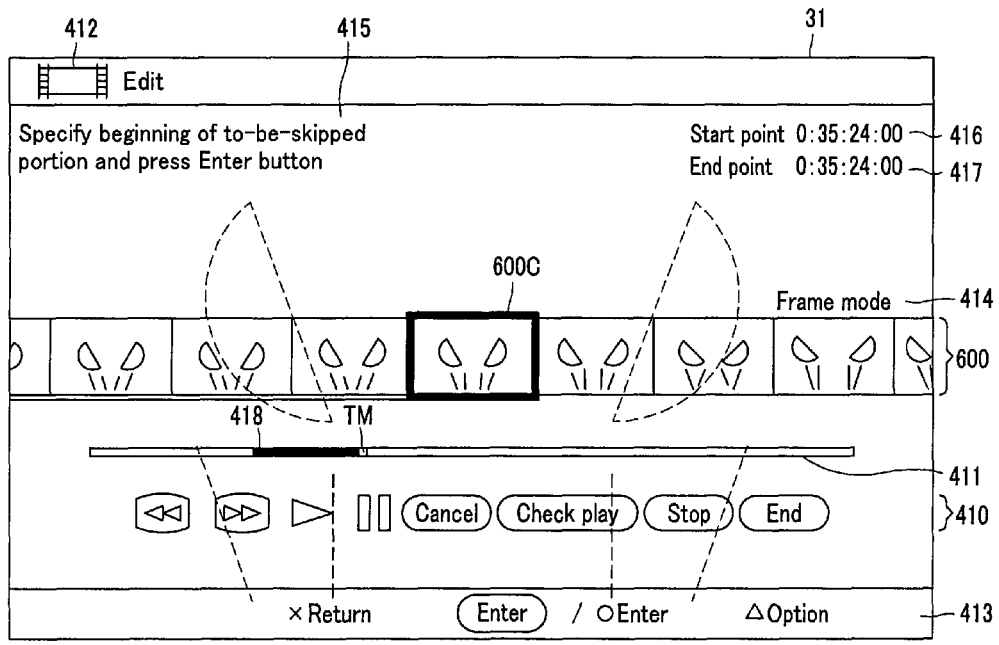
Figure 32A:
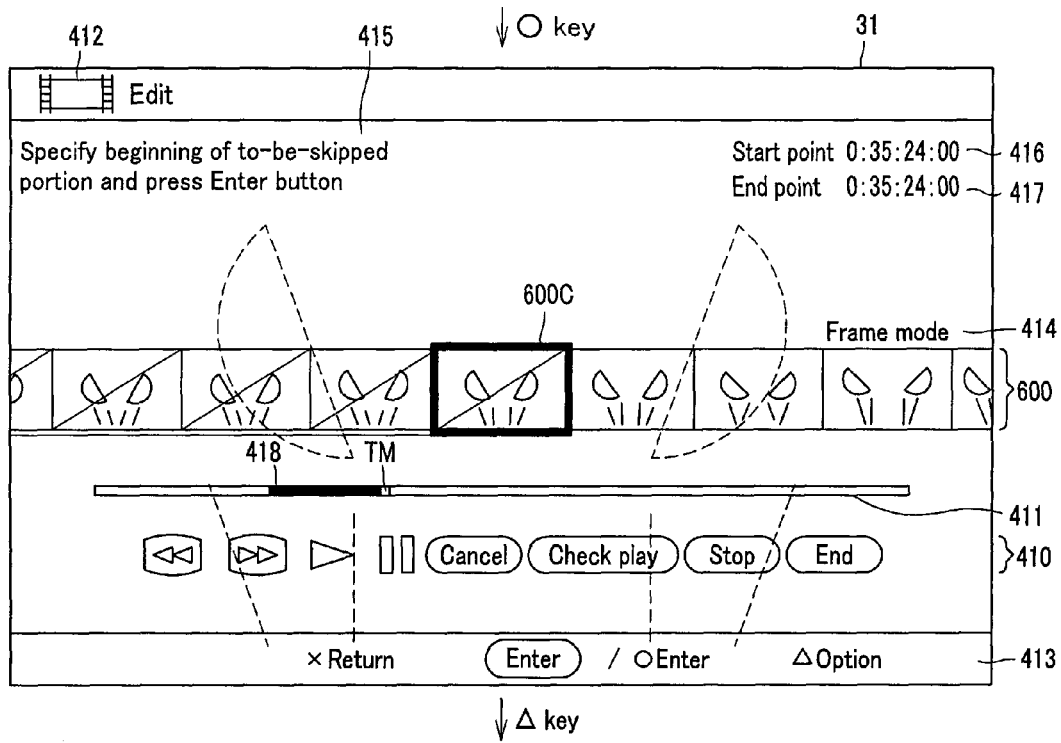
FIGS. 32A and 32B explain the edit-point setting user-interface screen in the video data editing method as the seventh embodiment of the present invention.

Then, the user operates the Left or Right key during the frame mode to move the frame-unit thumbnail array 600 as shown in FIGS. 31B and 32A, to thereby select a frame-unit thumbnail corresponding to the picture frame as an edition end point by taking the latter as a currently-selected frame-unit thumbnail in the area 600C.

Figure 32B:
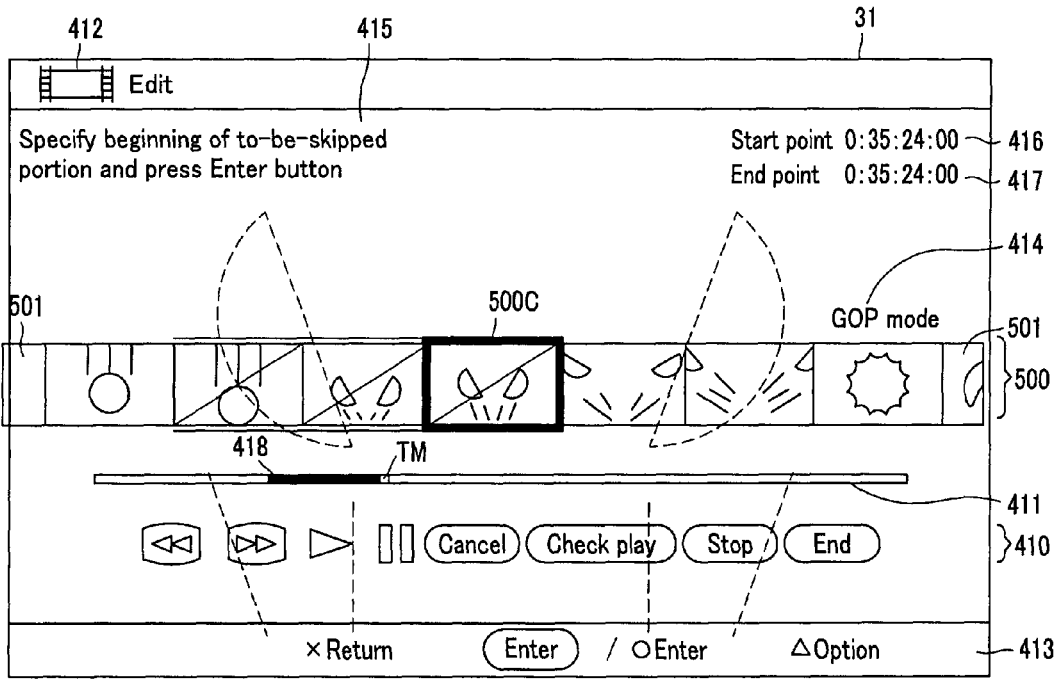

Then, the user operates the Enter key 42 as shown in FIG. 32B for example to set, in the frame mode screen, a picture frame corresponding to the currently-selected frame-unit thumbnail as an edition end point. Then, information on the set edition end point is stored in the data storage unit 120 in correspondence to a to-be-edited video content as having previously been described.

At this time, when the user has selected and set a frame-unit thumbnail as an edition end point, a section, of the GOP- and frame-unit thumbnail arrays 500 and 600, from the edition start point to edition end point is indicated hatched as shown in FIG. 32A to inform the user of the section. That is, when the user has operated the Enter key 42 for an edition end point, a section from a GOP-unit thumbnail including the edition start point to a frame-unit thumbnail as an edition end point is displayed differently from other thumbnails as shown in FIG. 25A. It should be noted here that for differentiation of each thumbnail from other thumbnails, the thumbnail is displayed deeply, displayed in a color different from those of the other thumbnails, displayed being framed in a different color or displayed otherwise.

Next, to go to another GOP in order to set an edition start point and edition end point of another section, the user operates the Option button in this embodiment. Then, the multimedia recorder/player 10 returns to the GOP mode as shown in FIG. 32B, and subsequently a next edition start point and edition end point are set as above. Thus, edition start points and edition end points of a plurality of necessary sections can be set.

Next, the operations of the controller 102 in the seventh embodiment will be explained with reference to flow diagrams in FIGS. 33 and 34. The aforementioned flow of operations of the first embodiment as shown in FIG. 4 are also quite true with the seventh embodiment, and so will not be explained any more below.

Figure 33:
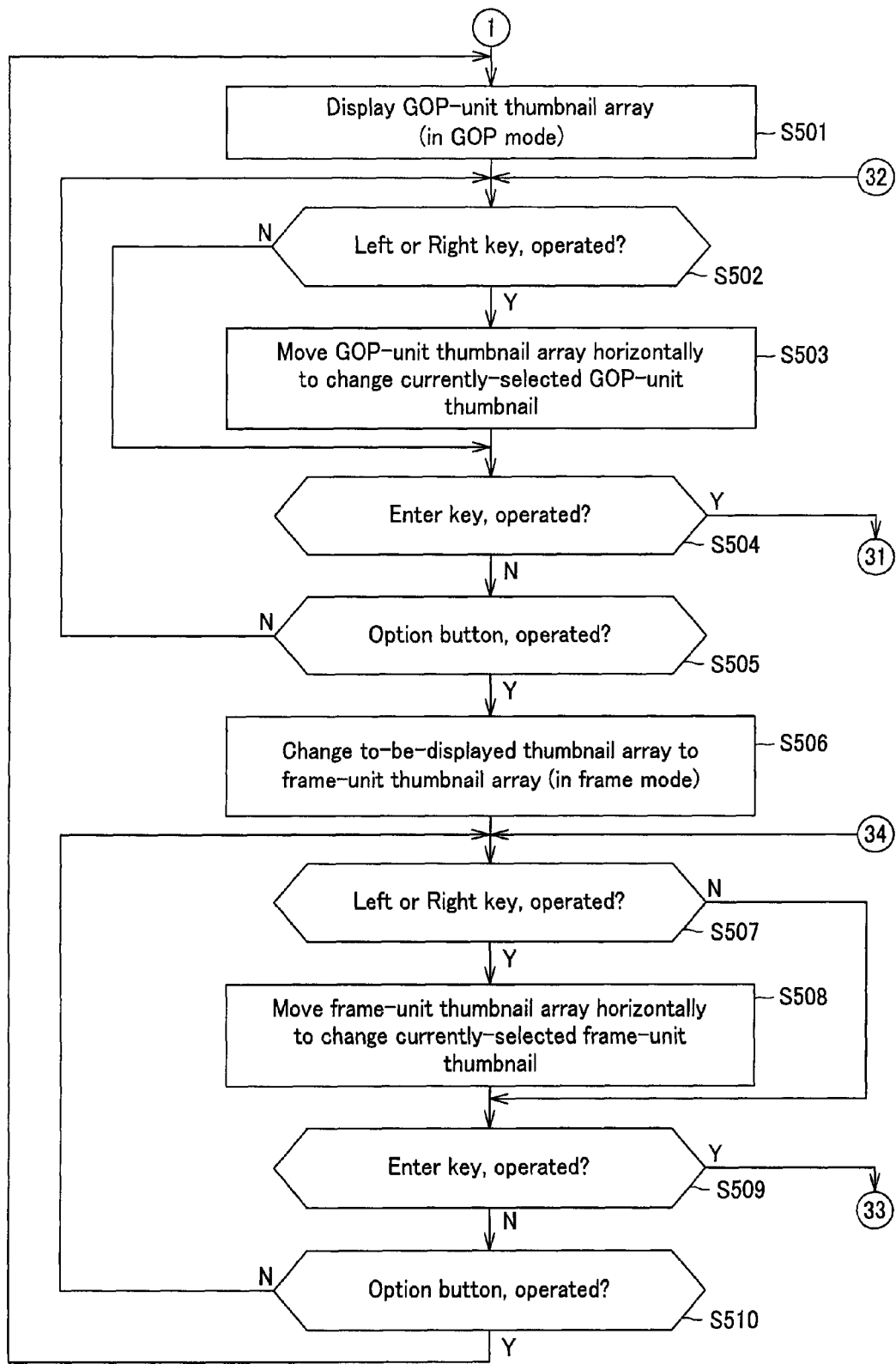
FIG. 33 shows a part of the flow diagram explaining the operations made for setting edit points in the video data editing method as the seventh embodiment of the present invention.
Figure 34:
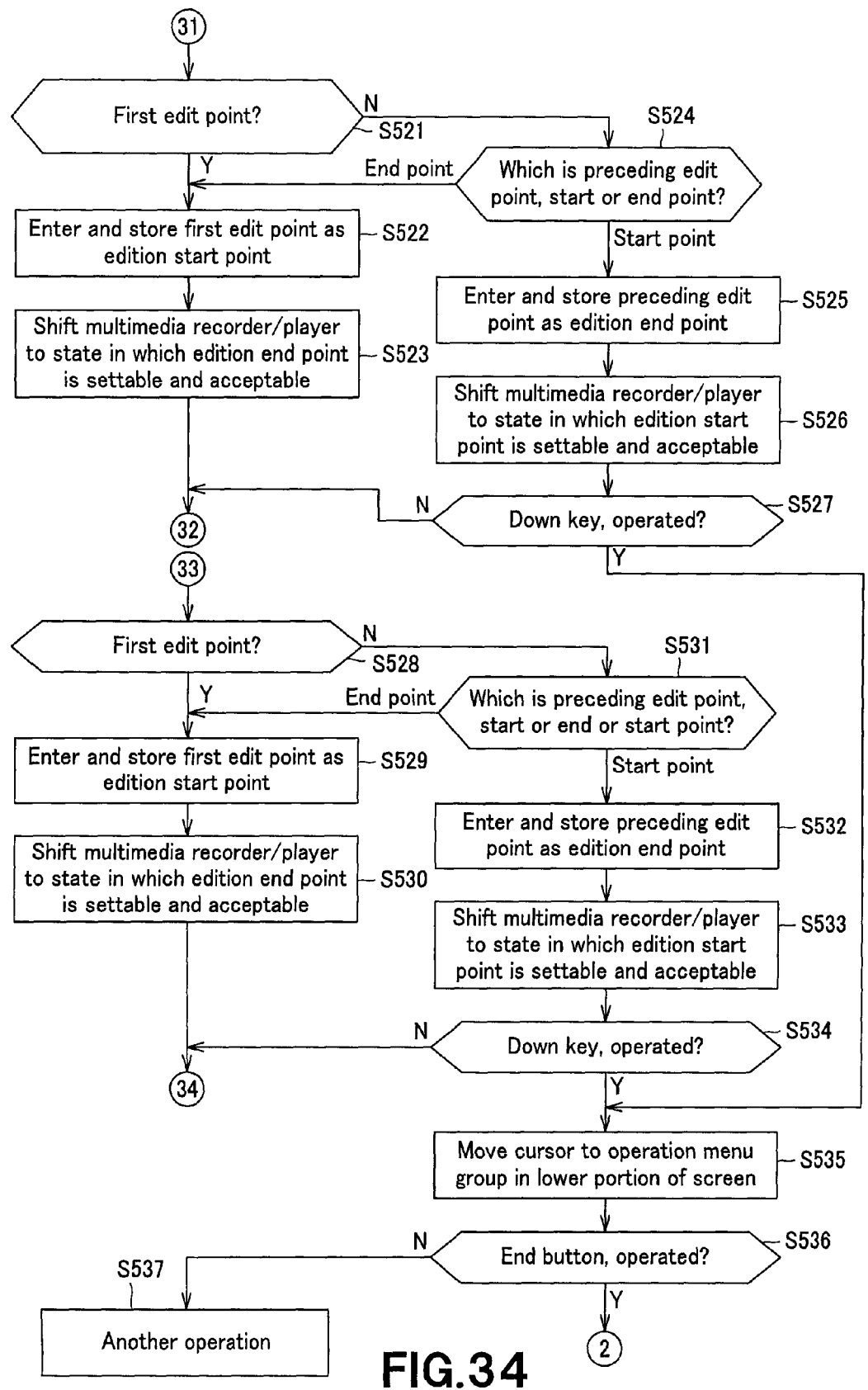
FIG. 34 shows a part of the flow diagram explaining the operations made for setting edit points in the video data editing method as the seventh embodiment of the present invention.

FIGS. 33 and 34 show flows of essential operations of the controller 102 in the seventh embodiment, being continued from the flow of operation shown in FIG. 4.

In case the controller 102 decides in step S115 in FIG. 4 that the Pause button has been operated, it goes to step S501 in FIG. 33 where it will stop one of reproduced pictures being displayed on the display screen 31 of the monitor display 30 when the Pause button is operated and shift the multimedia recorder/player 10 to the GOP mode (group-unit edit point select mode) in which a fifteenth one of 15 frames in one GOP can be set as an edit point.

In the GOP mode, the controller 102 monitors in step S502 whether the Left or Right key on the operation command input unit 40 or remote commander 50 has been operated. In case the controller 102 decides that the Left or Right key has been operated, it goes to step S503 where it will control the on-screen image generation/output unit 111 to move the GOP-unit thumbnail array 500 as a whole leftward or rightward to change the currently-selected GOP-unit thumbnail.

In case the controller 102 decides in step S502 that the Left or Right key has not been operated or after the currently-selected GOP-unit thumbnail is changed in step S503, it goes to step S504 where it will determine whether the Enter key 42 has been operated. In case the controller 102 decides in step S504 that the Enter key 42 has been operated, it goes to step S521 in FIG. 34 where it will whether the Enter key 42 has been operated for the first time after the edit mode is started, that is, whether the edit point is a first one (first edition start point).

In case the controller 102 decides in step 521 that the set edit point is a first one, it goes to step S522 where it will take, as frame position information on the edition start point (IN point), information on the position, in a to-be-edited content, of a picture frame corresponding to the currently-selected GOP-unit thumbnail, for example, information on a relative time point of the picture frame at the edit point from the beginning of the to-be-edited content, and write the time point information in correspondence to data in the to-be-edited content in the data storage unit 120. Next, the controller 102 goes to step S523 where it will shift the multimedia recorder/player 10 to a state in which an edition end point is settable and acceptable, and then goes back to step S502 where it will repeat the operations in step S502 and subsequent steps.

Also, in case the controller 102 decides that the set edit point is not any first one, it goes to step S524 where it will determine whether the set edit point is an edition start or end point. In case the controller 102 decides in step S524 that the preceding set edit point is an edition end point, it goes back to step S522 where it will repeat the operations in step S522 and subsequent steps.

In case the controller 102 decides in step S524 that the preceding set edit point is an edition start point, it goes to step S525 where it will determine the set edit point (edit point of each picture frame) as information on the frame position of the edition end point (OUT point) and write it in correspondence to data in a to-be-edited content in the data storage unit 120.

Thereafter, when the storage of the edition end point is complete in step S525, the controller 102 goes to step S526 where it will shift the multimedia recorder/player 10 to a state in which an edition start point is settable and acceptable, and to step S527 where it will determine whether the Down key has been operated. In case the controller 102 decides in step S527 that the Down key has not been operated, it goes back to step S502 where it will repeat the operations in step S502 and subsequent steps.

Also, in case the controller 102 decides in step S527 that the Down key has been operated, it goes to step S535 where it will decide that an operation for returning from the frame mode or GOP mode to the search play mode, shift the multimedia recorder/player 10 from the GOP mode to search play mode, display the operation button icon group 410 in the lower portion of the screen deeply and move the cursor to the operation button icon group 410.

Then, the controller 102 determines in step S536 whether the End button icon in the operation button icon group 410 has been operated. In case the controller 102 decides that the End button icon has been operated, it goes back to step S109 in FIG. 4 where it will display an option menu screen on the display screen 31.

In case the controller 102 decides in step S536 that the End button icon has not been operated, it goes to step S537 where it will make another operation such as search play or the like corresponding to the operation of the play button icon, fast forward icon, rewind icon or the like.

Also, in case the controller 102 decides in step S504 that the Enter key 42 has not been operated, it goes to step S505 where it will determine whether the operation button 41 has been operated. In case the controller 102 decides in step S505 that the operation button 41 has not been operated, it goes back to step S502.

In case the controller 102 decides in step S505 that the operation button 41 has been operated, it goes to step S506 where it will shift the multimedia recorder/player 10 from the GOP mode to frame mode, erase the GOP-unit thumbnail array 500 from the screen as shown in FIG. 28B for example and display the frame-unit thumbnail array 600 horizontally on the screen.

Next, the controller 102 determines in step S507 whether the Left or Right key has been operated. In case the controller 102 decides that the Left or Right key has been operated, it goes to step S508 where it will move the frame-unit thumbnail array 600 in a direction corresponding to a direction designated by the key to change the currently-selected frame-unit thumbnail in the area 600C.

Next to step S508, the controller 102 goes to step S509 where it will determine whether the Enter key 42 has been operated. Also in case the controller 102 decides in step S507 that the Left or Right key has not been operated, it goes to step S509 where it will determine whether the Enter key 42 has been operated.

In case the controller 102 decides in step S509 that the Enter key 42 has not been operated, it goes to step S510 where it will determine whether the operation button 41 has been operated. In case the controller 102 decides that the operation button 41 has not been operated, it goes back to step S507 where it will repeat the operations in step S507 and subsequent steps.

Also, in case the controller 102 decides in step S411 that the operation button 41 has been operated, it goes back to step S501 where it will erase the frame-unit thumbnail array 600 and thus display only the GOP-unit thumbnail array 500.

In case the controller 102 decides in step S509 that the Enter key 42 has been operated, it goes to step S528 in FIG. 34 where it will determine whether the Enter key 42 has been operated for the first time after the edit mode is started, that is, whether a first edit point (first edition start point) has been set.

In case the controller 102 decides in step 528 that the set edit point is a first one, it goes to step S529 where it will take, as frame position information on the edition start point (IN point), information on the position, in a to-be-edited content, of a picture frame corresponding to the currently-selected GOP-unit thumbnail, for example, information on a relative time point of the picture frame at the edit point from the beginning of the to-be-edited content, and write the time point information in correspondence to data in the to-be-edited content in the data storage unit 120. Next, the controller 102 goes to step S530 where it will shift the multimedia recorder/player 10 to a state in which an edition end point is settable and acceptable, and then goes back to step S507 where it will repeat the operations in step S507 and subsequent steps.

Also, in case the controller 102 decides in step S528 that the set edit point is not any first one, it goes to step S531 where it will determine whether the set edit point is an edition start or end point. In case the controller 102 decides in step S531 that the preceding set edit point is an edition end point, it goes back to step S529 where it will repeat the operations in step S529 and subsequent steps.

In case the controller 102 decides in step 531 that the preceding set edit point is an edition start point, it goes to step S532 where it will determine the set edit point (edit point of each picture frame) as information on the frame position of the edition end point (OUT point) and write it in correspondence to data in a to-be-edited content in the data storage unit 120.

Thereafter, when the storage of the edition end point is complete in step S532, the controller 102 goes to step S533 where it will shift the multimedia recorder/player 10 to a state in which an edition start point is settable and acceptable, and to step S534 where it will determine whether the Down key has been operated. In case the controller 102 decides in step S534 that the Down key has not been operated, it goes back to step S507 where it will repeat the operations in step S507 and subsequent steps.

Also, in case the controller 102 decides in step S534 that the Down key has been operated, it goes to step S535 where it will decide that an operation for returning from the frame mode or GOP mode to the search play mode, shift the multimedia recorder/player 10 from the GOP mode to search play mode, display the operation button icon group 410 in the lower portion of the screen deeply and move the cursor to the operation button icon group 410.

Then, the controller 102 determines in step S536 whether the End button icon in the operation button icon group 410 has been operated. In case the controller 102 decides that the End button icon has been operated, it goes back to step S109 in FIG. 4 where it will display an option menu screen on the display screen 31.

In case the controller 102 decides in step S536 that the End button icon has not been operated, it goes to step S537 where it will make another operation such as search play or the like corresponding to the operation of the play button icon, fast forward icon, rewind icon or the like.

In the seventh embodiment, edit points can be set by selecting either of the GOP and frame modes by operating the Option button, for example. This edit-point setting operation is very friendly to the user.

Since only one of the frame- and GOP-unit thumbnail arrays 600 and 500 is displayed on the screen, the display screen is less concealed by the thumbnail array so that the time bar 411 or the other will not be concealed.

In the seventh embodiment, letters "GOP mode" or "Frame mode" is indicated in the edit-point select mode field 414 on the screen to inform the user of an edition mode being selected. The GOP-unit thumbnail array 500 and frame-unit thumbnail array 600 may be displayed in different colors and their peripheries are in different colors, respectively, for differentiation between the GOP and frame modes by the user.

Eighth Embodiment of the Video Data Editing Method

In the eighth embodiment, edit points are set in the aforementioned GOP and frame modes, the set edit point data is stored into the data storage unit 120 in correspondence to a to-be-edited content, and then the stored edit point data is read as an edit point list, for example. In the edit point list, the edit points can be fine-adjusted at each frame.

First in the eighth embodiment, the user sets edition start and end points for a necessary number of places for a to-be-edited content in the GOP mode, for example. Then, the edit point list can be fine-adjusted for each frame. Of course, edit points may be set finely for each frame in the frame mode as well as in the GOP mode. The eighth embodiment is also advantageous in that the edit point list can advantageously be read later for correction.

In the edit point list, the item "Edit" in the option menu as shown in FIG. 8B includes a plurality of underlying options so that edit points can be selected from the underlying options.

FIGS. 35A, 35B and 35C show examples of the option menu screen for explanation of the eighth embodiment. For example, when the user makes an operation to call the edit point list, the display screen 31 will display an edit point list screen as shown in FIG. 35A.

In the edit point list screen, a plurality of edit point sets 700 set for a to-be-edited content is displayed in a sequence of their elapsed time. In this example, not all the edit point set of a to-be-edited content are displayed at a time but about three sets are displayed as shown, for example.

Then, the user operates the Up or Down key, for example, to move all the edit point sets being displayed so that the other edit point sets can be displayed on the display screen. In this example, when the Up key is operated, three edit point sets 700 are moved upward so that latest edit point sets will appear on the display screen. On the other hand, when the Down key is operated, three edit point sets 700 are moved downward so that earlier edit point sets will appear on the display screen.

One edit point set 700 includes a pair of a thumbnail 701 of a frame which is an edition start point and a thumbnail 702 of a frame which is an edition end point and a pair of a time indication 711 of the edition start point and a time indication 712 of the edition end point.

Further, on the edit point list screen in this example, there is displayed a time bar 720 with a section mark PM indicating a portion of an entire time length of a to-be-edited content which each of the edit point sets shares.

In FIGS. 35A, 35B and 35C, the edit point (edition start or end point) enclosed by a dash line is in a currently-selected edit point position 731. An edit point in the currently-selected edit point position 731 is selected as an edit point of interest, that is, as an edit point to be fine-adjusted. The currently-selected edit point position 731 is displayed in a predetermined color different from the rest or being highlighted for information to the user, for example. In this case, when the Up or Down key is pressed, the content in the currently-selected edit point position 731 is changed for each of the edition start and end points, not for each edit point set.

In this example, the currently-selected edit point position 731 is not movable but an edit point of interest selected in the currently-selected edit point position 731 is changed being moved vertically by operating the Up or Down key. When the Enter key 42 is operated while an edit point is being displayed in the currently-selected edit point position 731, the edit point of interest displayed in the currently-selected edit point position 731 can be fine-adjusted. That is, when the user operates the Enter key 42, edit-point changeability marks 732 are indicated in the currently-selected edit point position 731 as shown in FIG. 35B to inform the user that the edit point of interest can be changed.

When the user operates the Up key while the screen in FIG. 35B is being displayed, an edit point preceding a frame which is the edit point of interest is changed. When the user operates the Down key, the edit point is changed to an edit point following the frame as the edit point of interest. When the user operates the Enter key 42 after change or correction of the edit point of interest, the edit-point changeability mark 732 disappears as shown in FIG. 35C, the currently-selected edit point position 731 is displayed again, and the user is informed that the changed edit point has been set.

Then, the controller 102 detects the operation of the Enter key 42 and rewrites data on the edit point of interest in the data storage unit 120 to information on a time point of the frame which is the changed edit point, for example, information on a time point from the beginning of the to-be-edited content.

The above operations are made under a software program incorporated in the controller 102 as in the aforementioned embodiments. Next, mainly the operations of the controller 102 in the eighth embodiment will be explained below with reference to the flow diagrams in FIGS. 36 and 37.

Figure 36:
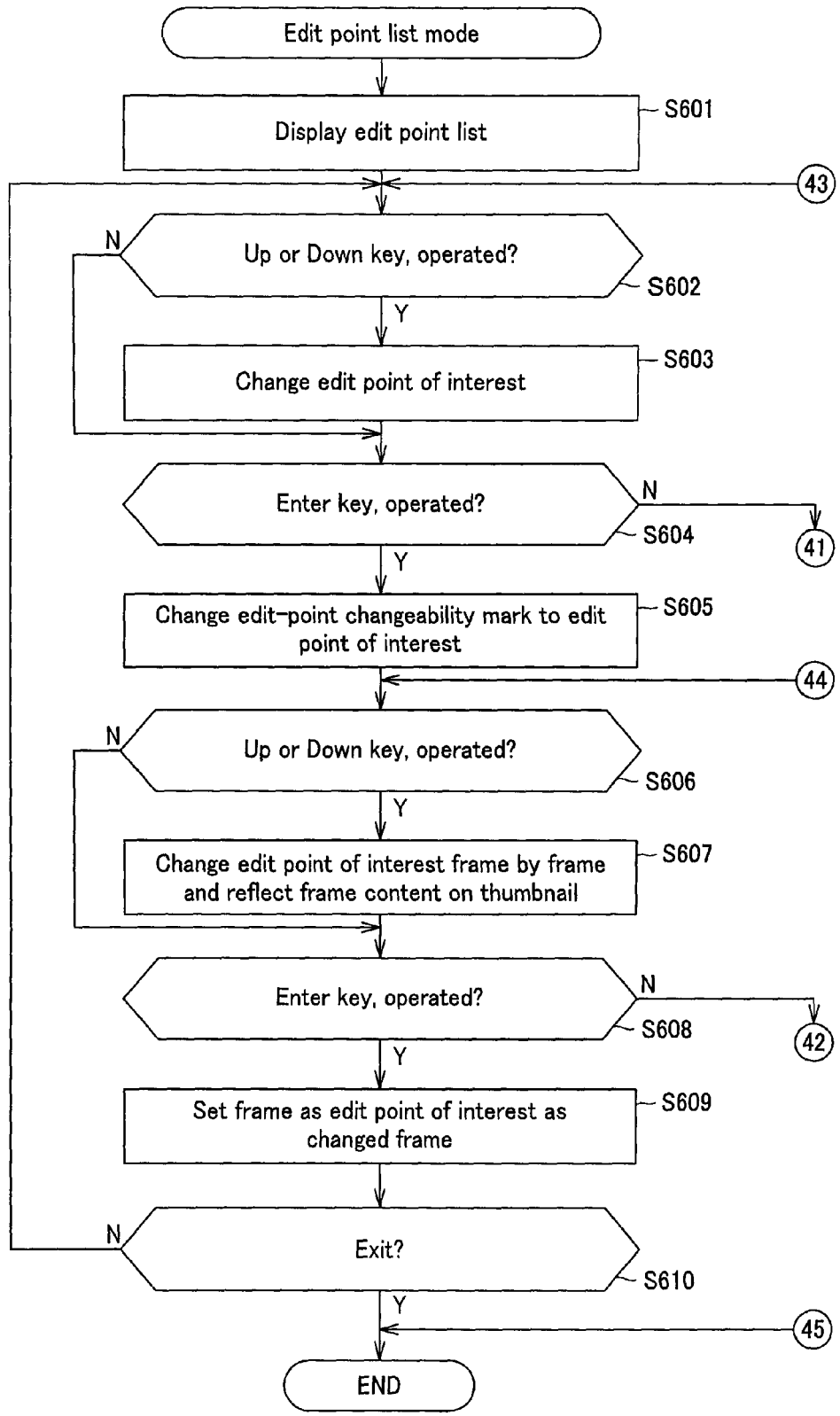
FIG. 36 shows a part of the flow diagram explaining the operations made for setting edit points in the video data editing method as the eighth embodiment of the present invention.
Figure 37:
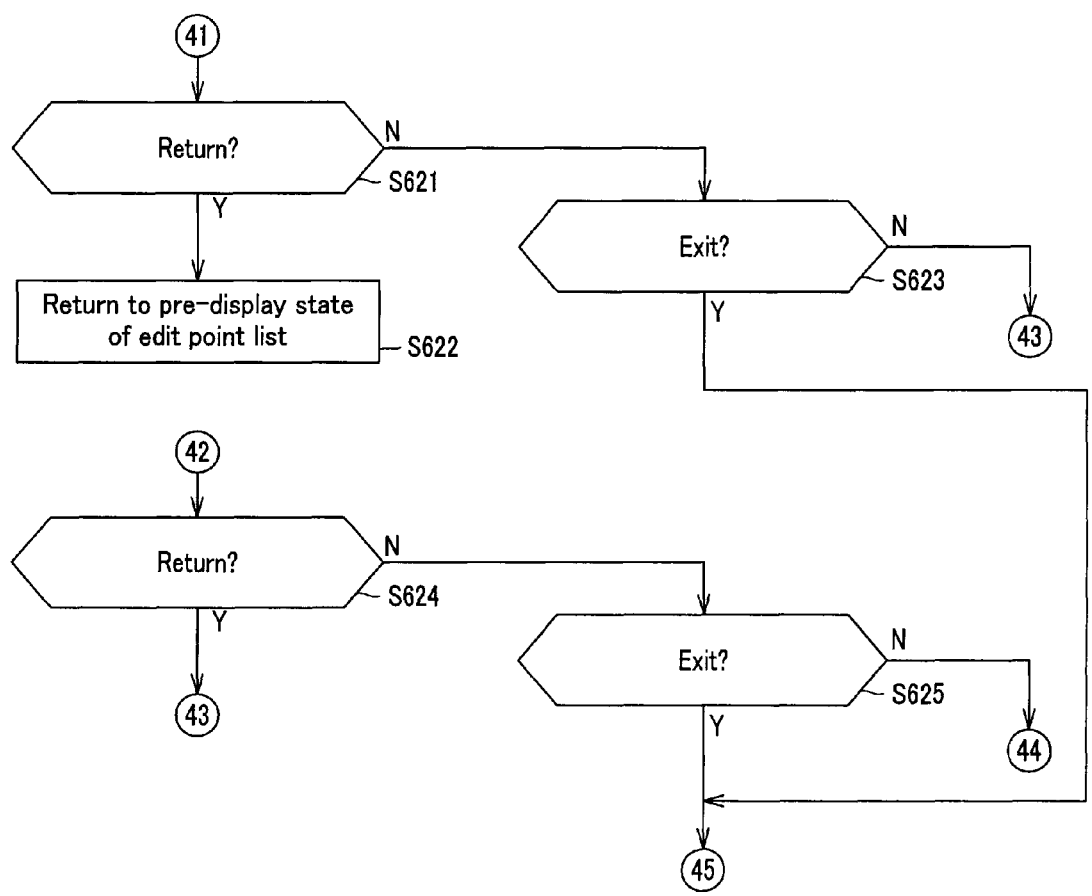
FIG. 37 shows a part of the flow diagram explaining the operations made for setting edit points in the video data editing method as the eighth embodiment of the present invention.

As above, in this eighth embodiment, selection by the user of the edit point list from the option menu makes the controller 102 start a flow of operations in FIGS. 36 and 37.

First in step S601, the controller 102 displays the edit point list shown in FIG. 35A on the display screen 31 of the monitor display 30. Next, the controller 102 goes to step S602 in which it will determine whether the Up or Down key has been operated. In case the controller 102 decides that the Up or Down key has been operated, it goes to step S603 where it will change an edit point of interest displayed in the currently-selected edit point position 731 correspondingly to the key operated.

Next, the controller 102 determines in step S604 whether the Enter key 42 has been operated. In case the controller 102 decides that the Enter key 42 has not been operated, it goes to step S621 in FIG. 37 where it will determine whether the Return key has been operated. In case the controller 102 decides that the Return key has been operated, it goes to step S622 where it will restore the state in which the edit point list is not yet displayed.

Also, in case the controller 102 decides in step S621 that the Return key has not been operated, it goes to step S623 where it will determine whether an exit operation has been made. In case the controller 102 decides that no such operation has been made, it goes back to step S602. In case the controller 102 decides that the exit operation has been made, it exits this operation routine.

In case the controller 102 decides in step S604 that the Enter key 42 has been operated, it goes to step S605 where it will recognize the edit point of interest as an edit point to be fine-adjusted and display the edit point changeability marks 732 at the edit point of interest.

Then the controller 102 determines in step S606 whether the Up or Down key has been operated. In case the controller 102 decides that the Up or Down key has been operated, it goes to step S607 where it will change the edit point of interest for each frame and change a corresponding thumbnail on the display screen 31 to that changed edit point of interest.

Next, the controller 102 determines in step S608 whether the Enter key 42 has been operated. In case the controller 102 decides that the Enter key 42 has not been operated, it goes to step S624 in FIG. 37 where it will determine whether the Return key has been operated. In case the controller 102 decides that the Return key has been operated, it goes back to step S602 where it will restore the state in which an edit point of interest is to be set.

Also, in case the controller 102 decides in step S624 that the Return key has not been operated, it goes to step S625 where it will determine whether an exit operation has been made. In case the controller 102 decides that no such operation has been made, it goes back to step S606. In case the controller 102 decides that the exit operation has been made, it exits this operation routine.

It should be noted that although in the above embodiment, after edit points are set in the GOP, frame or GOP/frame mode, the edit point list is read to select an edit point of interest and the edit point of interest is changed or corrected for each frame, the embodiment may be adapted so that using the aforementioned edit point list, the edit-point setting mode is used as the frame mode which is to be selected in response to a user's instruction after use of the GOP mode. In the above embodiment, the multimedia recorder/player 10 is shifted to the GOP mode or GOP/frame mode when the user operates the Pause button during the search play mode. However, the multimedia recorder/player 10 may be shifted so in any manner other than the above. The above embodiment may be adapted such that the GOP or GOP/frame mode is selected by operating a specific button, for example, Option button, after search is made around edit points by operating the Pause and Stop buttons.

In the above embodiment, image data is compressed with the MPEG technique and the GOP-unit thumbnail is a thumbnail of I picture. However, it is of course that the GOP-unit may not be any I picture.

Also, image data is compressed with the MPEG technique in the above embodiment. However, data compression may be done with any compression technique other than the MPEG The technique may be such that image data can be compressed in units of a plurality of frames.

Also it is of course that the operation for shifting the multimedia recorder/player 10 from the GOP mode to frame mode, operation for shifting from the frame mode to GOP mode and operation for shifting from the edit-point setting mode in the GOP or frame mode to the search play mode are not limited to the above.

The present invention has been explained above concerning the application thereof to setting of start and end points of a section over which it is desired to skip. However, the video data editing method according to the present invention is also applicable to setting of only a start point or end point, for example.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A video data editing apparatus, comprising:
an operation command input unit to accept a user operation command;
a storage unit to store video data compressed into a plurality of picture frame groups, each of the plurality of picture frame groups including a plurality of picture frames; and
an edit mode controller configured to,
make, based on a predetermined-operation command supplied via the operation command input unit, a selection between a group-unit edit point select mode and a frame-unit edit point select mode, a command for selection of a picture frame group of the video data stored in the storage unit is accepted via the operation command input unit to change the currently-selected picture frame group in the group-unit edit point select mode, a command for selection of one frame of a plurality of picture frame groups included in the currently-selected picture frame group is accepted via the operation command input unit to change the currently-selected picture frame in the frame-unit edit point select mode, and
set, as an edit point, a picture frame corresponding to the result of selection in the group-unit edit point select mode or a picture frame corresponding to the results of selection in the group- and frame-unit edit point select modes in response to a set command supplied via the operation command input unit.

2. A video data editing apparatus, comprising:
an operation command input unit to accept a user operation command;
a storage unit to store video data compressed into a plurality of picture frame groups each of the plurality of picture frame groups including a plurality of picture frames; and
an edit mode controller configured to
make, based on a predetermined-operation command supplied via the operation command input unit, a selection between a group-unit edit point select mode and a frame-unit edit point select mode, a group-unit thumbnail array in which a plurality of group-unit thumbnails each including a thumbnail of one picture frame in a picture frame group included in video data stored in the storage unit is laid in a sequence of their elapsed time being displayed and a command for changing a currently-selected group-unit thumbnail being accepted via the operation command input unit to change the currently-selected group-unit thumbnail in the group-unit edit point select mode, a frame-unit thumbnail array in which a plurality of frame-unit thumbnails each including a thumbnail of each of the plurality of picture frames included in a picture frame group corresponding to the currently-selected group-unit thumbnail is laid in a sequence of their elapsed time being displayed and a command for changing a currently-selected frame-unit thumbnail is accepted via the operation command input unit to change the currently-selected frame-unit thumbnail in the frame-unit edit point select mode, and
set, as an edit point, a frame corresponding to the currently-selected group- or frame-unit thumbnail in response to a set command supplied via the operation command input unit.

3. The apparatus of claim 2, wherein the edit mode controller displays, when the predetermined-operation command supplied is detected while the group-unit thumbnail array is being displayed in the group-unit edit-point select mode, the frame-unit thumbnail array for the picture frame corresponding to the currently-selected group-unit thumbnail in correspondence to the currently-selected group-unit thumbnail additionally to the group-unit thumbnail array to select the frame-unit edit-point select mode, and
erases, when the predetermined-operation command supplied is detected while the group- and frame-unit thumbnail arrays are being displayed simultaneously in the frame-unit edit-point select mode, the frame-unit thumbnail array to display only the group-unit thumbnail array, to thereby select the group-unit edit-point select mode.

4. The apparatus of claim 3, wherein the group-unit thumbnail array and frame-unit thumbnail array are displayed to intersect each other in a position of the currently-selected group-unit thumbnail.

5. The apparatus of claim 3, wherein the group- and frame-unit thumbnail arrays are displayed in two parallel lines, respectively; and
the currently-selected group-unit thumbnail is displayed distinguishably from other group-unit thumbnails.

6. The apparatus of claim 2, wherein only the group-unit thumbnail array is displayed in the group-unit edit-point select mode, while only the frame-unit thumbnail array is displayed in the frame-unit edit-point select mode, each of the group-unit edit-point select mode and the frame-unit edit-point select mode including an indication informing the user of the currently-selected modes.

7. A video data editing apparatus, comprising:
an operation command input unit to accept a user operation command;
a storage unit to store video data compressed into a plurality of picture frame groups, each of the plurality of picture frame groups including a plurality of picture frames; and an edition controller configured to,
  display, simultaneously on a display screen, a group-unit thumbnail array in which a plurality of group-unit thumbnails each being one picture frame thumbnail of the picture frame group in the video data stored in the storage unit is laid in a sequence of their elapsed time and one of the group-unit thumbnails is taken as a currently-selected group-unit thumbnail and a frame-unit thumbnail array in which a plurality of frame-unit thumbnails each being a thumbnail of each of a plurality of video frames included in the picture frame group corresponding to the currently-selected group-unit thumbnail is laid in a sequence of their elapsed time and one of the frame-unit thumbnails is taken as a currently-selected group-unit thumbnail,
  accept an operation made via a first control section of the operation command input unit as a command for changing a currently-selected group-unit thumbnail in the group-unit thumbnail array,
  accept an operation made via a second control section, different from the first control section, of the operation command input unit as a command for changing a currently-selected frame-unit thumbnail, and setting, in response to a set command supplied via the operation command input unit, a frame corresponding to the currently-selected group- or frame-unit thumbnail as an edit point.

8. The apparatus of claim 7, wherein:
the group- and frame-unit thumbnail arrays are displayed to intersect each other in the position of the currently-selected group-unit thumbnail;
the first control section of the operation command input unit is a directional control for controlling the array direction of the group-unit thumbnails; and
the second control section of the operation command input unit is a direction control for controlling the array direction of the frame-unit thumbnails.

9. The apparatus of claim 7, wherein when supplied with a predetermined-operation command via the operation command input unit in the group-unit edit-point select mode in which a group-unit thumbnail array in which the plurality of group-unit thumbnails is laid in a sequence of their elapsed time is displayed and a command for changing a currently-selected group-unit thumbnail, supplied via the operation command input unit is accepted to change the currently-selected group-unit thumbnail, the edition controller shifts to the state in which the group- and frame-unit thumbnail arrays are displayed simultaneously on the display screen.

10. A video data editing apparatus, comprising:
an operation command input unit to accept a user operation command;
a storage unit to store video data compressed into a plurality of picture frame groups each of the plurality of picture frame groups including a plurality of picture frames; and
an edition controller configured to,
  display, simultaneously on a display screen, a group-unit thumbnail array in which a plurality of group-unit thumbnails each being one picture frame thumbnail of the picture frame group in the video data stored in the storage unit is laid in a sequence of their elapsed time and one of the group-unit thumbnails is taken as a currently-selected group-unit thumbnail and a frame-unit thumbnail array in which a plurality of frame-unit thumbnails each being a thumbnail of each of a plurality of video frames included in the picture frame group corresponding to the currently-selected group-unit thumbnail is laid in a sequence of their elapsed time and one of the frame-unit thumbnails is taken as a currently-selected group-unit thumbnail,
  make, in response to an operation made via a first control section of the operation command input unit, a selection between the currently-selected group-unit thumbnail and the frame-unit thumbnail,
  accept an operation made via a second control section, different from the first control section, of the operation command input unit as a command for changing a currently-selected group-unit thumbnail,
  accept an operation made via a third control section, different from the first control section, of the operation command input unit as a command for changing a currently-selected frame-unit thumbnail, and
  set, in response to a set command supplied via the operation command input unit, a frame corresponding to the currently-selected group- or frame-unit thumbnail as an edit point.

11. The apparatus of claim 10, wherein the group- and frame-unit thumbnail arrays are displayed to intersect each other in the position of the currently-selected group-unit thumbnail; and
the second control section of the operation command input unit is a directional control for controlling the array direction of the group-unit thumbnails and the third control section of the operation command input unit is a direction control for controlling the array direction of the frame-unit thumbnails.

12. The apparatus of claim 10, wherein:
the group- and frame-unit thumbnail arrays are displayed in two parallel lines, respectively;
the currently-selected group-unit thumbnail is displayed in such a manner that it can be differentiated from other group-unit thumbnail array(s); and
the second and third control sections of the operation command input unit are the same control section for designating the directions of the group- and frame-unit thumbnail arrays.

13. A video data editing method of setting a frame as a predetermined edit-point in video data compressed at every picture frame groups each including a plurality of picture frames and stored in a storage unit, the method comprising:
making, based on a predetermined-operation command supplied via an operation command input unit, a selection between a group-unit edit point select mode and a frame-unit edit point select mode, a command for selection of a picture frame group of the video data stored in the storage unit is accepted via the operation command input unit to change the currently-selected picture frame group in the group-unit edit point select mode, a command for selection of one frame of a plurality of picture frame groups included in the currently-selected picture frame group is accepted via the operation command input unit to change the currently-selected picture frame in the frame-unit edit point select mode; and
setting, as an edit point, a picture frame corresponding to the result of selection in the group-unit edit point select mode or a picture frame corresponding to the results of selection in the group- and frame-unit edit point select modes in response to a set command supplied via the operation command input unit.

14. A video data editing method of setting a frame as a predetermined edit-point in video data compressed into picture frame groups each including a plurality of picture frames and stored in a storage unit, the method comprising:

displaying a group-unit thumbnail array in which a plurality of group-unit thumbnails each including a thumbnail of one picture frame in a picture frame group included in the video data stored in the storage unit is laid in a sequence of their elapsed time;

accepting a command for changing a currently-selected group-unit thumbnail, supplied via an operation command input unit, to change a currently-selected group-unit thumbnail;

displaying a frame-unit thumbnail array in which a plurality of frame-unit thumbnails each including a thumbnail of each of a plurality of picture frames included in the picture frame group corresponding to the currently-selected group-unit thumbnail is laid in a sequence of their elapsed time;

accepting a command for changing a currently-selected frame-unit thumbnail, supplied via the operation command input unit, to change the currently-selected frame-unit thumbnail;

shifting, in response to a predetermined-operation command supplied via the operation command input unit, from selecting the group-unit thumbnail to selecting the frame-unit thumbnail;

shifting, in response to another predetermined-operation command supplied via the operation command input unit, from selecting the frame-unit thumbnail to selecting the group-unit thumbnail; and setting, as an edit point, a frame corresponding to the currently-selected group- or frame-unit thumbnail in response to a set command supplied via the operation command input unit.

15. The method of claim 14, wherein when in the shifting from selecting the group-unit thumbnail to selecting the frame-unit thumbnail, the frame-unit thumbnail array of the picture frame group corresponding to the group-unit thumbnail being selected is displayed in addition to the group-unit thumbnail array in correspondence to the group-unit thumbnail being selected; and when shifting from selecting the frame-unit thumbnail to selecting the group-unit thumbnail, the frame-unit thumbnail array is erased to display only the group-unit thumbnail array.

16. The method of claim 15, wherein in the displaying of a frame-unit thumbnail array, the group- and frame-unit thumbnail arrays are displayed to intersect each other in the position of the currently-selected group-unit thumbnail.

17. The method of claim 15, wherein in the displaying of a frame-unit thumbnail array, the group- and frame-unit thumbnail arrays are displayed in parallel lines; and the currently-selected group-unit thumbnail is displayed differently from other group-unit thumbnail(s).

18. The method of claim 14, wherein in the displaying of a group-unit thumbnail array, only the group-unit thumbnail array is displayed; and in the displaying of a frame-unit thumbnail array, only the frame-unit thumbnail array is displayed and an indication informing the user of a currently-selected edit-point selection is provided in the group- and frame-unit edit-point selecting steps.

19. A video data editing method of setting a frame as a predetermined edit-point in video data compressed into picture frame groups each including a plurality of picture frames and stored in a storage unit, the method comprising:

displaying, simultaneously on a display screen, a group-unit thumbnail array and a frame-unit thumbnail array, the group-unit thumbnail array including a plurality of group-unit thumbnails each being one picture frame thumbnail of the picture frame group in the video data stored in the storage unit is laid in a sequence of their elapsed time and one of the group-unit thumbnails is taken as a currently-selected group-unit thumbnail, the frame-unit thumbnail array including a plurality of frame-unit thumbnails each being a thumbnail of each of a plurality of video frames included in the picture frame group corresponding to the currently-selected group-unit thumbnail is laid in a sequence of their elapsed time and one of the frame-unit thumbnails is taken as a currently-selected group-unit thumbnail;

accepting an operation made via a first control section of an operation command input unit as a command for changing a currently-selected group-unit thumbnail in the group-unit thumbnail array;

accepting an operation made via a second control section, different from the first control section, of the operation command input unit as a command for changing a currently-selected frame-unit thumbnail; and setting, in response to a set command supplied via the operation command input unit, a frame corresponding to the currently-selected group- or frame-unit thumbnail as an edit point.

20. The method of claim 19, wherein the group- and frame-unit thumbnail arrays are displayed to intersect each other in the position of the currently-selected group-unit thumbnail; and the first control section of the operation command input unit controls the array direction of the group-unit thumbnails and the second control section of the operation command input unit controls the array direction of the frame-unit thumbnails.

21. The method of claim 19, further comprising:

displaying a group-unit thumbnail array in which the plurality of group-unit thumbnails is laid in a sequence of their elapsed time;

accepting a command for changing a currently-selected group-unit thumbnail, supplied via the operation command input unit, to change the currently-selected group-unit thumbnail, in response to a predetermined-operation command supplied via the operation command input unit, shifting to the simultaneous display of the group- and frame-unit thumbnail arrays on the display screen.

22. A video data editing method of setting a frame as a predetermined edit-point in video data compressed into picture frame groups each including a plurality of picture frames and stored in a storage unit, the method comprising:

displaying, simultaneously on a display screen, a group-unit thumbnail array and a frame-unit thumbnail array, the group-unit thumbnail array including a plurality of group-unit thumbnails each being one picture frame thumbnail of the picture frame group in the video data stored in the storage unit is laid in a sequence of their elapsed time and one of the group-unit thumbnails is taken as a currently-selected group-unit thumbnail, the frame-unit thumbnail array including a plurality of frame-unit thumbnails each being a thumbnail of each of a plurality of video frames included in the picture frame group corresponding to the currently-selected group-unit thumbnail is laid in a sequence of their elapsed time and one of the frame-unit thumbnails is taken as a currently-selected group-unit thumbnail;

selecting the currently-selected group- or frame-unit thumbnail in response to an operation command supplied via a first control section of an operation command input unit;

accepting an operation made via a second control section, different from the first control section, of the operation command input unit as a command for changing a currently-selected group-unit thumbnail in the group-unit thumbnail array;

accepting an operation command supplied via a third control section, different from the first control section, of the operation command input unit as a command for changing a currently-selected frame-unit thumbnail; and setting a frame corresponding to the currently-selected group- or frame-unit thumbnail as an edit point in response to a set command supplied via the operation command input unit.

23. The method of claim 22, wherein the group- and frame-unit thumbnail arrays are displayed to intersect each other in the position of the currently-selected group-unit thumbnail; and the second control section of the operation command input unit is a directional control for controlling the array direction of the group-unit thumbnails and the third control section of the operation command input unit is a direction control for controlling the array direction of the frame-unit thumbnails.

24. The method of claim 22, wherein the group- and frame-unit thumbnail arrays are displayed in two parallel lines, respectively, and the currently-selected group-unit thumbnail is displayed differently from other group-unit thumbnail array(s); and the second and third control sections of the operation command input unit are the same control section for designating the directions of the group- and frame-unit thumbnail arrays.

* * * * *